United States Patent
Shi et al.

(10) Patent No.: US 12,334,692 B2
(45) Date of Patent: Jun. 17, 2025

(54) BUS-BARWIRE WITH FRAME, BUSBARS AND TERMINALS, ELECTRIC POWER STEERING SYSTEM

(71) Applicant: ANHUI WELLING AUTO PARTS CO., LTD., Anhui (CN)

(72) Inventors: Tao Shi, Anhui (CN); Xiao Ge, Anhui (CN); Jia Wan, Anhui (CN); Jie Gong, Anhui (CN); Haoyang Xu, Anhui (CN); Zhongsen Zhao, Anhui (CN)

(73) Assignee: ANHUI WELLING AUTO PARTS CO., LTD., Anhui (CN)

( * ) Notice: Subject to any disclaimer, the term of this patent is extended or adjusted under 35 U.S.C. 154(b) by 558 days.

(21) Appl. No.: 17/675,102

(22) Filed: Feb. 18, 2022

(65) Prior Publication Data
US 2022/0173558 A1    Jun. 2, 2022

Related U.S. Application Data

(63) Continuation of application No. PCT/CN2020/103676, filed on Jul. 23, 2020.

(30) Foreign Application Priority Data

Aug. 20, 2019  (CN) .......................... 201910770454.X
Aug. 20, 2019  (CN) .......................... 201910770460.5
(Continued)

(51) Int. Cl.
*H02K 3/28*       (2006.01)
*H01R 25/16*    (2006.01)

(52) U.S. Cl.
CPC ............. *H01R 25/162* (2013.01); *H02K 3/28* (2013.01); *H01R 2201/10* (2013.01)

(58) Field of Classification Search
CPC ............ H02K 3/50; H02K 3/505; H02K 3/52; H02K 3/521; H02K 3/522; H02K 3/524;
(Continued)

(56) References Cited

U.S. PATENT DOCUMENTS 2,871,285 A * 1/1959 Fouse ...................... H02G 5/06
                                                          174/88 B
2,977,449 A * 3/1961 Roethlisberger ......... H02G 5/08
                                                           361/675
(Continued)

FOREIGN PATENT DOCUMENTS

CN         104380578 A        2/2015
CN         104753196 A        7/2015
(Continued)

OTHER PUBLICATIONS

International Search Report dated Oct. 23, 2020 received in International Application No. PCT/CN2020/103676 together with an English language translation.
(Continued)

*Primary Examiner* — Maged M Almawri
(74) *Attorney, Agent, or Firm* — Scully, Scott, Murphy & Presser, P.C.

(57) ABSTRACT

A bus-barwire is provided. The bus-barwire has a frame, busbars and terminals. The busbars each has a main body and multiple connecting parts connected to the main body. The connecting parts connect wiring ends of motor stator windings. The terminals are connected to the busbars, to connect to a power source. The main bodies of the busbars are arranged in a stack along an axial direction of the frame and are spaced apart from each other. The connecting parts of the busbars are spaced apart along a circumferential direction of the frame. The connecting parts of the busbars
(Continued)

are distanced from end surfaces of the stator windings and remain flush in the axial direction of the frame.

20 Claims, 24 Drawing Sheets

(30) Foreign Application Priority Data

| Aug. 20, 2019 | (CN) | 201910770966.6 |
|---|---|---|
| Aug. 20, 2019 | (CN) | 201921354424.2 |
| Aug. 20, 2019 | (CN) | 201921354472.1 |
| Aug. 20, 2019 | (CN) | 201921355173.X |
| Feb. 25, 2020 | (CN) | 202010115588.0 |
| Feb. 25, 2020 | (CN) | 202010115589.5 |
| Feb. 25, 2020 | (CN) | 202020205579.6 |
| Feb. 25, 2020 | (CN) | 202020205583.2 |
| Feb. 25, 2020 | (CN) | 202020205586.6 |

(58) Field of Classification Search
CPC ...... H02K 3/525; H02K 3/46; H02K 3/28; H02K 3/18; H02K 1/146; H02K 1/2706; H01R 25/162; H01R 25/164; H01R 25/165; H01R 25/167; H01R 2201/10
USPC .......................................... 310/71, 180–208
See application file for complete search history.

(56) References Cited

U.S. PATENT DOCUMENTS

| 4,420,701 | A | * | 12/1983 | Nikitin | H02K 3/47 |
| | | | | | 310/71 |
| 4,590,397 | A | * | 5/1986 | Davis | H02K 5/225 |
| | | | | | 310/43 |
| 4,689,546 | A | * | 8/1987 | Stephens | H02K 5/225 |
| | | | | | 310/71 |
| 4,799,309 | A | * | 1/1989 | Cinzori | H02K 11/05 |
| | | | | | 257/E25.026 |
| 4,896,062 | A | * | 1/1990 | Pollard | H01L 25/117 |
| | | | | | 363/145 |
| 5,517,063 | A | * | 5/1996 | Schantz, Jr. | B60L 3/00 |
| | | | | | 363/71 |
| 5,559,385 | A | * | 9/1996 | Yalovega | H02K 3/28 |
| | | | | | 310/198 |
| 5,573,414 | A | * | 11/1996 | Taillon | H02K 3/505 |
| | | | | | 29/889.22 |
| 5,682,070 | A | * | 10/1997 | Adachi | H02K 19/22 |
| | | | | | 310/71 |
| 5,728,975 | A | * | 3/1998 | Tanaka | H01R 12/62 |
| | | | | | 439/115 |
| 6,014,007 | A | * | 1/2000 | Seibel | H02P 21/34 |
| | | | | | 318/807 |
| 6,069,428 | A | * | 5/2000 | Nelson | H02K 11/33 |
| | | | | | 310/90 |
| 6,111,328 | A | * | 8/2000 | Ota | H02P 25/08 |
| | | | | | 307/147 |
| 6,252,327 | B1 | * | 6/2001 | Matsuzaki | H02K 3/12 |
| | | | | | 310/201 |
| 6,271,608 | B1 | * | 8/2001 | Haydock | H02K 5/225 |
| | | | | | 310/260 |
| 6,464,538 | B2 | * | 10/2002 | Miyazaki | H01R 13/6589 |
| | | | | | 439/95 |
| 6,469,413 | B1 | * | 10/2002 | Oohashi | H02K 11/05 |
| | | | | | 310/201 |
| 6,475,007 | B2 | * | 11/2002 | Sugata | H01R 35/025 |
| | | | | | 439/164 |
| 6,514,100 | B2 | * | 2/2003 | Maegawa | H01R 12/61 |
| | | | | | 439/492 |
| 6,538,356 | B1 | * | 3/2003 | Jones | H02K 3/50 |
| | | | | | 310/422 |
| 6,737,773 | B2 | * | 5/2004 | Hayashi | F04B 27/0895 |
| | | | | | 310/71 |
| 6,856,057 | B2 | * | 2/2005 | Kobayashi | H02K 15/30 |
| | | | | | 310/71 |
| 6,917,174 | B2 | * | 7/2005 | Carruthers | G01R 15/18 |
| | | | | | 318/474 |
| 6,930,418 | B2 | * | 8/2005 | Kobayashi | H02K 3/522 |
| | | | | | 310/239 |
| 7,445,529 | B2 | * | 11/2008 | Takizawa | H01R 13/113 |
| | | | | | 439/845 |
| 7,936,099 | B2 | * | 5/2011 | Staudemann | H02K 11/33 |
| | | | | | 310/198 |
| 7,948,130 | B2 | * | 5/2011 | Kitagawa | H02K 3/522 |
| | | | | | 310/71 |
| 8,339,001 | B2 | * | 12/2012 | Ghodsi-Khameneh | |
| | | | | | H02K 3/28 |
| | | | | | 310/71 |
| 8,519,583 | B2 | * | 8/2013 | Sakaue | H02K 3/28 |
| | | | | | 310/71 |
| 8,816,550 | B2 | * | 8/2014 | Kim | B62D 5/0403 |
| | | | | | 310/43 |
| 8,853,910 | B2 | * | 10/2014 | Sato | H02K 3/24 |
| | | | | | 310/194 |
| 8,922,080 | B2 | * | 12/2014 | Nakagawa | H01R 43/16 |
| | | | | | 310/71 |
| 9,866,080 | B2 | * | 1/2018 | Kim | F04C 23/001 |
| 10,790,626 | B2 | * | 9/2020 | Lee | H01R 25/162 |
| 2002/0084713 | A1 | * | 7/2002 | Kuroyanagi | H02K 3/50 |
| | | | | | 310/71 |
| 2003/0173842 | A1 | * | 9/2003 | Kobayashi | H02K 15/10 |
| | | | | | 310/71 |
| 2003/0178896 | A1 | * | 9/2003 | Crane | H02K 3/28 |
| | | | | | 310/71 |
| 2003/0201688 | A1 | * | 10/2003 | Yamamura | H02K 3/522 |
| | | | | | 310/71 |
| 2003/0214196 | A1 | * | 11/2003 | Cai | H02K 3/14 |
| | | | | | 310/208 |
| 2004/0135457 | A1 | * | 7/2004 | Holzheu | H02K 3/12 |
| | | | | | 310/201 |
| 2005/0023910 | A1 | * | 2/2005 | Lukenich | H02K 3/522 |
| | | | | | 310/179 |
| 2005/0189828 | A1 | * | 9/2005 | Nakayama | B62D 5/0403 |
| | | | | | 310/71 |
| 2005/0189833 | A1 | * | 9/2005 | Liao | H02K 3/505 |
| | | | | | 310/201 |
| 2005/0236921 | A1 | * | 10/2005 | Yoneda | H02K 3/522 |
| | | | | | 310/179 |
| 2005/0236922 | A1 | * | 10/2005 | Yoneda | H02K 3/522 |
| | | | | | 310/179 |
| 2005/0248228 | A1 | * | 11/2005 | Yoneda | H02K 3/522 |
| | | | | | 310/179 |
| 2005/0253466 | A1 | * | 11/2005 | Seguchi | H02K 3/28 |
| | | | | | 310/179 |
| 2006/0043806 | A1 | * | 3/2006 | Torii | H02K 3/522 |
| | | | | | 310/194 |
| 2006/0138883 | A1 | * | 6/2006 | Yagai | H02K 3/522 |
| | | | | | 310/179 |
| 2006/0202584 | A1 | * | 9/2006 | Jore | H02K 11/215 |
| | | | | | 310/179 |
| 2008/0018193 | A1 | * | 1/2008 | Kobayashi | H02K 5/225 |
| | | | | | 310/219 |
| 2009/0039720 | A1 | * | 2/2009 | Tsukashima | H02K 5/225 |
| | | | | | 310/71 |
| 2009/0072653 | A1 | * | 3/2009 | Harada | H02K 3/18 |
| | | | | | 29/596 |
| 2009/0102309 | A1 | * | 4/2009 | Kamibayashi | H02K 3/12 |
| | | | | | 310/195 |
| 2009/0102312 | A1 | * | 4/2009 | Tsukashima | H02K 3/522 |
| | | | | | 310/215 |
| 2009/0127948 | A1 | * | 5/2009 | Shimizu | H02K 3/50 |
| | | | | | 903/906 |
| 2009/0152975 | A1 | * | 6/2009 | Sasaki | H02K 3/522 |
| | | | | | 310/195 |
| 2010/0045133 | A1 | * | 2/2010 | Ciampolini | H02K 3/50 |
| | | | | | 310/201 |
| 2011/0018376 | A1 | * | 1/2011 | Kataoka | H02K 3/522 |
| | | | | | 310/71 |

(56) References Cited

U.S. PATENT DOCUMENTS

| | | | |
|---|---|---|---|
| 2011/0068647 A1* | 3/2011 | Sakaue | H02K 3/28 310/71 |
| 2011/0109178 A1* | 5/2011 | Okamoto | H02K 3/12 310/71 |
| 2011/0156512 A1* | 6/2011 | Shimomura | H02K 3/522 310/71 |
| 2011/0215662 A1* | 9/2011 | Lee | H02K 3/38 310/71 |
| 2011/0278974 A1* | 11/2011 | Matsuyama | H02K 3/52 310/71 |
| 2011/0297474 A1* | 12/2011 | Aono | B62D 5/0403 174/68.2 |
| 2012/0037436 A1* | 2/2012 | Kwon | H02K 3/50 310/71 |
| 2012/0086292 A1* | 4/2012 | Ishida | H02K 11/25 310/71 |
| 2012/0126646 A1* | 5/2012 | Nakagawa | H02K 5/225 310/71 |
| 2012/0146437 A1* | 6/2012 | Kernahan | H02P 11/06 310/71 |
| 2012/0262014 A1* | 10/2012 | Katou | H02K 3/522 310/71 |
| 2012/0286593 A1* | 11/2012 | Yokogawa | H02K 3/522 310/43 |
| 2012/0319512 A1* | 12/2012 | Nakagawa | H02K 1/278 310/71 |
| 2013/0069461 A1* | 3/2013 | Arai | H02K 3/522 310/71 |
| 2013/0113313 A1* | 5/2013 | Ikura | H02K 3/522 310/71 |
| 2013/0328426 A1* | 12/2013 | Jang | H02K 3/522 310/71 |
| 2014/0014390 A1* | 1/2014 | Chamberlin | H02K 15/32 174/68.2 |
| 2014/0015359 A1* | 1/2014 | Chamberlin | H02K 3/522 310/71 |
| 2014/0113472 A1* | 4/2014 | Chamberlin | H02K 3/50 439/212 |
| 2014/0175921 A1* | 6/2014 | Tomita | H02K 3/50 310/71 |
| 2014/0232215 A1* | 8/2014 | Takasaki | H02K 11/0094 310/43 |
| 2014/0232223 A1* | 8/2014 | Takasaki | H02K 3/28 310/71 |
| 2015/0015095 A1* | 1/2015 | Kurono | H02K 3/50 310/54 |
| 2015/0076944 A1* | 3/2015 | Shim | H02K 3/28 310/71 |
| 2015/0097453 A1* | 4/2015 | Nishikawa | H02K 3/50 310/71 |
| 2015/0188377 A1* | 7/2015 | Kim | H02K 1/278 417/415 |
| 2015/0229172 A1* | 8/2015 | Kashihara | H02K 5/225 310/71 |
| 2015/0263580 A1* | 9/2015 | Houzumi | B29C 45/14065 310/43 |
| 2015/0311764 A1* | 10/2015 | Nakamura | H02K 3/522 310/71 |
| 2016/0020660 A1 | 1/2016 | Houzumi et al. | |
| 2016/0111931 A1* | 4/2016 | Kakuda | H02K 5/08 310/43 |
| 2016/0254717 A1* | 9/2016 | Hoshina | H02K 3/18 310/71 |
| 2016/0301272 A1* | 10/2016 | Haruno | H02K 1/12 |
| 2017/0093239 A1* | 3/2017 | Teranishi | H02K 3/28 |
| 2017/0104281 A1* | 4/2017 | Kurono | H02K 3/522 |
| 2017/0250585 A1* | 8/2017 | Ohashi | H02K 15/33 |
| 2017/0366060 A1* | 12/2017 | Haberkorn | H02K 3/522 |
| 2018/0006522 A1* | 1/2018 | Hiramitsu | H02K 3/522 |
| 2018/0123414 A1 | 5/2018 | Kim | |
| 2018/0175570 A1* | 6/2018 | Houzumi | H02K 3/50 |
| 2018/0241268 A1* | 8/2018 | Asahi | H02K 3/28 |
| 2018/0316238 A1* | 11/2018 | Kong | B62D 5/0403 |
| 2020/0014272 A1* | 1/2020 | Asahi | H02K 3/50 |

FOREIGN PATENT DOCUMENTS

| | | |
|---|---|---|
| CN | 105027392 A | 11/2015 |
| CN | 105027393 A | 11/2015 |
| CN | 105075072 A | 11/2015 |
| CN | 105743288 A | 7/2016 |
| CN | 105945546 A | 9/2016 |
| CN | 106716784 A | 5/2017 |
| CN | 107534357 A | 1/2018 |
| CN | 108512344 A | 9/2018 |
| CN | 207939012 U | 10/2018 |
| CN | 208674969 U | 3/2019 |
| CN | 210200991 U | 3/2020 |
| CN | 210200992 U | 3/2020 |
| CN | 210201093 U | 3/2020 |
| CN | 211605464 U | 9/2020 |
| CN | 211605465 U | 9/2020 |
| CN | 211879639 U | 11/2020 |
| DE | 102015200089 A1 | 7/2016 |
| EP | 2562915 A2 | 2/2013 |
| EP | 2645541 A2 | 10/2013 |
| EP | 3352341 A1 | 7/2018 |
| JP | 2009290921 A | 12/2009 |
| JP | 2012200039 A | 10/2012 |
| JP | 2013099154 A | 5/2013 |
| JP | 2014176207 A | 9/2014 |
| WO | 2009060600 A1 | 5/2009 |
| WO | 2017162568 A1 | 9/2017 |

OTHER PUBLICATIONS

Supplementary European Search Report dated Aug. 23, 2022 received in European Patent Application No. EP 20855059.0.
Notice of Reasons for Refusal dated Jan. 17, 2023 received in Japanese Patent Application No. JP 2021-578232.
First Office Action dated Dec. 27, 2024 received in Chinese Patent Application No. 201910770454.X.
Office Action dated Nov. 29, 2024 received in Chinese Patent Application No. 2019107704605.
Office Action dated Nov. 29, 2024 received in Chinese Patent Application No. 2020101155880.
Office Action dated Dec. 4, 2024 received in Chinese Patent Application No. 2019107709666.
Office Action dated Dec. 10, 2024 received in Chinese Patent Application No. 2020101155895.
Search report dated Nov. 25, 2024 received in Chinese Patent Application No. 2019107704605.
Search report dated Nov. 27, 2024 received in Chinese Patent Application No. 2020101155880.
Search report dated Dec. 1, 2024 received in Chinese Patent Application No. 2019107709666.
Search report dated Dec. 6, 2024 received in Chinese Patent Application No. 2020101155895.

* cited by examiner

BUS-BARWIRE WITH FRAME, BUSBARS AND TERMINALS, ELECTRIC POWER STEERING SYSTEM

CROSS-REFERENCE TO RELATED APPLICATIONS

The present application is a continuation application of PCT International Application No. PCT/CN2020/103676, filed on Jul. 23, 2020, which claims priority to and benefits of Chinese Patent Application No. 201910770454.X filed with China National Intellectual Property Administration on Aug. 20, 2019 and entitled "Bus-barwire, Motor And Vehicle", and Chinese Patent Application No. 201921354472.1 filed with China National Intellectual Property Administration on Aug. 20, 2019 and entitled "Bus-barwire, Motor And Vehicle", and Chinese Patent Application No. 201910770460.5 filed with China National Intellectual Property Administration on Aug. 20, 2019 and entitled "Bus-barwire, Motor And Vehicle", and Chinese Patent Application No. 201921354424.2 filed with China National Intellectual Property Administration on Aug. 20, 2019 and entitled "Bus-barwire, Motor And Vehicle", and Chinese Patent Application No. 201910770966.6 filed with China National Intellectual Property Administration on Aug. 20, 2019 and entitled "Bus-barwire, Motor And Vehicle", and Chinese Patent Application No. 201921355173.X filed with China National Intellectual Property Administration on Aug. 20, 2019 and entitled "Bus-barwire, Motor And Vehicle", and Chinese Patent Application No. 202010115588.0, filed with China National Intellectual Property Administration on Feb. 25, 2020 and entitled "Terminal, Bus-barwire, Motor, Electric Power Steering System And Vehicle", and Chinese Patent Application No. 202020205586.6 filed with China National Intellectual Property Administration on Feb. 25, 2020 and entitled "Terminal, Bus-barwire, Motor, Electric Power Steering System And Vehicle", and Chinese Patent Application No. 202020205583.2 filed with China National Intellectual Property Administration on Feb. 25, 2020 and entitled "Bus-barwire Body, Bus-barwire, Motor, Electric Power Steering System And Vehicle", and Chinese Patent Application No. 202010115589.5 filed with China National Intellectual Property Administration on Feb. 25, 2020 and entitled "Bus-barwire Body, Bus-barwire, Motor, Electric Power Steering System And Vehicle", and Chinese Patent Application No. 202020205579.6 filed with China National Intellectual Property Administration on Feb. 25, 2020 and entitled "Bus-barwire Body, Bus-barwire, Motor, Electric Power Steering System And Vehicle", the entire contents of which are herein incorporated by reference for all purposes. No new matter has been introduced.

FIELD

The present disclosure relates to the technical field of motors, and particularly, to a bus-barwire, a bus-barwire body, an electric power steering system and a vehicle.

BACKGROUND

The motor stator generally has a plurality of windings, each of the windings has a starting end and an ending end, a total of two wiring ends, the starting and ending ends of different windings need to be connected to each other according to the product requirements to ensure the normal operation of the motor, and the wiring form is complicated, which is not conducive to the fast and efficient operation of the production line and reduces the production efficiency of the product.

SUMMARY

The present disclosure aims to solve at least one of the technical problems existing in the prior art or related technologies.

To this end, a first aspect of the present disclosure is to propose a bus-barwire.

A second aspect of the present disclosure is to propose a bus-barwire body.

A third aspect of the present disclosure is to propose another bus-barwire.

A fourth aspect of the present disclosure is to propose a motor.

A fifth aspect of the present disclosure is to propose another motor.

A sixth aspect of the present disclosure is to propose an electric power steering system.

A seventh aspect of the present disclosure is to propose a vehicle.

In view of this, according to the first aspect of the present disclosure, a bus-barwire is proposed, comprising: a frame, being an insulator; a plurality of busbars, each of the busbars comprises a main body embedded in the frame and extending along a circumferential direction of the frame, and a plurality of connecting parts connected to the main body and protruding outside of the frame, the plurality of connecting parts being used to connect wiring ends of motor stator windings; and a plurality of terminals, being connected to the plurality of busbars, for connecting to a power source, wherein, all the main bodies of the busbars are arranged in a stack along an axial direction of the frame and are spaced apart from each other, all the connecting parts of the busbars are spaced apart along the circumferential direction of the frame, and all the connecting parts of the busbars are distanced from end surfaces of the stator windings and remain flush in the axial direction of the frame.

According to the bus-barwire provided in the first aspect of the present disclosure, the connecting parts of the plurality of busbars can be used to connect each of the wiring ends of the plurality of windings of the motor stator. Use the good electrical conductivity of the busbars to realize the electrical connection of corresponding wiring end, without directly connecting the corresponding wiring end, thus reducing the wiring difficulty, facilitating the efficient and fast operation of the production line, and improving the production efficiency of the product. At the same time, all connecting parts are distributed at intervals along the circumferential direction of the frame, corresponding to the wiring ends of a plurality of windings distributed at intervals in the circumferential direction on the motor stator, and the end surfaces of all the connecting parts away from the stator winding remain flush in the axial direction of the frame. Therefore, each of the wiring ends of the plurality of windings of the motor stator can maintain the same shape and dimension, which is convenient for controlling the peeling position of each of the wiring ends, and for welding the wiring ends and the connecting parts on the production line, and it is also convenient to cut off the excess thread after the welding is completed, which is beneficial to significantly improve production efficiency, shorten production cycle, and improve product consistency.

According to the second aspect of the present disclosure, a bus-barwire body is proposed comprising: a frame, being an insulator and comprising a ring bracket and a plurality of strip brackets connected to the ring bracket; and a plurality of busbars, each of the busbars comprising a main body embedded in the ring bracket and a plurality of connecting parts connected to the main body and protruding from the frame, wherein, the strip bracket is provided with a groove for accommodating a part of the terminal, the groove is provided with a avoidance gap, and the avoidance gap is for one end of the terminal to bend and extend and protrude from the groove so as to be connected to the connecting part; the strip bracket is provided with at least one supporting mating surface for supporting the terminal, and at least a part of the at least one supporting mating surface is located in the groove, and the connecting part, the supporting mating surface and an entrance of the groove are arranged in sequence along the axial direction of the ring bracket.

According to the third aspect of the present disclosure, another bus-barwire is proposed, including: the bus-barwire body of the second aspect; and a plurality of terminals, being connected to a plurality of busbars of the bus-barwire body, one end of the terminal is connected to the connecting part, and another end of the terminal is used to connect a power female terminal.

According to the fourth aspect of the present disclosure, a motor is proposed, comprising: a motor body, comprising a stator being provided with a winding, and the winding having two wiring ends; and the bus-barwire of the first aspect, wherein the connecting part of the bus-barwire is connected to the wiring end.

According to the fifth aspect of the present disclosure, another motor is proposed, comprising: a motor body, comprising a stator, being provided with windings, and the winding having two wiring ends; and any one of the bus-barwires of the third aspect, wherein the connecting part of the bus-barwire is connected to the wiring end.

According to the sixth aspect of the present disclosure, an electric power steering system is proposed, including: the motor in the fifth aspect; and a control device, being electrically connected to the motor.

According to the seventh aspect of the present disclosure, a vehicle is proposed, including: a vehicle body; and the motor of the fourth or fifth aspect, being installed in the vehicle body.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of embodiments in conjunction with the following drawings.

Figure 1:
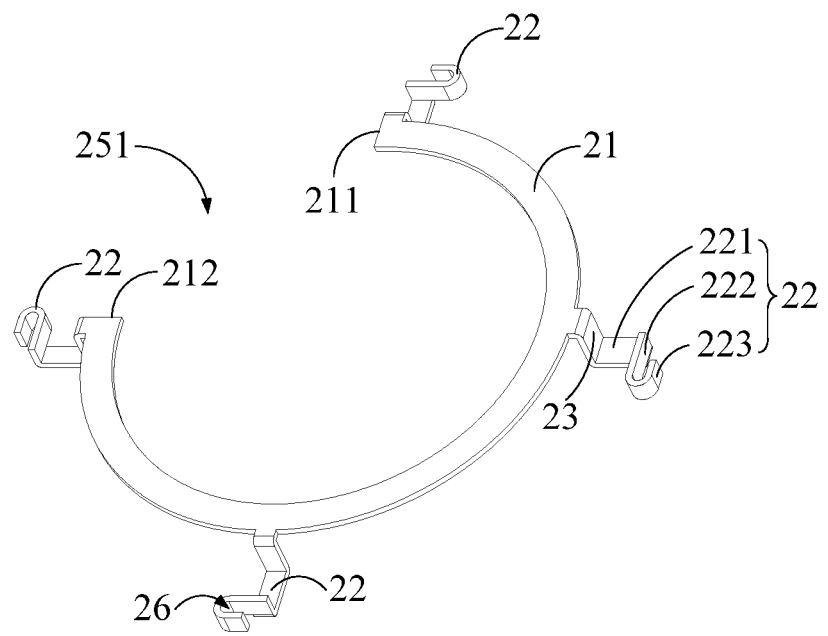
FIG. 1 is a structural schematic diagram of a U-phase busbar provided in some embodiments of the present disclosure.

The description of the reference numerals in FIG. 1 to FIG. 28 is provided as follows: 1 frame, 11 ring bracket, 12 strip bracket, 13 hook, 2 busbar, 21 main body, 211 first end, 212 second end, 22 connecting part, 221 extension piece, 222 connecting piece, 223 bending piece, 23 extension part, 24 neutral busbar, 251U phase busbar, 252V phase busbar, 253W phase busbar, 26 limit groove, 3 terminal, 31 extension section, 32 connection section, 4 motor body, 41 wiring end, 42 stator. The description of the reference numerals in FIG. 29 to FIG. 49 is provided as follows:

1' terminal, 11' first connection section, 111' welding surface, 12' second connection section, 121' supporting protrusion, 122' plug-in part, 13' supporting section, 131' supporting surface;

2' frame, 21' ring bracket, 22' strip bracket, 221' groove, 2211' limit groove, 222' supporting mating surface, 223' avoidance gap, 224' reinforced protrusion, 226' first clearance, 227' second clearance, 23' hook, 231' fixed part, 232' hook part, 2321' elastic buckle, 233' avoidance groove, 234' top surface;

3' busbar, 31' main body, 32' connecting part;

4' stator, 41' locking groove;

5' electric power steering system, 51' motor, 52' control device;

6' vehicle, 61' vehicle body.

DETAILED DESCRIPTION OF EMBODIMENTS

In order that the above-mentioned objectives, features and advantages of the present disclosure can be understood more clearly, a further detailed description of the present disclosure will be given below in connection with the accompanying drawings and exemplary embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the embodiments disclosed below.

Figure 20:
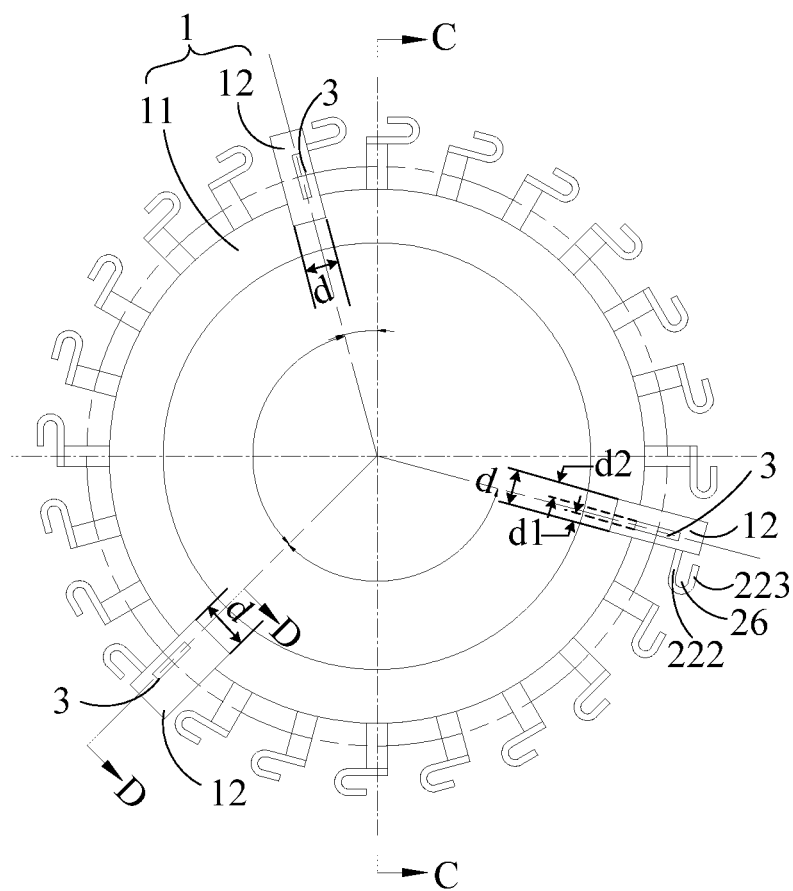
FIG. 20 is a top-view structural schematic diagram of a bus-barwire provided in some embodiments of the present disclosure.

A bus-barwire according to an embodiment of the disclosure comprises a frame 1, a plurality of busbars 2 and a plurality of terminals 3, as shown in FIG. 20.

The frame 1 can be an insulator.

Figure 19:
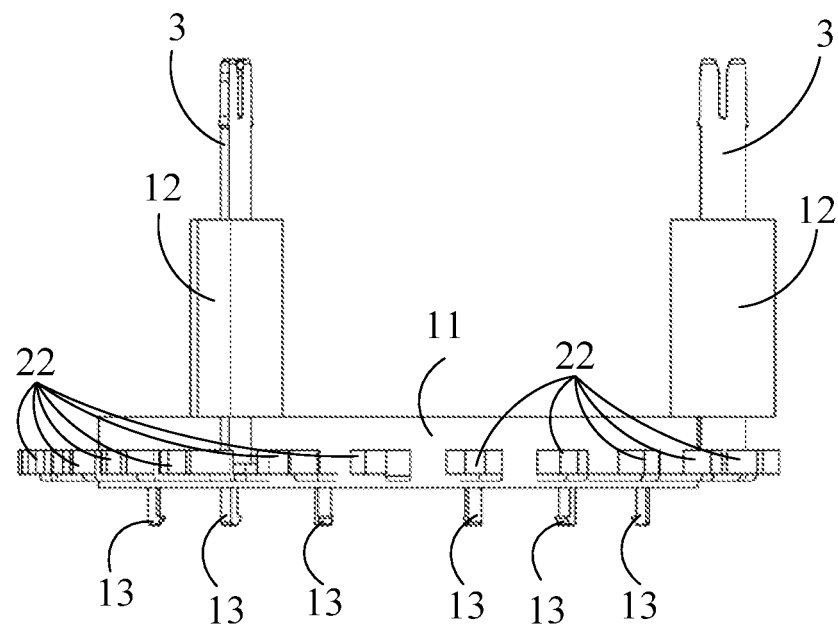
FIG. 19 is a front-view structural schematic diagram of a bus-barwire provided in some embodiments of the present disclosure.

Each of the busbars 2 comprises a main body 21 and a plurality of connecting parts 22, as shown in FIG. 1 to FIG. 9 and FIG. 13 and FIG. 14. The main body 21 is embedded in the frame 1 (as shown in FIG. 19 and FIG. 20), and extends along the circumferential direction of the frame 1, as shown in FIG. 1, FIG. 2, FIG. 4, FIG. 5, FIG. 7, FIG. 8, FIG. 13 and FIG. 14. The plurality of connecting parts 22 are connected to the main body 21 and protrudes from the frame 1, as shown in FIG. 20, used to connect the wiring end 41 of the winding of the motor stator 42.

Figure 16:
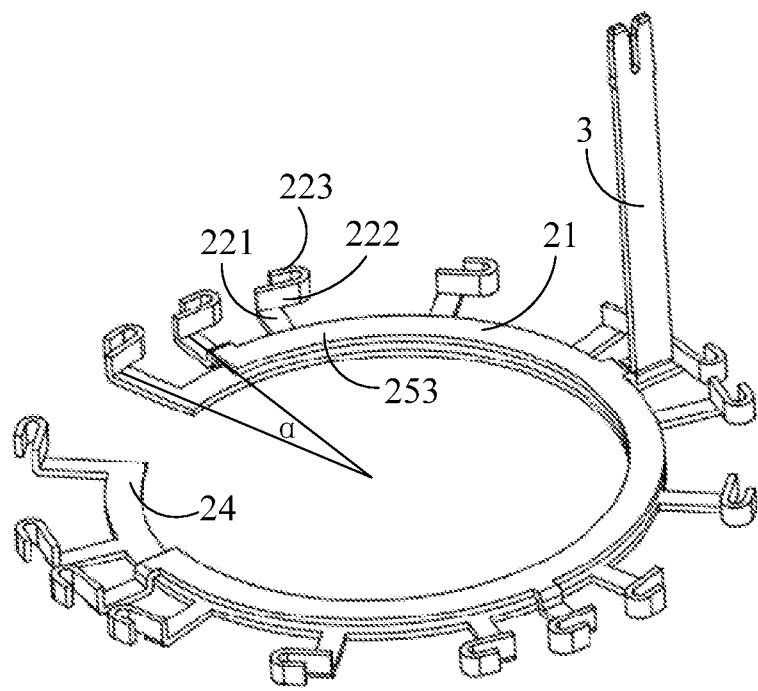
FIG. 16 is an assembly schematic diagram of a neutral busbar, a W-phase busbar and a corresponding terminal provided in some embodiments of the present disclosure.
Figure 17:
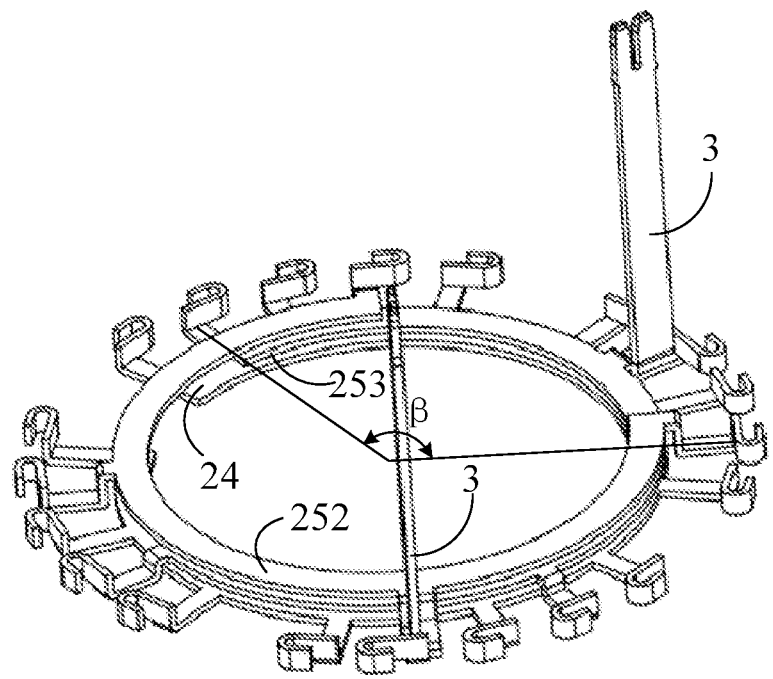
FIG. 17 is an assembly schematic diagram of a neutral busbar, a W-phase busbar, a V-phase busbar and two corresponding terminals provided in some embodiments of the present disclosure.
Figure 18:
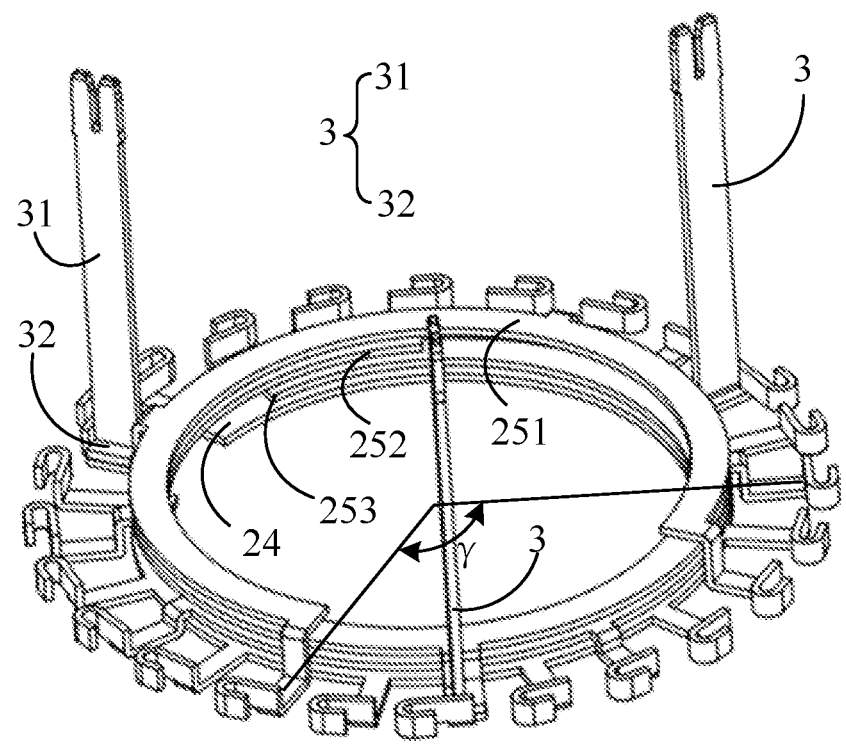
FIG. 18 is an assembly schematic diagram of a neutral busbar, a W-phase busbar, a V-phase busbar, a U-phase busbar and three corresponding terminals provided in some embodiments of the present disclosure.

The plurality of terminals 3 are connected to the plurality of busbars 2, as shown in FIG. 16 to FIG. 18, for connecting to the power source.

Figure 21:
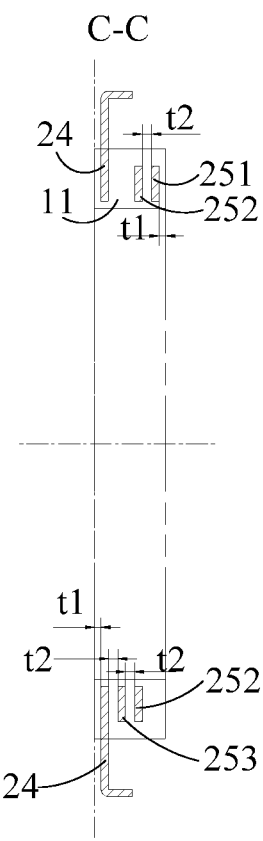
FIG. 21 is a cross-sectional structural schematic diagram of C-C direction in FIG. 20.
Figure 22:
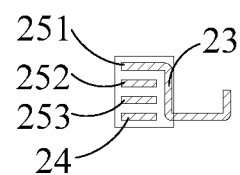
FIG. 22 is a partial cross-sectional structural schematic diagram of another part of the bus-barwire in FIG. 20.
Figure 23:
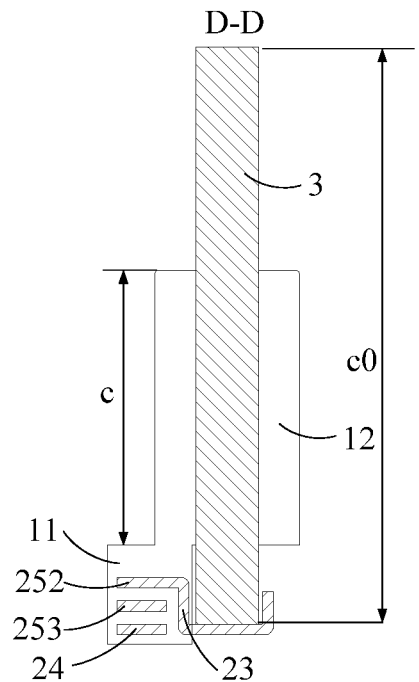
FIG. 23 is a cross-sectional structural schematic diagram of D-D direction in FIG. 20.

All the main bodies 21 of the busbars 2 are arranged in a stack along the axial direction of the frame 1 (as shown in FIG. 16 to FIG. 18), and are separated from each other (as shown in FIG. 21 to FIG. 23), all the connecting parts 22 of the busbars 2 are distributed along the circumferential direction of the frame 1. And the end surfaces of all the connecting parts of the busbars 2 away from the stator winding are remained flush in the axial direction of the frame 1, as shown in FIG. 18 and FIG. 19.

The bus-barwire provided in this embodiment can use the connecting parts 22 of the plurality of busbars 2 to connect each of the wiring ends 41 of the plurality of windings of the motor stator 42. Use the good electrical conductivity of the busbars 2 to realize the electrical connection corresponding to the wiring end 41, without directly connecting the corresponding wiring end 41. This reduces the difficulty of wiring, facilitates the efficient and fast operation of the production line, and helps improve the production efficiency of the product.

At the same time, all the connecting parts 22 are distributed at intervals along the circumferential direction of the frame 1, and correspond to the wiring ends 41 of the plurality of windings distributed along the circumferential direction on the motor stator 42. All the end surfaces of the connecting parts 22 away from the stator winding are remained flush in the axial direction of the frame 1, so each of the wiring ends 41 of the plurality of windings of the motor stator 42 can maintain the same shape and dimension. This not only facilitates the control of the paint stripping position of each of the wiring ends 41, but also facilitates the welding of the wiring end 41 and the connecting part 22 on the production line, and it is also convenient to cut off the excess thread after the welding is completed, which helps to significantly improve production efficiency, shorten production cycles, and improve product consistency.

The bus-barwire comprises a frame 1, a plurality of busbars 2 and a plurality of terminals 3. The frame 1 is an insulator, which can be molded by injection molding, which supports the plurality of busbars 2 and the plurality of terminals 3, and isolate the adjacent busbars 2 to provide electrical insulation. The plurality of busbars 2 is conductors, and each of the busbars 2 comprises a main body 21 and a plurality of connecting parts 22. The plurality of connecting parts 22 of each of the busbars 2 are used to connect the wiring ends 41 of the plurality of windings of the electronic stator 42 that need to be connected together, and the electrical connection of these wiring ends 41 is realized through the main body 21 to realize the confluence function.

The plurality of terminals 3 and the plurality of busbars 2 are connected, and the terminal 3 can be connected with the corresponding busbar by integral molding, or it can be formed separately and subsequently installed on the corresponding busbar to realize the connection. Each of the terminals 3 is electrically connected to the wiring end 41 connected to the corresponding busbar 2. The plurality of terminals 3 is connected to the power source to form an electric circuit, which supplies power to the plurality of windings of the motor stator 42. The main bodies 21 of the plurality of busbars 2 are arranged in a stack along the axial direction of the frame 1, and the radial dimension of the plurality of main bodies 21 can be kept the same. In this way, only the plurality of busbars 2 connected with terminals 3 need to be arranged together in a simple way of stacking. As shown in FIG. 16 and FIG. 17, it is ensured that all connecting parts 22 are distributed at intervals along the circumferential direction of the frame 1, and all the end surfaces of the connecting parts 22 away from the stator winding remain flush in the axial direction, and the positions of the plurality of terminals 3 are correct. As shown in FIG. 18, the frame 1 can be processed by integral injection molding and the processing technology is relatively simple, and the structure of the frame 1 is relatively simple.

Figure 24:
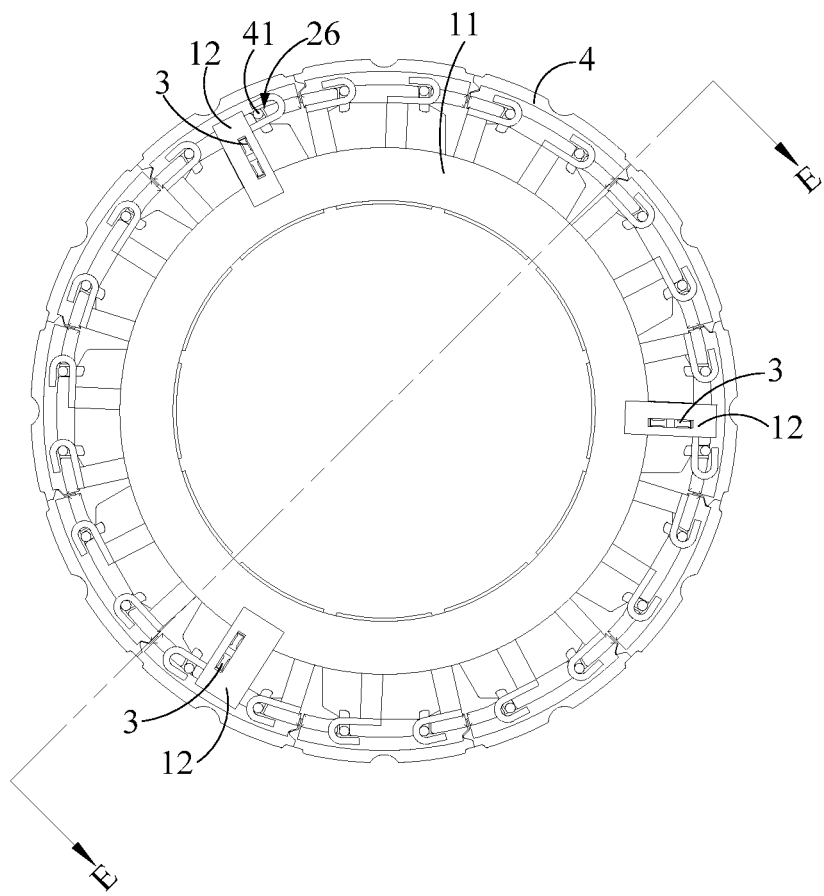
FIG. 24 is a partial top-view structural schematic diagram of a motor provided in some embodiments of the present disclosure.

Since all the connecting parts 22 of the prepared bus-barwire are distributed at intervals along the circumferential direction of the frame 1, as shown in FIG. 20, the positions of the plurality of wiring ends 41 of the motor stator 42 remain corresponding. As shown in FIG. 24, there is no need to reserve a long length of the wiring end 41 to ensure that it can extend to the position of other wiring end 41 and connect with other wiring end 41. This not only shortens the length of the wiring end 41, but also effectively prevents the wiring end 41 from being twisted or confused during the wiring process, thereby reducing the difficulty of wiring. And all the end surfaces of the connecting parts 22 away from the stator winding are remained flush in the axial direction of the frame 1 (that is: all the end surfaces of the connecting parts 22 away from the stator winding are located on the same plane perpendicular to the central axis of the frame 1). As shown in FIG. 19, in this way, the wiring ends 41 of all windings can also be remained flush, and the same length is reserved for welding. After the welding is completed, the excess wire ends are cut at the same position; thereby a high degree of consistency in wiring operations is achieved. In this way, it is not only convenient for manual operation, but also convenient for machine operation, which is beneficial to significantly improve the production efficiency of the production line.

In one embodiment, the material of the busbars 2 is copper, which has better electrical conductivity and relatively low price. In an exemplary embodiment, the material of the busbars 2 is H65 brass, which is easy to be stamped and formed and has sufficient hardness.

Furthermore, all the end surfaces of the connecting parts 22 of the busbars 2 close to the stator winding are remained flush in the axial direction of the frame 1, so that all the connecting parts 22 are remained flush in the axial direction of the frame 1.

All the end surfaces of the connecting parts 22 of the busbars 2 close to the stator winding are also remained flush in the axial direction of the frame 1 (that is: all the end surfaces of the connecting parts 22 close to the stator winding are located on the same plane perpendicular to the central axis of the frame 1). In this way, all the connecting parts 22 remain flush in the axial direction of the frame 1. In this way, the paint on the outside of the enameled wire can be peeled off at the same position for welding during the wiring process, which further improves the consistency of the wiring operation. At the same time, it also enables all the connecting parts 22 to adopt the same shape, which improves the regularity and consistency of the product and facilitates processing and molding.

Figure 4:
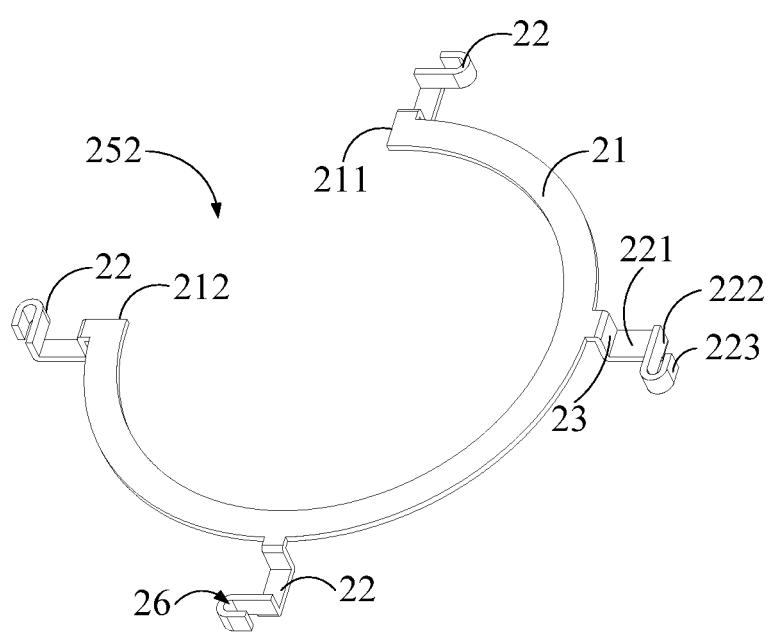
FIG. 4 is a structural schematic diagram of a V-phase busbar provided in some embodiments of the present disclosure.
Figure 7:
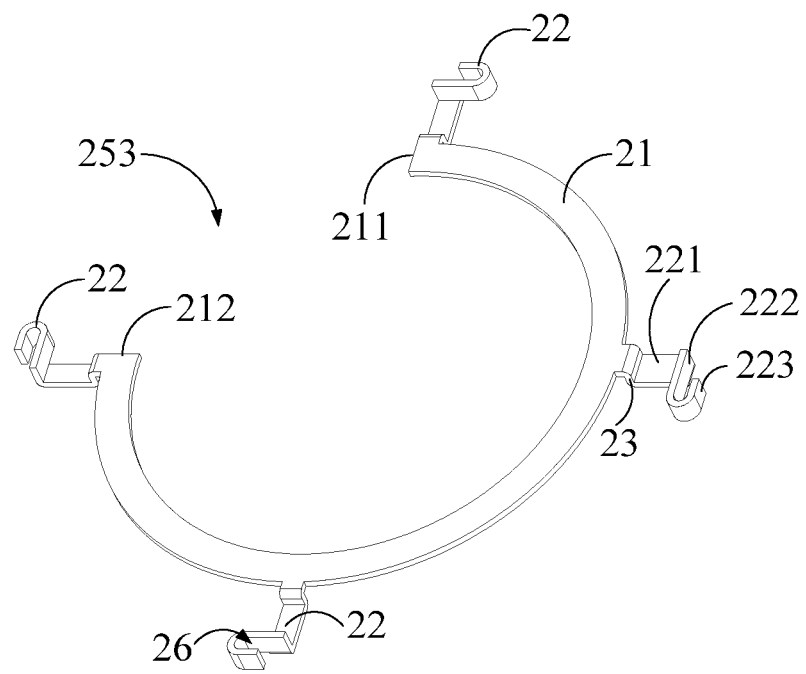
FIG. 7 is a structural schematic diagram of a W-phase busbar provided in some embodiments of the present disclosure.
Figure 8:
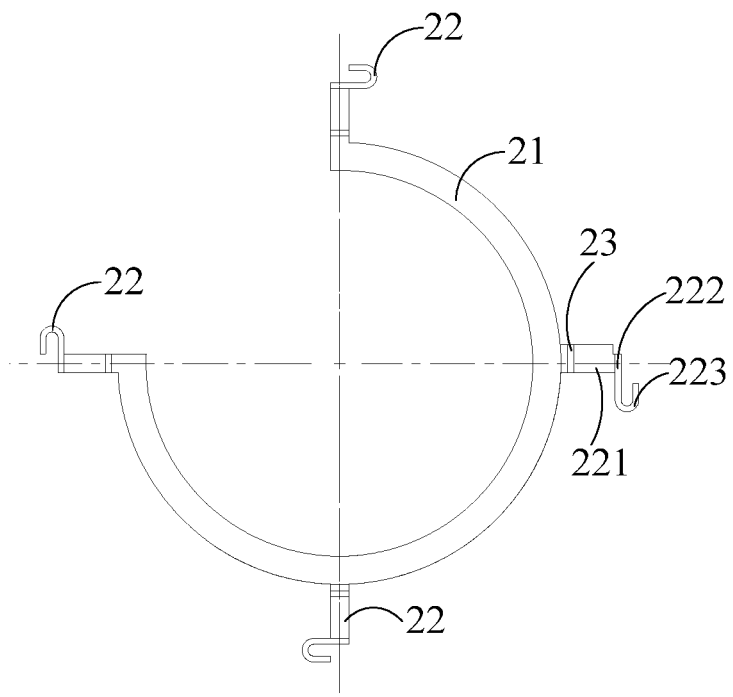
FIG. 8 is a top-view structural schematic diagram of a W-phase busbar shown in FIG. 7.
Figure 12:
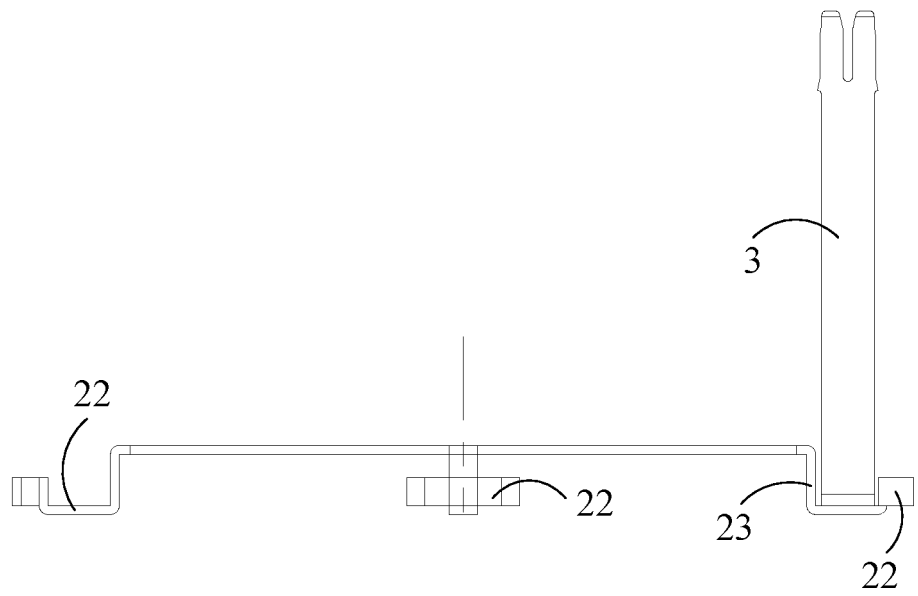
FIG. 12 is a front-view schematic diagram of a structure shown in FIG. 10.

Furthermore, at least a part of the busbars 2 also comprises an extension part 23, as shown in FIG. 1, FIG. 4 and FIG. 7. The extension part 23 is located between the outer periphery of the main body 21 and the connecting parts 22, and is used to connect the main body 21 and the connecting parts 22. The extension part 23 extends at least partially along the axial direction of the frame 1 (as shown in FIG. 12), so that all the connecting parts 22 remain flush in the axial direction of the frame 1.

At least a part of the busbars 2 comprises an extension part 23. Both ends of the extension part 23 are connected to the main body 21 and the connecting parts 22 respectively. Since the extension part 23 extends at least partially along the axial direction of the frame 1, the extension part 23 can easily realize the flushing of the plurality of connecting parts 22 in the axial direction of the frame 1. It is convenient to design the shape and dimension of the connecting parts 22 reasonably according to needs, which is conducive to optimizing the structure of the product.

In an exemplary embodiment, only a part of the busbars 2 may comprise the extension part 23, and the extension part 23 is used to keep the connecting parts 22 flush with the extension part 23 of the other busbars 2 without the extension part 23. As shown in FIG. 16, FIG. 17 and FIG. 18, the U-phase busbar 251, the V-phase busbar 252 and the W-phase busbar 253 have extension parts 23 with different axial lengths, while the neutral busbar 24 does not have the extension part 23. The three phase busbars 2 pass through the extension parts 23 of different axial length to keep the connecting parts 22 and the connecting parts 22 of the neutral busbar 24 flush in the axial direction.

In an exemplary embodiment, it is also possible that all the busbars 2 comprise the extension part 23, and the extension parts 23 of the busbars 2 are not used to extend different dimensions in the axial direction, so that all the connecting parts 22 are remained flush in the axial direction.

Alternatively, the busbars 2 does not have the extension part 23. In this scenario, by adjusting the specific connection position where the connecting parts 22 and the main body 21 are directly connected to each other and by reasonably designing the shape and dimension of the connecting parts 22, the flushing of all the connecting parts 22 in the axial direction of the frame 1 can be achieved.

In an exemplary embodiment, the extension part 23 is embedded in the frame 1, as shown in FIG. 22 and FIG. 23.

The extension part 23 is embedded in the frame 1, and only the connecting parts 22 is exposed in the frame 1, as shown in FIG. 20. In this way, the appearance structure of the bus-barwire is more regular. The frame 1 can play a good supporting role for the extension part 23, effectively preventing the extension part 23 from being deformed or shaking, thereby improving the stability of the position of each of the connecting parts 22, which is conducive to production line operations and further improves production efficiency.

Furthermore, the connecting parts 22 is provided with a limit groove 26 adapted to the wiring end 41, as shown in FIG. 1, FIG. 4, FIG. 7 and FIG. 13, and the limit groove 26 is for the wiring end 41 to pass through (as shown in FIG. 24) and suitable for welding connection with the wiring end 41.

The connecting part 22 is provided with a limit groove 26. When wiring, pass the wiring end 41 through the limit groove 26, and subsequently perform the welding operation. In this way, the limit groove 26 can not only play a good role in limiting the wiring end 41 and preventing the wiring end 41 from shaking and tilting, but also be conducive to increasing the contact area between the wiring end 41 and the connecting parts 22, thereby reducing the difficulty of welding, which is conducive to further increase productivity.

The connecting part 22 comprises a connecting piece 222 and a bending piece 223, as shown in FIG. 1, FIG. 4, FIG. 7 and FIG. 13. The connecting piece 222 is connected to the main body 21 and extends along the circumferential direction of the frame 1, as shown in FIG. 1, FIG. 4, FIG. 7 and FIG. 13. The bending piece 223 is connected to the connecting piece 222 and bent and extended, and surrounds with the connecting piece 222 to form a U-shaped limit groove 26, as shown in FIG. 1, FIG. 4, FIG. 7 and FIG. 13.

The connecting part 22 comprises a connecting piece 222 and a bending piece 223. The connecting piece 222 and the bending piece 223 enclose a U-shaped limit groove 26, so that the limit groove 26 forms a structure with openings at both ends in the axial direction and a gap in the circumferential direction (that is, the projection of the limit groove 26 on the axial end surface of the frame 1 is U-shaped). This is beneficial to increase the space of the limit groove 26, facilitate the quick passage of the wiring end 41, and also help increase the space for welding operations and reduce the difficulty of welding operations.

The thickness direction of the connecting piece 222 and the thickness direction of the bending piece 223 are perpendicular to the axial direction of the frame 1, as shown in FIG. 1, FIG. 4, FIG. 7, and FIG. 13.

The thickness direction of the connecting piece 222 and the thickness direction of the bending piece 223 are both perpendicular to the axial direction of the frame 1. This increases the depth of the limit groove 26, which is beneficial to increase the contact area between the limit groove 26 and the wiring end 41, which not only helps to further reduce the difficulty of welding, but also helps to improve the strength of welding connection.

Furthermore, all the U-shaped openings of the limit groove 26 face the same direction of rotation, as shown in FIG. 18 and FIG. 20.

All the U-shaped openings of the limit groove 26 face the same direction of rotation (for example, they all rotate in a clockwise direction, or they all rotate in a counterclockwise direction). This makes the structure of the bus-barwire more regular, which not only facilitates the processing and molding of each of the busbars 2, but also facilitates the proper rotation of the bus-barwire during production line operation, so that all the wiring ends 41 pass through each of the limit grooves 26 synchronously, which is also beneficial to further improve production efficiency.

The dimension of the connecting piece 222 along the circumferential direction of the frame 1 is greater than the dimension of the part of the bending piece 223 opposite to it along the circumferential direction of the frame 1, as shown in FIG. 1, FIG. 4, FIG. 7 and FIG. 13.

The dimension of the connecting piece 222 along the circumferential direction of the frame 1 is greater than the dimension of the part of the connecting piece 223 opposite to the connecting piece 222 along the circumferential direction of the frame 1, subsequently the connecting piece 222 and the bending piece 223 form a structure similar to a J-shaped structure. This is convenient for setting the position of the limit groove 26 reasonably, and provides a more favorable operating space for the welding operation of the wiring end 41.

Furthermore, the connecting part 22 also comprises an extension piece 221 extending in the radial direction of the frame 1, as shown in FIG. 1, FIG. 4, FIG. 7 and FIG. 13. The radial inner end of the extension piece 221 is connected to the main body 21, and the radial outer end of the extension piece 221 is connected to a part of the connecting part 22 for connecting the wiring end 41.

The connecting part 22 also comprises an extension piece 221. The extension piece 221 extends along the radial direction of the frame 1, and its radial inner and outer ends are respectively connected to the main body 21 and the connecting part 22 for connecting the part of the wiring end 41 (specifically, the connecting piece 222). In this way, the radial distance between the connecting piece 222 and the main body 21 can be increased, which is not only conducive to reducing the radial dimension of the main body 21, so as to reduce production costs, but also conducive to increasing the distance between adjacent connecting parts 22. Therefore, it is helpful to reasonably design the shape and dimension of the connecting part 22, and further optimize the product structure.

Furthermore, the plurality of terminals 3 is evenly arranged along the circumferential direction of the bus-barwire, as shown in FIG. 20 and FIG. 24.

The plurality of terminals 3 are evenly distributed along the circumferential direction of the bus-barwire, and the structure is relatively regular, which is beneficial to increase the distance between the terminals 3 and ensure the electrical insulation between the terminals 3 and meet customer requirements for the terminal 3 to be evenly distributed along the circumferential direction. Alternatively, the plurality of terminals 3 can also be distributed in one area, or distributed in other ways.

Furthermore, the plurality of connecting parts 22 are evenly distributed along the circumferential direction of the main body 21, as shown in FIG. 18, FIG. 20 and FIG. 24.

The plurality of connecting parts 22 are evenly distributed along the circumferential direction of the main body 21, making the structure of the busbars 2 more regular, easy to process and shape, and can make all the connecting parts 22 of the bus-barwire after the assembly is evenly distributed in the circumferential direction. Since the wiring end 41 of the winding of the motor stator 42 is generally evenly distributed along the circumferential direction, it maintains a one-to-one correspondence.

Furthermore, all the connecting parts 22 of the busbars 2 along the axial direction of the frame 1 do not protrude from the plane of the axial end surface of the frame 1, as shown in FIG. 19.

Both ends of all the connecting parts 22 along the axial direction of the frame 1 do not protrude from the plane where the axial end surfaces of the frame 1 are located. Compared with the connecting part 22 protruding from the axial end surfaces of the frame 1, the axial height of the frame 1 of the bus-barwire can be reduced, so that the space occupied by the axial direction of the bus-barwire is less. Therefore, it is beneficial to reduce the axial length of the motor and optimize the structure of the motor.

According to an alternative embodiment, the busbars 2 connected to the terminal 3 is connected to the terminal 3 through the extension piece 221 of one of the connecting parts 22, as shown in FIG. 16 to FIG. 18.

For the busbars 2 connected to the terminal 3, the busbars 2 is connected to the terminal 3 through the extension piece 221 of one of the connecting parts 22, there is no need to design other additional structures on busbars 2 to connect to terminal 3. Therefore, the structure of the busbars 2 is simplified, and the radial dimension of the bus-barwire will not become larger.

Alternatively, the terminal 3 can also be directly formed by bending and extending the busbars 2. Alternatively, the terminal 3 can also be directly connected to the main body 21, separated from the connecting part 22.

The extension piece 221 is perpendicular to the axial direction of the frame 1, as shown in FIG. 1, FIG. 4, FIG. 7 and FIG. 13. The terminal 3 is in the form of a sheet, and the extension piece 221 connected to the terminal 3 has a dimension a0 along the thickness direction of the terminal 3, which is larger than the dimension a of other extension piece 221 of the same busbar 2 along the thickness direction of the terminal 3, as shown in FIG. 2, FIG. 5, FIG. 8 and FIG. 10.

The extension piece 221 is perpendicular to the axial direction of the frame 1, which is beneficial to reduce the axial dimension of the busbars 2. The extension piece 221 connected to the terminal 3 has a dimension a0 along the thickness direction of the terminal 3, which is larger than the dimension a of other extension piece 221 of the same busbar 2 along the thickness direction of the terminal 3. It is beneficial to increase the contact area between the extension piece 221 and the terminal 3, thereby improving the connection strength and stability of the terminal 3, and reducing the probability of deformation of the terminal 3.

Figure 10:
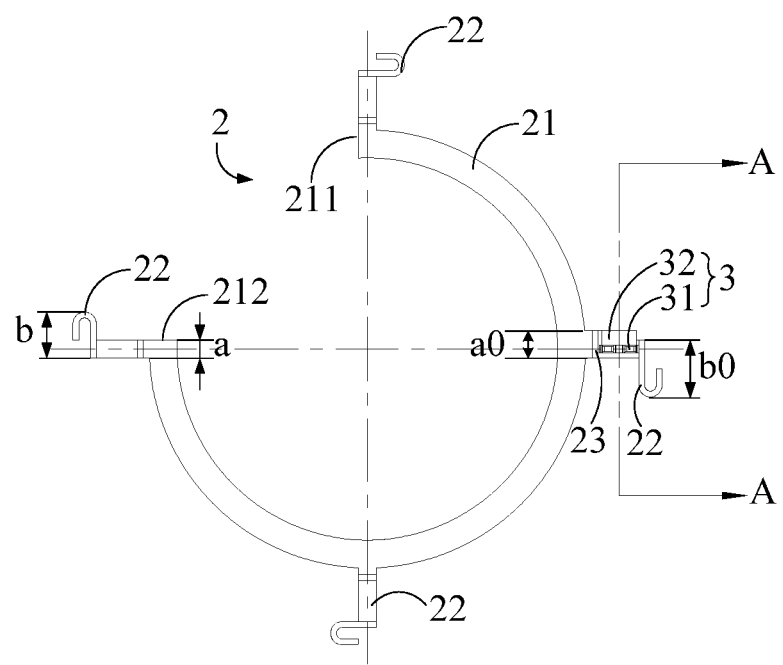
FIG. 10 is a top-view structural schematic diagram of a phase busbar connected to the terminal provided in some embodiments of the present disclosure.
Figure 11:
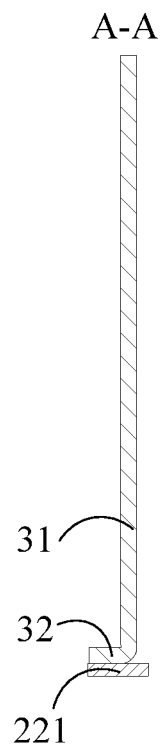
FIG. 11 is a cross-sectional structural schematic diagram of A-A direction in FIG. 10.

Furthermore, the terminal 3 is bent into an L shape, as shown in FIG. 11. The terminal 3 comprises an extension section 31 parallel to the axial direction of the frame 1 and a connection section 32 parallel to the extension piece 221. The connection section 32 is welded to the extension piece 221, as shown in FIG. 10, FIG. 11 and FIG. 18.

The terminal 3 is set to bend and comprises an extension section 31 and a connection section 32. The extension section 31 extends along the axial direction of the frame 1, and is used to connect to the power source. The connection section 32 is parallel to the extension piece 221 and welded to the extension piece 221. This increases the contact area between the terminal 3 and the extension piece 221, thereby improving the connection strength and stability of the terminal 3, and reducing the probability of the terminal 3 being deformed.

Furthermore, the extension piece 221 connected to the terminal 3 corresponding to the part for connecting the wiring end 41 has a dimension b0 in the circumferential direction of the frame 1 larger than the dimension b of other parts on the same bus bar 2 for connecting the wiring end 41 in the circumferential direction of the frame 1, as shown in FIG. 10.

The extension piece 221 connected to the terminal 3 corresponding to the part for connecting the wiring end 41 has a dimension b0 in the circumferential direction of the frame 1, it is appropriately increased relative to the dimension b of other parts on the same bus bar 2 for connecting the wiring end 41 in the circumferential direction of the frame 1. The circumferential distance between the terminal 3 and the connecting part 22 used to connect to the wiring end 41 can be increased to provide avoidance space and facilitate the welding operation of the wiring end 41.

By appropriately extending the length of the connecting piece 222 to increase the distance between the U-shaped limit groove 26 and the extension piece 221, the U-shaped limit groove 26 can be avoided.

In an exemplary embodiment, all the busbars 2 are divided into a neutral busbar 24 and a plurality of phase busbars 2, as shown in FIG. 16 to FIG. 18. The plurality of terminals 3 and the plurality of phase busbars 2 correspond one-to-one and connect one-to-one. The main bodies 21 of the plurality of phase busbars 2 are arranged next to each other, as shown in FIG. 18 and FIG. 22, and the main body 21 of the neutral busbar 24 is set at the position facing the winding, as shown in FIG. 25.

All the busbars 2 are divided into the neutral busbar 24 and the phase busbars 2, the circuit composed of the wiring end 41 connected to the phase busbars 2 (such as, the end of the partial winding) and the circuit composed of the wiring end 41 connected to the neutral busbar 24 (such as, the starting end of all the windings) can realize multiple parallel connections to form a multi-phase circuit. Since there is relatively few wiring ends 41 connected to the phase busbars 2, for example, there are only four connecting parts 22 in FIG. 1, FIG. 4, and FIG. 7. There are relatively many wiring ends 41 connected to the neutral busbar 24, for example, there are 12 connecting parts 22 in FIG. 13. Therefore, the number of the connecting parts 22 of the phase busbars 2 is also less than the number of the connecting parts 22 of the neutral busbar 24, so the main bodies 21 of the plurality of phase busbars 2 are arranged next to each other, as shown in FIG. 16 to FIG. 18. It is only necessary to change the axial position of the connecting part 22 of the phase busbars 2 so that the connecting part 22 is flush with the axial position of the neutral busbar 24, without changing the axial position of the connecting part 22 of the central busbars 2, which is beneficial to reduce processing difficulty and improve production efficiency.

Figure 25:
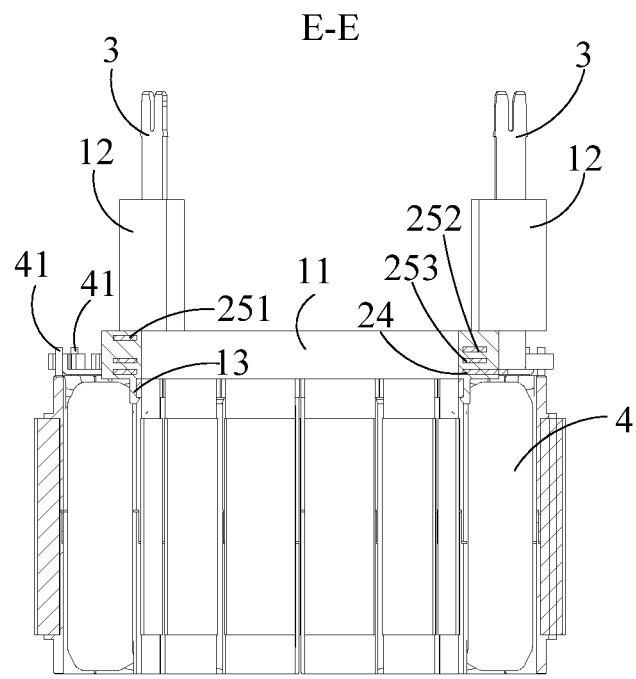
FIG. 25 is a cross-sectional structural schematic diagram of E-E direction in FIG. 24.

Furthermore, if the main body 21 of the neutral busbar 24 is set in a position facing the winding, the connecting part 22 of the phase busbars 2 can be shifted to a position close to the winding, which is beneficial to shorten the distance between the wiring end 41 and the connecting part 22, as shown in FIG. 25, the length of the wiring end 41 is shortened and the welding difficulty of the wiring end 41 is reduced.

Alternatively, the arrangement of the busbars 2 can be changed arbitrarily.

Figure 13:
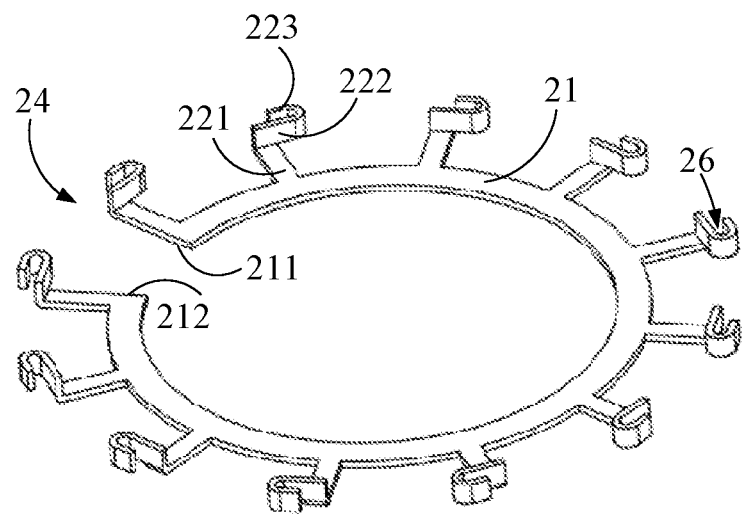
FIG. 13 is a three-dimensional structural schematic diagram of a neutral busbar provided in some embodiments of the present disclosure.

The connecting part 22 of the neutral busbar 24 and its main body 21 are directly connected (as shown in FIG. 13), and the connecting part 22 of each of the phase busbars and its main body 21 are connected through an extension part 23 (as shown in FIG. 1, FIG. 4 and FIG. 7). The extension part 23 extends along the axial direction of the frame toward the neutral busbar 24 (as shown in FIG. 1, FIG. 4 and FIG. 7), making the connecting part 22 of the phase busbar and the connecting part 22 of the neutral busbar 24 keep flush in the axial direction of the frame 1, as shown in FIG. 19.

The connecting part 22 of the neutral busbar 24 are directly connected to its main body 21, and the connecting part 22 of each of the phase busbars is connected to its main body 21 through the extension part 23. That is, the neutral busbar 24 does not have an extension part 23, only the plurality of phase busbars comprise extension parts 23. The extension part 23 is used to extend in the direction close to the neutral busbar 24, and the axial length of the extension parts 23 of the plurality of phase busbars is not equal. The connecting part 22 of each of the phase busbars can be remained flush with the connecting part 22 of the neutral busbar 24 in the axial direction of the frame 1. In this way, the structure of the neutral busbar 24 is effectively simplified, and the distance between the wiring end 41 and the connecting part 22 is further shortened, which is beneficial to further shorten the length of the wiring end 41 and further reduce the welding difficulty of the wiring end 41.

The extension piece 221 of the neutral busbar 24 is straight, as shown in FIG. 13, directly connected to the outer periphery of the main body 21 of the neutral busbar 24. The extension piece 221 of the phase busbar is also straight, as shown in FIG. 1, FIG. 4 and FIG. 7, there is an extension part 23 between its extension piece 221 and the main body 21 of the phase busbar, and the extension part 23 extends axially in the direction close to the neutral busbar 24.

As a result, the extension piece 221 of the phase busbar and the extension piece 221 of the neutral busbar 24 remain flush. In this way, the connecting part 22 of the phase busbar and the connecting part 22 of the neutral busbar 24 are also remained flush.

According to another alternative embodiment, a bus-barwire comprises a frame 1, a plurality of busbars 2 and a plurality of terminals 3, as shown in FIG. 20.

The frame 1 can be an insulator.

Each of the busbars 2 comprises a main body 21 and a plurality of connecting parts 22, as shown in FIG. 1 to FIG. 9, FIG. 13 and FIG. 14. The main body 21 is embedded in the frame 1 (as shown in FIG. 19 and FIG. 20), and extends along the circumferential direction of the frame 1, as shown in FIG. 1, FIG. 2, FIG. 4, FIG. 5, FIG. 7, FIG. 8, FIG. 13 and FIG. 14. The plurality of connecting parts 22 are connected to the main body 21 and protrude out of the frame 1, as shown in FIG. 20, used to connect the wiring end 41 of the winding of the motor stator 42.

The plurality of terminals 3 are connected to the plurality of busbars 2, as shown in FIG. 16 to FIG. 18, for connecting to a power source.

The frame 1 comprises a ring bracket 11 and a plurality of strip brackets 12. The plurality of strip brackets 12 and the ring bracket 11 are integrally connected, as shown in FIG. 23. All the main bodies 21 of the busbars 2 are embedded in the ring bracket 11, as shown in FIG. 21 to FIG. 23. The plurality of strip brackets 12 correspond to the plurality of terminals 3 one-to-one, as shown in FIG. 20, and a part of each of the terminals 3 is embedded in the corresponding strip bracket 12, as shown in FIG. 23 and FIG. 25.

The bus-barwire provided in this embodiment can use the connecting part 22 of the plurality of busbars 2 to connect each of the wiring ends 41 of the plurality of windings of the motor stator 42, and use the good electrical conductivity of the busbars 2 to realize the electrical connection corresponding to the wiring end 41, without directly connecting the corresponding wiring end 41. This reduces the difficulty of wiring, facilitates the efficient and fast operation of the production line, and helps improve the production efficiency of the product.

The bus-barwire comprises a frame 1, a plurality of busbars 2 and a plurality of terminals 3. The frame 1 is an insulator, which can be molded by injection molding, which supports the plurality of busbars 2 and the plurality of terminals 3, and isolates adjacent busbars 2 to provide electrical insulation. The plurality of busbars 2 is conductor, and each of the busbars 2 comprises a main body 21 and a plurality of connecting parts 22. The plurality of connecting parts 22 of each of the busbars 2 are used to connect the wiring ends 41 of the plurality of windings of the electronic stator 42 that need to be connected together, and the electrical connection of these wiring ends 41 is realized through the main body 21 to realize the confluence function.

The plurality of terminals 3 and the plurality of busbars 2 are connected, and the terminal 3 can be connected with the corresponding busbar by integral molding, or it can be formed separately and subsequently installed on the corresponding busbar to realize the connection. Each of the terminals 3 is electrically connected to the wiring end 41 connected to the corresponding busbar 2. The plurality of terminals 3 are connected to the power source to form an electric circuit, which supplies power to the plurality of windings of the motor stator 42.

At the same time, the frame 1 comprises a ring bracket 11 and a strip bracket 12. The ring bracket 11 is used to support the plurality of busbars 2 and ensure the insulation between the plurality of busbars 2. The plurality of strip brackets 12 are used to support the plurality of terminals 3 and ensure the electrical insulation between the terminals 3 and other structures. Because the ring bracket 11 and the plurality of strip brackets 12 are connected in one-piece, they can be formed into a one-piece structure by integral molding during the injection molding process, so the connection is relatively reliable, as shown in FIG. 23 and FIG. 25. Compared with the solution in the prior art in which the insulator is formed separately and subsequently sleeved on the terminal 3, the strip bracket 12 of this solution can play a good supporting and limiting effect on the terminal 3, which effectively prevents the terminal 3 from shaking and deformation, to ensure the position of the terminal 3, good verticality, and reliable structure, so that when the controller PIN needle is inserted into the terminal 3, the part of the terminal 3 exposed on the strip bracket 12 is not prone to deformation and failure.

In an exemplary embodiment, the dimension c of the strip bracket 12 along the axial direction of the frame 1 is greater than or equal to half of the dimension c0 of the terminal 3 along the axial direction of the frame 1.

The dimension c of the strip bracket 12 along the axial direction of the frame 1 is greater than or equal to half of the dimension c0 of the terminal 3 along the axial direction of the frame 1. Subsequently the strip-shaped frame 1 wraps terminal 3 more than half of the terminal 3. Therefore, the supporting and limiting effects on terminal 3 can be significantly improved, and the stability and reliability of the terminal 3 can be effectively ensured.

Furthermore, the terminal 3 is connected to one of the connecting parts 22 of the corresponding busbar 2. In the projection of a plane perpendicular to the central axis of the frame 1, the strip bracket 12 is arranged asymmetrically with respect to the terminal 3 in the thickness direction of the terminal 3, as shown in FIG. 20. And the dimension d1 of the part close to the corresponding connecting part 22 for connecting the wiring end 41 is smaller than the dimension d2 of the part far away from the corresponding connecting part 22 for connecting the wiring end 41.

If the terminal 3 is connected to one of the connecting parts 22 of the corresponding busbar 2, subsequently the terminal 3 and the part of the connecting part 22 used to connect to the wiring end 41 are relatively close, and the strip bracket 12 wraps the terminal 3 in the circumferential direction, which may interfere with the welding operation of the wiring end 41. Therefore, the strip bracket 12 is arranged asymmetrically, as shown in FIG. 20; and making the place close to the above-mentioned part for connecting the wiring end 41 is relatively thin, and the place far away from the above-mentioned part for connecting the wiring end 41 is relatively thick, as shown in FIG. 20. This not only ensures reliable support for the terminal 3, but also avoids the part of the connecting portion 22 for connecting the wiring end 41, which reserves space for the welding operation of the wiring end 41, which is beneficial to reduce the difficulty of the welding operation.

Furthermore, the dimension d of one of the strip brackets 12 along the thickness direction of the terminal 3 is different from the dimension d of the other strip brackets 12 along the thickness direction of the terminal 3, as shown in FIG. 20.

The dimension of one of the strip brackets 12 along the thickness direction of the terminal 3 is different from the dimensions of the other strip brackets 12 along the thickness direction of the terminal 3, so that the three strip brackets 12 are not completely consistent in appearance, as shown in FIG. 20. This can play a role of assembly fool-proofing, which is convenient to quickly identify each of the busbars 2, and subsequently locate the relative position between the bus-barwire and the winding of the stator 42, which is conducive to further improving production efficiency.

Alternatively, the dimensions of the plurality of strip brackets 12 along the thickness direction of the terminal 3 can also be inconsistent, which can also play a role in preventing assembly fool-proofing.

In an exemplary embodiment, the main body 21 has an arc-shaped structure, as shown in FIG. 1, FIG. 4, FIG. 7 and FIG. 13.

The main body 21 of the busbar 2 has an arc-shaped structure, is not a complete ring. In this way, on the basis of ensuring the same number of connecting parts 22, the circumferential length of the main body 21 can be reduced, which is conducive to saving raw materials and is convenient for processing and forming, such as forming by bending.

In an exemplary embodiment, the projection of the terminal 3 on the axial end surface of the frame 1 is a long strip, and the length of its projection extends along the radial direction of the frame 1, as shown in FIG. 18, FIG. 20 and FIG. 24.

The projection of the terminal 3 on the axial end surface of the frame 1 is a long strip, because the terminal 3 is generally a long thin slice and extends along the axial direction of the frame 1. Therefore, the projection of the terminal 3 on the axial end surface of the frame 1 is basically the same as the shape of the cross section of the terminal 3. The length direction of the projection extends along the radial direction of the frame 1, as shown in FIG. 20 and FIG. 24, which makes reasonable use of the radial space of the bus-barwire, which can meet the requirements of customers for the radial arrangement of the terminal 3.

According to another alternative embodiment, a bus-barwire comprises a frame 1, a plurality of busbars 2 and a plurality of terminals 3, as shown in FIG. 20.

The frame 1 can an insulator.

Each of the busbars 2 comprises an arc-shaped main body 21 and a plurality of connecting parts 22, as shown in FIG. 1 to FIG. 9, FIG. 13 and FIG. 14. The main body 21 is embedded in the frame 1 (as shown in FIG. 19 and FIG. 20), and extends along the circumferential direction of the frame 1, as shown in FIG. 1, FIG. 2, FIG. 4, FIG. 5, FIG. 7, FIG. 8, FIG. 13 and FIG. 14. The plurality of connecting parts 22 are connected to the main body 21 and protrude out of the frame 1 (as shown in FIG. 20). The plurality of connecting parts 22 are distributed along the circumferential direction of the main body 21, and are used to connect the wiring end 41 of the winding of the motor stator 42, as shown in FIG. 24 and FIG. 25. All the busbars 2 are divided into neutral busbar 24 and a plurality of phase busbars.

The plurality of terminals 3 are respectively set on the plurality of phase busbars, as shown in FIG. 16 to FIG. 18, for connecting to the power source.

The main body 21 of the neutral busbar 24, the main bodies 21 of the plurality of phase busbars are arranged in stack along the axial direction of the frame (as shown in FIG. 16 to FIG. 18) and are spaced apart from each other (as shown in FIG. 21 to FIG. 23), all the connecting parts 22 of the busbars 2 are evenly distributed along the circumferential direction of the frame.

Furthermore, the plurality of connecting parts 22 of each of the busbars 2 start from the gap of its main body 21 and are sequentially recorded as the x-th connecting part 22 along the same rotation direction, and the plurality of phase busbars are sequentially recorded as the y-th phase busbar along the axial direction of the frame, and the first phase busbar is arranged adjacent to the neutral busbar 24.

An axis connection angle α between the first connecting part 22 of the neutral busbar 24 and the adjacent first phase busbar is a, an axis connection angle β between the first connecting part 22 of the first phase busbar and the first connecting part 22 of the adjacent second phase busbar satisfies: α=360°/(2×m×n)+360°×K/(m×n), β=360°×P/(m×n), and β≠360°×Q/n, the m is the number of the phase busbars, the n is the number of the stator windings of each phase, K∈[0, (m×n−1)], P∈[0, (m×n−1)], Q∈[1, m].

The bus-barwire provided in this embodiment can use the connecting part 22 of the plurality of busbars 2 to connect each of the wiring ends 41 of the plurality of windings of the motor stator 42, and use the good electrical conductivity of the busbars 2 to realize the electrical connection of corresponding wiring end 41, without directly connecting the corresponding wiring end 41. The difficulty of wiring is reduced, the production line is convenient for efficient and fast operation, and it is beneficial to improve the production efficiency of the product.

At the same time, the main body 21 of the neutral busbar 24 and the main body 21 of the phase busbar are stacked and arranged one after another in the axial direction of the frame 1 and spaced apart from each other, and each of the phase busbars is rotated and staggered in the circumferential direction according to the set axis connection angle. It not only facilitates the rapid assembly of the bus-barwire, improves the production efficiency of the bus-barwire, but also makes all the connecting parts 22 evenly distributed along the circumferential direction of the frame 1, and it corresponds to the wiring end 41 of the plurality of windings spaced along the circumferential direction on the motor stator 42, which is convenient for quick wiring.

The bus-barwire comprises a frame 1, a plurality of busbars 2 and a plurality of terminals 3. The frame 1 is an insulator, which can be molded by injection molding, and supports the plurality of busbars 2 and the plurality of terminals 3, and isolate the adjacent busbars 2 for electrical insulation. The plurality of busbars 2 are conductor, and each of the busbars 2 comprises a main body 21 and a plurality of connecting parts 22. The plurality of connecting parts 22 of each of the busbars 2 are used to connect the wiring ends 41 of the plurality of windings of the electronic stator 42 that need to be connected together, and the electrical connection of these wiring ends 41 is realized through the main body 21 to realize the confluence function.

The plurality of terminals 3 are respectively set on the plurality of phase busbars, and the terminal 3 can be integrally formed with the corresponding phase busbar, or can be formed separately and subsequently installed on the corresponding phase busbar. Each of the terminals 3 is electrically connected to the wiring end 41 connected to the corresponding busbar 2. The plurality of terminals 3 is connected to the power source to form an electric circuit, which supplies power to the plurality of windings of the motor stator 42. The main body 21 is an arc shape extending along the circumferential direction of the frame 1, not a complete ring. In this way, on the basis of ensuring the same number of connecting parts 22, the circumferential length of the main body 21 can be reduced, which is conducive to saving raw materials and is convenient for processing and forming, such as forming by bending, etc. At the same time, the busbar 2 is not a rotationally symmetric structure, and the notch of its main body 21 can be used as a reference to facilitate the positioning of the busbars 2 during the assembly process.

Furthermore, all the busbars 2 are divided into the neutral busbar 24 and the phase busbars, the circuit composed of the wiring end 41 connected to the phase busbar (such as the end of the partial winding) and the circuit composed of the wiring end 41 connected to the neutral busbar 24 (such as the starting end of all the windings) can realize multiple parallel connections to form a multi-phase circuit. Since all the connecting parts 22 of the prepared bus-barwire are evenly distributed along the circumferential direction of the frame 1, and correspond to the positions of the plurality of wiring ends 41 of the motor stator 42, there is no need to reserve a long length of the wiring end 41 to ensure that it can extend to the position of other wiring end 41 and connect with other wiring end 41. This not only shortens the length of the wiring end 41, but also effectively prevents the wiring end 41 from being twisted or confused during the wiring process, thereby reducing the difficulty of wiring.

All the main bodies 21 of the busbars 2 are stacked in the axial direction of the frame 1, and the radial dimensions of the plurality of main bodies 21 can be kept the same. In this way, it is only necessary to arrange the plurality of busbars 2 connected with terminal 3 according to the set stacking mode, as shown in FIG. 16 and FIG. 17. Therefore, it is ensured that all the connecting parts 22 are evenly distributed along the circumferential direction of the frame 1, and the position of the plurality of terminals 3 is correct, as shown in FIG. 18. Subsequently the frame 1 can be processed by integral injection molding. The processing technology is relatively simple, and the structure of the frame 1 is relatively simple.

The plurality of connecting parts 22 of each of the busbars 2 starts from the gap of its main body 21 and is sequentially recorded as the x-th connecting part 22 along the same direction of rotation. For example, counting from the gap of the main body 21 in a clockwise direction, the order is the first connecting part 22, the second connecting part 22, the third connecting part 22, and so on. The plurality of phase busbars are sequentially recorded as the y-th phase busbar along the axial direction of the frame 1, and the first phase busbar is arranged in phase with the neutral busbar 24. That is, count from the phase busbar closest to the neutral busbar 24 in the axial direction, followed by the first phase busbar, the second phase busbar, and so on.

The neutral busbar 24 is used as the benchmark when stacking, and the phase busbar is stacked one-to-one. When stacking the first phase busbar, α-axis angle is generated between the first connecting part 22 and the first connecting part 22 of the neutral busbar 24. Subsequently stack the second phase busbar so that a β-axis angle is generated between its first connecting part 22 and the first connecting part 22 of the first phase busbar. At this time, the plurality of connecting parts 22 of the first phase busbar and the plurality of connecting parts 22 of the second phase busbar respectively occupy the circumferential clearance between several adjacent connecting parts 22 of the neutral busbar 24. For the solution with a third phase busbar or even more phase busbars, the neutral busbar 24 still has a small number of connecting parts 22 that have a large circumferential gap between them. Some parts of the bus-barwire circumferential connecting parts 22 are relatively concentrated, and some are relatively scattered.

Therefore, the remaining phase busbars only needs to distribute the connecting parts 22 in these circumferential gaps to ensure that all the connecting parts 22 are evenly distributed along the circumferential direction of the frame 1 after the assembly is completed. Since there is relatively few wiring ends 41 connected to the phase busbar, as shown in FIG. 1, FIG. 4, and FIG. 7, there are only four connecting parts 22, and there are relatively many wiring ends 41 connected to the neutral busbar 24, as shown in FIG. 13, there are 12 connecting parts 22. Therefore, the number of connecting parts 22 of the phase busbar is also less than the number of connecting parts 22 of the neutral busbar 24, so the rotating of the phase busbar is easier to accurately control, reducing the probability of visual confusion, and helping to improve assembly efficiency.

Wherein, $\alpha=360°/(2\times m\times n+360°)\times K/(m\times n)$, $\beta=360°\times P/(m\times n)$, and $\beta\neq 360°\times Q/n$. Wherein, m×n is the number of grooves of the stator adaptor to the bus-barwire adapter, that is, the total number of coil windings, $360°/(2\times m\times n)$ is half of the axis connection angle of the two adjacent connecting parts 22 of the neutral busbar 24, $360°\times K/(m\times n)$ and $360°\times P/(m\times n)$ are integer multiples of the axis connection angle of the two adjacent connecting parts 22 of neutral busbars 2. $360°/n$ is half of the axis connection angle of the two adjacent connecting parts 22 of the phase busbar, and $360°\times Q/n$ is the integral multiple of the axis connection angle of the two adjacent connecting parts 22 of the phase busbar.

In this way, when the axial connection angle between the first connecting part 22 of the neutral busbar 24 and the first connecting part 22 of the first phase busbar is a, it indicates that the first connecting part 22 of the first phase busbar is located between any two adjacent connecting parts 22 of the neutral busbar 24. Subsequently the first connecting part 22 of the second phase busbar is rotated β relative to the first connecting part 22 of the first phase busbar, it not only ensures that each of the connecting parts 22 of the second phase busbar is located between the two adjacent connecting parts 22 of the neutral busbar 24, but also avoids overlapping with the part of the connecting part 22 of the first phase busbar in the circumferential direction. This ensures that the connecting part 22 of the neutral busbar 24, the connecting part 22 of the first phase busbar, and the connecting part 22 of the second phase busbar are staggered in the circumferential direction.

It is worth noting that the axis connection angle between two connecting parts 22 refers to the vertical connection line between the center of one connecting part 22 and the center axis of the frame, and an angle between the vertical lines of the center of another connecting part 22 and the center axis of the frame. The center of the connecting part 22 refers to the center of the connecting part 22 corresponding to the wiring end of the stator winding, that is: in the projection on the plane perpendicular to the central axis of the busbarwire, the center of the connecting part 22 and the wiring end of the stator winding coincides. For the solution of the shapes and dimensions of all the connecting parts 22 are exactly the same, the axis connection angle between two connecting parts 22 refers to the angle between the vertical line between the same part of the two connecting parts 22 and the central axis of the frame.

In an exemplary embodiment, the material of the busbars 2 is copper, which has good electrical conductivity and relatively low price. In a specific embodiment, the material of the busbars 2 is H65 brass, which is easy to be stamped and formed and has sufficient hardness.

In an exemplary embodiment, the m is 3.

If the m is 3, the number of the busbars 2 is 4, and the number of the terminals is 3. A three-phase motor can be formed through reasonable connection. The three busbars 2 are the phase busbars, which are connected to the same number of the wiring ends to form a U-phase busbar 251, a V-phase busbar 252 and a W-phase busbar 253, and another busbars 2 is the neutral busbar 24, which is connected to another wiring end of all the windings. The first phase busbar adjacent to the neutral busbar 24 is defined as the W-phase busbar 253. Subsequently there are the V-phase busbar 252 and the U-phase busbar 251 in sequence. After the neutral busbar 24, the W-phase busbar 253 and the V-phase busbar 252 are stacked; the neutral busbar 24 has exactly n gaps left and corresponding to n connecting parts 22 of the U-phase busbar 251. Therefore, the n connecting parts 22 of the U-phase busbar 251 can be correspondingly placed in the gap positions.

Furthermore, the axis connection angle γ between the first connecting part 22 of the second phase busbar and the first connecting part 22 of the third phase busbar satisfies: $\gamma = 360° \times P/(m \times n)$ and $\gamma \neq 360° \times Q/n$.

The axis angle between the first connecting part 22 of the second phase busbar and the first connecting part 22 of the third phase busbar is γ, $\gamma = 360° \times P/(m \times n)$ and $\gamma \neq 360° \times Q/n$, therefore, $\gamma = \beta$, the process of stacking the third phase busbar is the same as stacking the second phase busbar, which is beneficial to further improve production efficiency. For example: $\beta = \gamma = 30°$, or $\beta = \gamma = 120°$.

In an exemplary embodiment, the K is 0.

K=0, then $\alpha = 360°/(2 \times m \times n)$, then the first connecting part 22 of the first phase busbar is exactly located between the first two connecting parts 22 of the neutral busbar 24, in this way, the value of α is small, which is conducive to further reducing the difficulty of assembly of the busbars 2, and is conducive to further improving production efficiency.

Alternatively, K can also be 1, 2 or other integers.

In an exemplary embodiment, P and n satisfy: P=n.

P=n, then $\beta = 360°/m$ and $\beta \neq 360° \times Q/n$, which simplifies the calculation method of (3, helps to further reduce the difficulty of assembly of the busbars 2, and helps to further improve production efficiency.

Alternatively, the P may not be equal to n.

In an exemplary embodiment, the n is 4.

The n is 4, that is, the number of stator windings per phase is 4. Alternatively, the n is not limited to 4, and can also be 1, 2, 3, 5 or other values.

The two ends of the main body 21 are record as the first end 211 and the second end 212 respectively. For example, all the main bodies 21 extend in a clockwise direction to form an arc shape, that is, the start end and the end of any one of the main bodies 21 are recorded as the first end 211 and the second end 212 respectively, as shown in FIG. 1, FIG. 4, FIG. 7, FIG. 10 and FIG. 13. The connecting part 22 adjacent to the first end 211 is the first connecting part 22, and the connecting part 22 adjacent to the second end 212 is the n-th connecting part 22. In the process of stacking busbars 2, the first connecting part 22 of the main body 21 of the previous busbars 2 can be used as a reference to rotate the subsequent stacked busbars 2 to quickly obtain the required axis connection angle.

In this way, after the stacking is completed, the axis connection angle between the first connecting part 22 of the first phase busbar and the first connecting part 22 of the neutral busbar 24 is $180°/(m \times n)$, the axis connection angle between the first connecting part 22 of any two adjacent phase busbars is $360°/m$. This arrangement is simple and has strong operability.

For example: when m=3, n=P=4, K=0, $\alpha = 180°/(m \times n) = 15°$, and $\beta = \gamma = 360°/m = 120°$. First stack the W-phase busbar 253 on the neutral busbar 24, so that the axis connection angle between the first end 211 of the W-phase busbar 253 and the first end 211 of the neutral busbar 24 is 15°, as shown in FIG. 16. Subsequently stack the V-phase busbar 252 on the W-phase busbar 253, so that the axis connection angle between the first end 211 of the V-phase busbar 252 and the first end 211 of the W-phase busbar 253 is 120°, as shown in FIG. 17. Finally, stack the U-phase busbar 251 on the V-phase busbar 252, so that the axis connection angle between the first end 211 of the U-phase busbar 251 and the first end 211 of the V-phase busbar 252 is 120°, as shown in FIG. 18.

The plurality of connecting parts 22 are evenly distributed along the circumferential direction of the main body 21, and the first connecting part 22 and the last connecting part 22 are located at both ends of the main body 21, as shown in FIG. 1, FIG. 4, FIG. 7 and FIG. 13.

The plurality of connecting parts 22 are evenly distributed along the circumferential direction of the main body 21, so that the structure of the busbars 2 is more regular, which is convenient for processing and forming; and all the connecting parts 22 of the bus-barwire after assembly can be evenly distributed along the circumferential direction. Since the wiring end 41 of the motor stator winding is generally evenly distributed along the circumferential direction, it maintains a one-to-one correspondence.

At the same time, the first connecting part 22 and the last connecting part 22 are located at both ends of the main body 21, that is, the main body 21 happens to be missing a part between the two connecting parts 22, which not only ensures the reliability of the connection between the main body 21 and the plurality of connecting parts 22, but also shortens the length of the main body 21 as much as possible, which is beneficial to further save raw materials.

For example, when the number of the connecting parts 22 is 4, the arc of the main body 21 is 270°, as shown in FIG. 1, FIG. 4 and FIG. 7; when the number of the connecting parts 22 is 6, the arc of the main body 21 is 300°; when the number of the connecting parts 22 is 12, the arc of the main body 21 is 330°, as shown in FIG. 13.

In addition, this solution also makes the two connecting parts 22 located at both ends of the main body 21 (that is, the first connecting part 22 and the last connecting part 22) clearly distinguishable from the connecting parts 22 of other parts. When stacking the plurality of busbars 2, it can be used as a reference to further improve stacking efficiency, thereby further improving assembly efficiency.

The two ends of the main body 21 are respectively recorded as the first end 211 and the second end 212. For example, all the main bodies 21 extend in a clockwise direction to form an arc shape. That is to say, the start end and the end of any one of the main bodies 21 are recorded as the first end 211 and the second end 212 respectively, as shown in FIG. 1, FIG. 4, FIG. 7, FIG. 10 and FIG. 13. Subsequently the connecting part 22 connected to the first end 211 is the first connecting part 22, and the connecting part 22 connected to the second end 212 is the n-th connecting part 22. In the process of stacking the busbars 2, the first end 211 of the main body 21 of the previous busbars 2 can be used as a reference to rotate the subsequent stacked busbars 2 to quickly obtain the required axis connection angle.

Alternatively, both ends of the main body 21 can also be appropriately extended.

Furthermore, the number of the connecting parts 22 of each of the phase busbars is n, and each of the terminals is connected to the x-th connecting part 22 of the corresponding phase busbar, $x \in [2, n-1]$.

The plurality of terminals 3 corresponds to the plurality of phase busbars one-to-one. The number of connecting parts 22 of each of the phase busbars is n, and the n connecting parts 22 are connected to the n coils of the stator of each phase. Each of the terminals is connected to the x-th connecting part 22 of the corresponding phase busbar. Since the x is greater than or equal to 2 and less than or equal to n−1, the connecting part 22 connected to the terminal is not the connecting part 22 located on both sides of the gap of the main body 21. Compared with the two ends of the main body 21, the strength of another part of the main body 21 is relatively higher, and the probability of deformation is relatively low. Therefore, connecting the terminal to the connecting part 22 of the phase busbar main body 21 away from the gap is beneficial to further improve the position and verticality of the terminal, and further reduce the probability of deformation of the terminal.

In an exemplary embodiment, the x is 2.

The x is 2, the terminal is connected to the second connecting part 22 of the corresponding phase busbar, so the first connecting part 22 of the phase busbar is used as a reference to locate the position of the phase busbar, and the second connecting part 22 is used to connect to the terminal. It is easy to find, which is conducive to further improving production efficiency. Alternatively, the x is not limited to 2, and can also be other values.

In an exemplary embodiment, a plurality of terminals 3 are evenly arranged along the circumferential direction of the bus-barwire, as shown in FIG. 20 and FIG. 24.

In an exemplary embodiment, the plurality of terminals 3 is arranged non-uniformly along the circumferential direction of the bus-barwire.

The plurality of terminals 3 are evenly distributed along the circumferential direction of the bus-barwire, and the structure is relatively regular, which is beneficial to terminal 3 to increase the distance between terminals 3. This ensures the electrical insulation between the terminals 3 and meets the customer's requirements for the terminal 3 to be evenly distributed in the circumferential direction. Alternatively, the plurality of terminals 3 are arranged non-uniformly along the circumferential direction of the bus-barwire, such as concentratedly distributed in an area of the bus-barwire, to meet customer requirements for the non-uniform distribution of terminal 3 along the circumferential direction.

The thickness t of all main bodies 21 is equal, as shown in FIG. 21 and FIG. 22.

The thickness t of all the main bodies 21 is equal, subsequently all the busbars 2 can be made of the same material, which is beneficial to reduce the types of raw materials, facilitates processing and molding, and also helps to save costs.

In an exemplary embodiment, the thickness of the main body 21 is in the range of 0.7 mm-1.0 mm (such as 0.7 mm, 0.8 mm, 0.9 mm, 1.0 mm, etc.).

Alternatively, the thickness t of all the main bodies 21 can also be adjusted as needed.

The spacing t2 between adjacent main bodies 21 is equal.

The spacing between adjacent main bodies 21 is equal, so that the internal structure of the bus-barwire is regular, and the electrical insulation between each busbar 2 is ensured.

In an exemplary embodiment, the spacing between adjacent main bodies 21 is 0.5 mm-3 mm (such as 0.5 mm, 1 mm, 2 mm, 3 mm, etc.).

Alternatively, the spacing t2 between adjacent main bodies 21 can also be adjusted as needed.

In an exemplary embodiment, the spacing t1 between the axial end surfaces of the main body 21 of the plurality of busbars 2 and the axial end surfaces of the frame 1 is smaller than the spacing t2 between adjacent main bodies 21, as shown in FIG. 21 and FIG. 22. In other words, the spacing between the neutral busbar 24 and the axial end surface of the frame 1 and the spacing between the U-phase busbar 251 and the axial end surface of the frame 1 are equal, recorded as t1, then t1<t2. This is beneficial to reduce the longitudinal height of the frame 1, which is beneficial to further reduce the longitudinal dimension of the bus-barwire and further reduce the axial length of the motor.

Alternatively, the spacing between the axial end surfaces of the neutral busbar 24 and the frame 1 and the spacing between the axial end surfaces of the U-phase busbar 251 and the frame 1 can also be adjusted as needed.

Furthermore, all the main bodies 21 have the same width.

The widths of all main the bodies 21 are equal, that is, the dimensions of all the main bodies 21 along the radial direction of the frame 1 are equal, so that after all the main bodies 21 of the busbars 2 are stacked along the axial direction of the frame 1, the inner edges of all the main bodies 21 are located on the same circle, and the outer edges of all the main bodies 21 are also located on the same circle. The structure of the bus-barwire is more regular, which not only facilitates the processing and molding of each of the busbars 2, but also facilitates the processing and molding of the frame 1.

Furthermore, all the main bodies 21 of the phase busbar are the same, as shown in FIG. 1, FIG. 4 and FIG. 7.

All the main bodies 21 of the phase busbar are the same, that is: the shape and dimension are exactly the same, which helps reduce the processing difficulty of the phase busbar and improve production efficiency.

Furthermore, in the projection on a plane perpendicular to the axis of the frame 1, all the main bodies 21 of the busbars 2 are superimposed on each other to form a ring, as shown in FIG. 20.

In the projection on a plane perpendicular to the axis of the frame 1, all the main bodies 21 of the busbars 2 are superimposed on each other to form a ring, that is: all the projections of the main body 21 of the busbar 2 on the plane perpendicular to the axis of the frame 1 are located in the same circle. Since each of the main bodies 21 has a gap, its projection is not a complete circle, and the projections of the plurality of main bodies 21 are superimposed to form a complete circle. This helps to improve the strength of the bus-barwire, and also facilitates the rotation and misalignment of the busbars 2 with each other, ensuring that all the connecting parts 22 are evenly distributed along the circumferential direction of the frame 1.

According to another alternative embodiment, the features of the two previous embodiments can be combined to achieve the combined technical effects of the previous embodiments. Details of this embodiment will not be repeated here for brevity purposes.

In other words, on the basis of last embodiment, furthermore, the frame 1 comprises a ring bracket 11 and a plurality of strip brackets 12. The plurality of strip brackets 12 and the ring bracket 11 are integrally connected, as shown in FIG. 23. All the main bodies 21 of the busbars 2 21 are embedded in the ring bracket 11, as shown in FIG. 21 to FIG. 23. The plurality of strip brackets 12 correspond to the plurality of terminals 3 one-to-one, as shown in FIG. 20, and a part of each of the terminals 3 is embedded in the corresponding strip bracket 12, as shown in FIG. 23 and FIG. 25.

In an exemplary embodiment, the dimension c of the strip bracket 12 along the axial direction of the frame 1 is greater than or equal to half of the dimension c0 of the terminal 3 along the axial direction of the frame 1.

Furthermore, the terminal 3 is connected to one of the connecting parts 22 of the corresponding busbar 2. In the projection of a plane perpendicular to the central axis of the frame 1, the strip bracket 12 is arranged asymmetrically with respect to the terminal 3 in the thickness direction of the terminal 3, as shown in FIG. 20. The dimension d1 of the part close to the corresponding connecting part 22 for connecting the wiring end 41 is smaller than the dimension d2 of the part far away from the corresponding connecting part 22 for connecting the wiring end 41.

Furthermore, the dimension d of one of the strip brackets 12 along the thickness direction of the terminal 3 is different from the dimension d of another strip bracket 12 along the thickness direction of the terminal 3, as shown in FIG. 20.

In an exemplary embodiment, the projection of the terminal 3 on the axial end surface of the frame 1 is a long strip, and the length direction of its projection extends along the radial direction of the frame 1, as shown in FIG. 18, FIG. 20 and FIG. 24.

According to another alternative embodiment, the features of the last embodiment can be combined with the features of the first embodiment or the second embodiments, described previously, to achieve the combined technical effects of these embodiments. Details of this embodiment will not be repeated here for brevity purposes According to this embodiment, the frame 1 comprises a ring bracket 11 and a plurality of strip brackets 12. The plurality of strip brackets 12 and a ring bracket 11 are integrally connected, as shown in FIG. 23. All the main bodies 21 of the busbars 2 are embedded in the ring bracket 11, as shown in FIG. 21 to FIG. 23. The plurality of strip brackets 12 correspond to the plurality of terminals 3 one-to-one, as shown in FIG. 20, and a part of each of the terminals 3 is embedded in the corresponding strip bracket 12, as shown in FIG. 23 and FIG. 25.

In an exemplary embodiment, the dimension c of the strip bracket 12 along the axial direction of the frame 1 is greater than or equal to half of the dimension c0 of the terminal 3 along the axial direction of the frame 1.

Furthermore, the terminal 3 is connected to one of the connecting parts 22 of the corresponding busbar 2. In the projection of a plane perpendicular to the central axis of the frame 1, the strip bracket 12 is arranged asymmetrically with respect to the terminal 3 in the thickness direction of the terminal 3, as shown in FIG. 20. The dimension d1 of the part close to the corresponding connecting part 22 for connecting the wiring end 41 is smaller than the dimension d2 of the part far away from the corresponding connecting part 22 for connecting the wiring end 41.

Furthermore, the dimension d of one of the strip brackets 12 along the thickness direction of the terminal 3 is different from the dimension d of another strip bracket 12 along the thickness direction of the terminal 3, as shown in FIG. 20.

In an exemplary embodiment, the main body 21 has an arc-shaped structure, as shown in FIG. 1, FIG. 4, FIG. 7 and FIG. 13.

Furthermore, the plurality of connecting parts 22 of each of the busbars 2 starts from the gap of its main body 21 and is sequentially recorded as the x-th connecting part 22 along the same rotation direction, and the plurality of phase busbars are sequentially recorded as the y-th phase busbar along the axial direction of the frame, and the first phase busbar is arranged adjacent to the neutral busbar 24.

An axis connection angle $\alpha$ between the first connecting part 22 of the neutral busbar 24 and the adjacent first phase busbar, an axis connection angle $\beta$ between the first connecting part 22 of the first phase busbar and the first connecting part 22 of the adjacent second phase busbar satisfies: $\alpha = 360°/(2 \times m \times n + 360°) \times K/(m \times n)$, $\beta = 360° \times P/(m \times n)$, and $\beta \neq 360° \times Q/n$, the m is the number of the phase busbar, the n is the number of the stator winding of each phase, $K \in [0, (m \times n - 1)]$, $P \in [0, (m \times n - 1)]$, $Q \in [1, m]$.

Wherein, $\alpha = 360°/(2 \times m \times n + 360°) \times K/(m \times n)$, $\beta = 360° \times P/(m \times n)$, and $\beta \neq 360° \times Q/n$. $m \times n$ is the number of grooves of the stator adaptor to the bus-barwire adapter, that is, the total number of coil windings, $360°/(2 \times m \times n)$ is half of the axis connection angle of the two adjacent connecting parts 22 of the neutral busbar 24, $360° \times K/(m \times n)$ and $360° \times P/(m \times n)$ are integer multiples of the axis connection angle of the two adjacent connecting parts 22 of neutral busbar 2. $360°/n$ is half of the axis connection angle of the two adjacent connecting parts 22 of the phase busbar, and $360° \times Q/n$ is the integral multiple of the axis connection angle of the two adjacent connecting parts 22 of the phase busbar.

In an exemplary embodiment, the m is 3.

Furthermore, the axis connection angle $\gamma$ between the first connecting part 22 of the second phase busbar and the first connecting part 22 of the third phase busbar satisfies: $\gamma = 360° \times P/(m \times n)$ and $\gamma \neq 360° \times Q/n$.

In an exemplary embodiment, the K is 0.

In an exemplary embodiment, P and n satisfy: P=n.

In an exemplary embodiment, the n is 4.

The plurality of connecting parts 22 are evenly distributed along the circumferential direction of the main body 21, and the first connecting part 22 and the last connecting part 22 are located at both ends of the main body 21, as shown in FIG. 1, FIG. 4, FIG. 7 and FIG. 13.

Furthermore, the number of the connecting parts 22 of each of the phase busbars is n, and each of the terminals is connected to the x-th connecting part 22 of the corresponding phase busbar, $x \in [2, n-1]$.

In an exemplary embodiment, the x is 2.

According to another alternative embodiment, the main body 21 has a ring structure.

The main body 21 of the busbar 2 has a complete ring structure, which is beneficial to improve the strength of the busbars 2, thereby improving the stability and reliability of the bus-barwire.

In an exemplary embodiment, the projection of the terminal 3 on the axial end surface of the frame 1 is a long strip, and the length of its projection extends along the radial direction of the frame 1, as shown in FIG. 18, FIG. 20 and FIG. 24.

The projection of terminal 3 on the axial end surface of the frame 1 is a long strip, because the terminal 3 is generally a long thin slice and extends along the axial direction of the frame 1. Therefore, the projection of the terminal 3 on the axial end surface of the frame 1 is basically the same as the shape of the cross section of the terminal 3. The length direction of the projection extends along the radial direction of the frame 1, as shown in FIG. 20 and FIG. 24, which makes reasonable use of the radial space of the bus-barwire, which can meet the requirements of customers for the radial arrangement of the terminal 3.

According to another alternative embodiment, the projection of the terminal 3 on the axial end surface of the frame 1 is a long strip, and the length direction of its projection extends along the circumferential direction of the frame 1.

The projection of terminal 3 on the axial end surface of the frame 1 is a long strip, because the terminal 3 is generally a long thin slice and extends along the axial direction of the frame 1. Therefore, the projection of the terminal 3 on the axial end surface of the frame 1 is basically the same as the shape of the cross section of the terminal 3. The length direction of the projection extends along the radial direction of the frame 1, which makes reasonable use of the radial space of the bus-barwire, which can meet the requirements of customers for the radial arrangement of the terminal 3, and is beneficial to reduce the radial size of the busbar.

In any one of the above-mentioned embodiments, in an exemplary embodiment, the thickness t of all main bodies 21 is equal, as shown in FIG. 21 and FIG. 22.

The thickness t of all the main bodies 21 is equal, then all the busbars 2 can be made of the same material, which is beneficial to reduce the types of raw materials, facilitates processing and molding, and also helps to save costs.

In an exemplary embodiment, the thickness t of the busbars 2 is in the range of 0.7 mm-1.0 mm (such as 0.7 mm, 0.8 mm, 0.9 mm, 1.0 mm, etc.).

In an exemplary embodiment, the spacing t2 between adjacent main bodies 21 is equal, as shown in FIG. 21 and FIG. 22.

The interval width between adjacent main bodies 21 is equal, so that the internal structure of the bus-barwire is regular, and the electrical insulation between each busbars 2 is ensured.

In an exemplary embodiment, the interval width t2 between adjacent main bodies 21 is 0.5 mm-3 mm (such as 0.5 mm, 1 mm, 2 mm, 3 mm, etc.).

In an exemplary embodiment, the spacing t1 between the two axial end surfaces of the main body 21 of the plurality of busbars 2 and the axial end surfaces of the frame 1 is smaller than the spacing t2 between adjacent main bodies 21, as shown in FIG. 21 and FIG. 22. In other words, the spacing between the neutral busbar 24 and the axial end surface of the frame 1 and the spacing between the U-phase busbar 251 and the axial end surface of the frame 1 are equal, recorded as t1, then t1<t2. This is beneficial to reduce the longitudinal height of the frame 1, which is beneficial to further reduce the longitudinal dimension of the bus-barwire and further reduce the axial length of the motor.

Alternatively, the spacing between the axial end surfaces of the neutral busbar 24 and the frame 1 and the spacing between the axial end surfaces of the U-phase busbar 251 and the frame 1 can also be adjusted as needed. Furthermore, all the main bodies 21 have the same width.

The widths of all main the bodies 21 are equal, that is, the dimensions of all the main bodies 21 along the radial direction of the frame 1 are equal, so that after all the main bodies 21 of the busbars 2 are stacked along the axial direction of the frame 1, the inner edges of all the main bodies 21 are located on the same circle, and the outer edges of all the main bodies 21 are also located on the same circle. The structure of the bus-barwire is more regular, which not only facilitates the processing and molding of each of the busbars 2, but also facilitates the processing and molding of the frame 1.

Furthermore, all the main bodies 21 of the phase busbar are the same, as shown in FIG. 1, FIG. 4 and FIG. 7.

All the main bodies 21 of the phase busbar are the same, that is: the shape and dimension are exactly the same, which helps reduce the processing difficulty of the phase busbar and improve production efficiency.

Furthermore, in the projection on a plane perpendicular to the axis of the frame 1, all the main bodies 21 of the busbars 2 are superimposed on each other to form a ring, as shown in FIG. 20.

In the projection on a plane perpendicular to the axis of the frame 1, all the main bodies 21 of the busbars 2 are superimposed on each other to form a ring, that is: all the projections of the main body 21 of the busbar 2 on the plane perpendicular to the axis of the frame 1 are located in the same circle. Since each of the main bodies 21 has a gap, its projection is not a complete circle, and the projections of the plurality of main bodies 21 are superimposed to form a complete circle. This helps to improve the strength of the bus-barwire, and also facilitates the rotation and misalignment of the busbars 2 with each other, ensuring that all the connecting parts 22 are evenly distributed along the circumferential direction of the frame 1.

In an exemplary embodiment, the number of the busbars 2 is 4, and the number of the terminals 3 is 3, as shown in FIG. 18, wherein the number of the connecting parts 22 of the three busbars 2 is equal, and the number of the connecting parts 22 of another busbar 2 is the sum of the number of the connecting parts 22 of the other three busbars 2.

Figure 2:
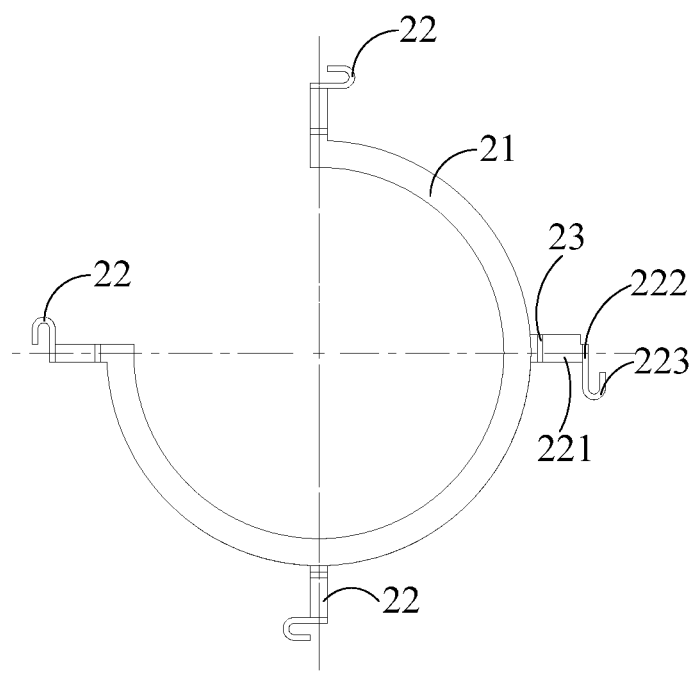
FIG. 2 is a top-view structural schematic diagram of a U-phase busbar shown in FIG. 1.
Figure 3:
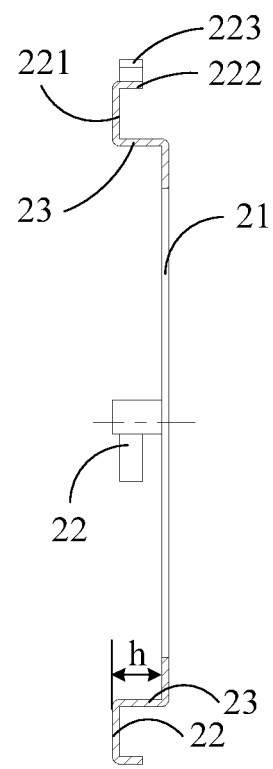
FIG. 3 is a cross-sectional structural schematic diagram of a U-phase busbar shown in FIG. 2.
Figure 5:
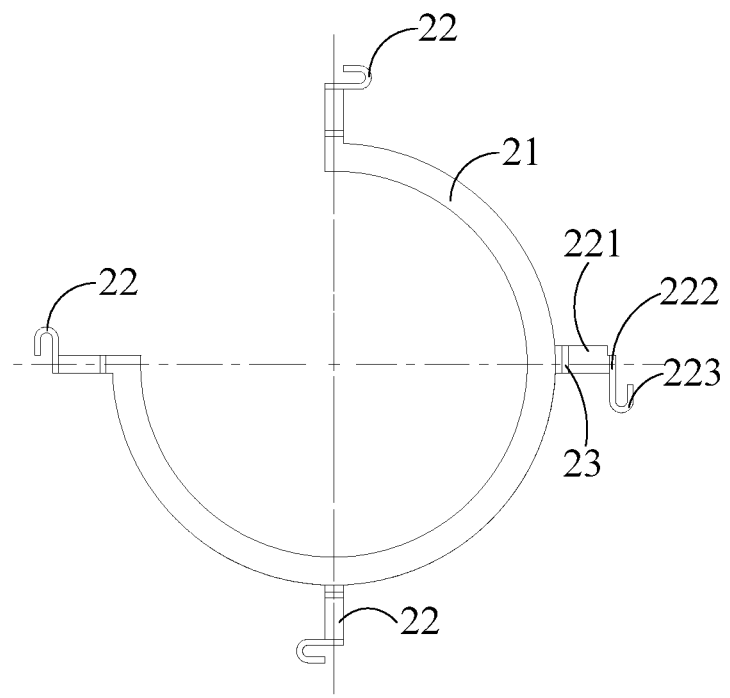
FIG. 5 is a top-view structural schematic diagram of a V-phase busbar shown in FIG. 4.
Figure 6:
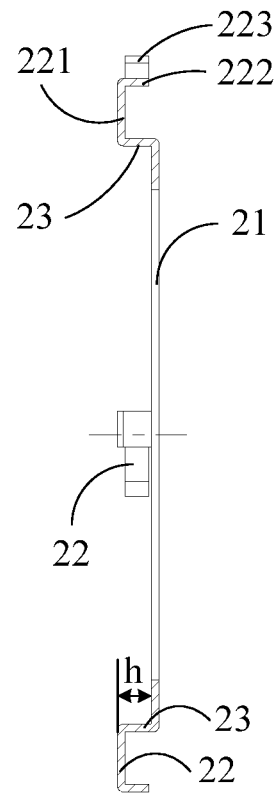
FIG. 6 is a cross-sectional structural schematic diagram of a V-phase busbar shown in FIG. 5.
Figure 14:
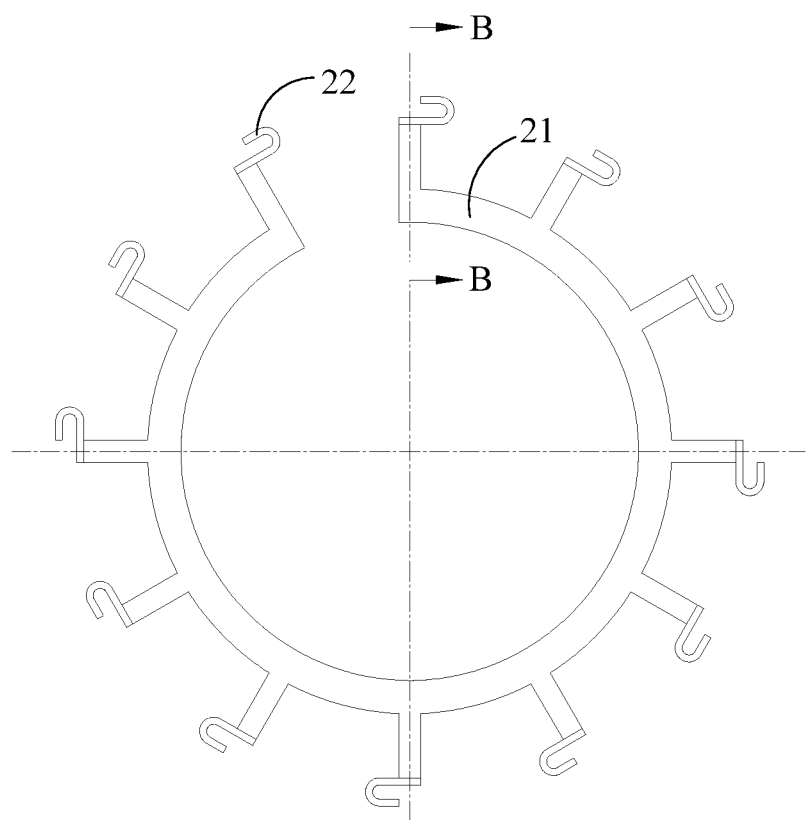
FIG. 14 is a top-view structural schematic diagram of a neutral busbar shown in FIG. 13.
Figure 15:
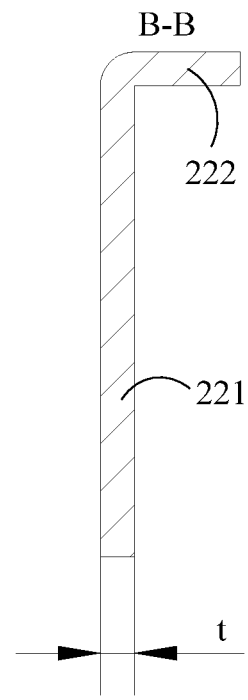
FIG. 15 is a cross-sectional structural schematic diagram of B-B direction in FIG. 14.

The number of the busbars 2 is 4, and the number of the terminals 3 is 3. A three-phase motor can be formed through reasonable connection. The three busbars 2 are phase busbars 2, respectively connected with an equal number of wiring ends 41 to form a U-phase busbar 251 (as shown in FIG. 1 to FIG. 3), a V-phase busbar 252 (as shown in FIG. 4 to FIG. 6) and a W-phase busbar 253 (as shown in FIG. 7 to FIG. 10). Another busbars 2 is the neutral busbar 24 (as shown in FIG. 13 to FIG. 15), which is connected to another wiring end 41 of all windings.

Alternatively, the number of the busbars 2 is not limited to 4, it can also be 3, 5, etc.

Furthermore, the surface of the frame 1 away from the terminal 3 is provided with a hook 13, as shown in FIG. 19, used to snap-fitting the motor stator 42, as shown in FIG. 25.

A hook 13 is set on the surface of the frame 1 away from the terminal 3 to facilitate snap-fitting with stator 42 to prevent the bus-barwire from shaking, tilting, and shifting during the welding process, which is conducive to further improving production efficiency.

The number of the hooks 13 can be multiple, and the plurality of hooks 13 are evenly distributed along the circumferential direction of the frame 1, and the hook 13 and the frame 1 can be integrally formed by injection molding.

Furthermore, the stator 42 is also generally equipped with an injection-molded insulating frame. The insulating frame can be provided with a locking groove adapted to the hook 13, and the hook 13 is directly inserted into the locking groove, as shown in FIG. 25, to achieve the snap-fitting with the stator 42.

According to another alternative embodiment, as shown in FIG. 24 and FIG. 25, a motor comprises a motor body 4 and a bus-barwire as in any one of the above-mentioned embodiments.

Figure 26:
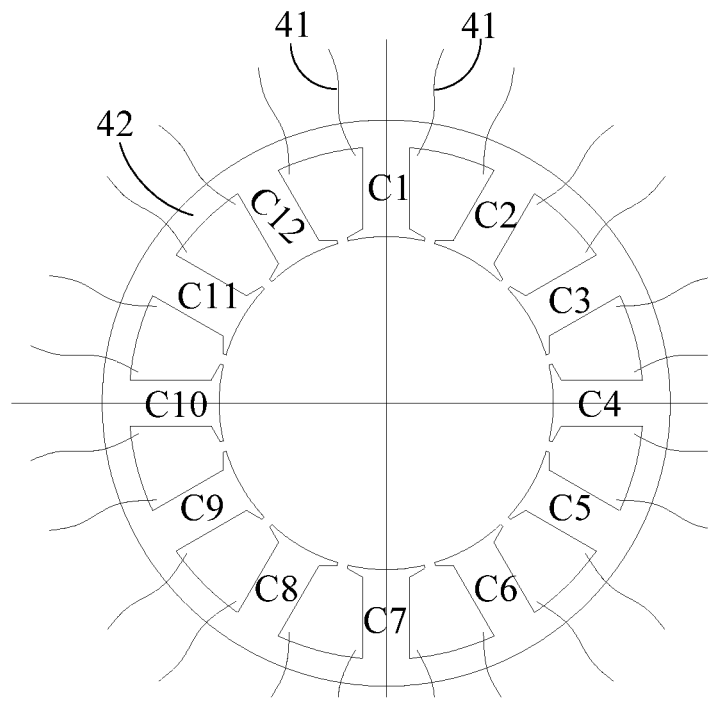
FIG. 26 is a distribution schematic diagram of a motor stator winding and a wiring end provided in some embodiments of the present disclosure.

The motor body 4 comprises a stator 42, and the stator 42 is provided with windings. As shown in FIG. 26, the winding has two wiring ends 41; the connecting part 22 of the bus-barwire is connected to the wiring end 41, as shown in FIG. 25.

The motor provided in this embodiment comprises the bus-barwire of any one of the above-mentioned embodiments, so it has all the beneficial effects of any one of the above-mentioned embodiments, and will not be repeated here.

In an exemplary embodiment, the wiring end 41 is connected to the bus-barwire by resistance welding. Alternatively, other welding methods such as ultrasonic welding or other fixed connection methods can also be used.

Figure 27:
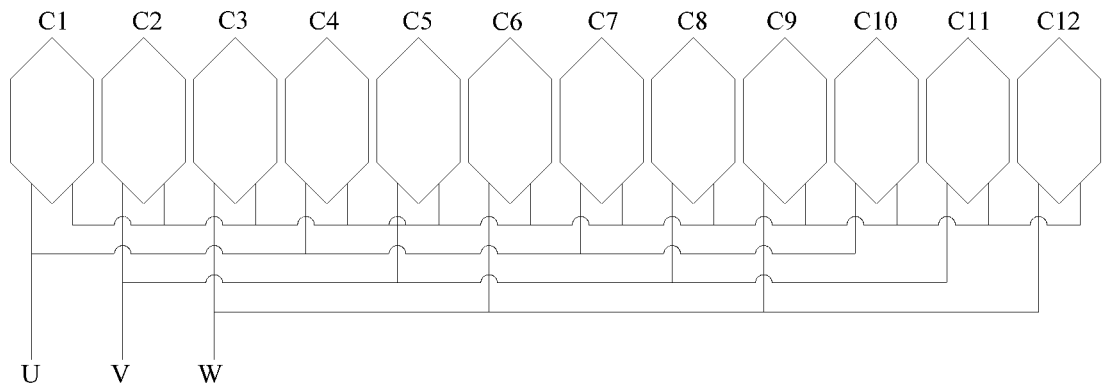
FIG. 27 is a schematic diagram of a winding wiring of the motor shown in FIG. 26.
Figure 28:
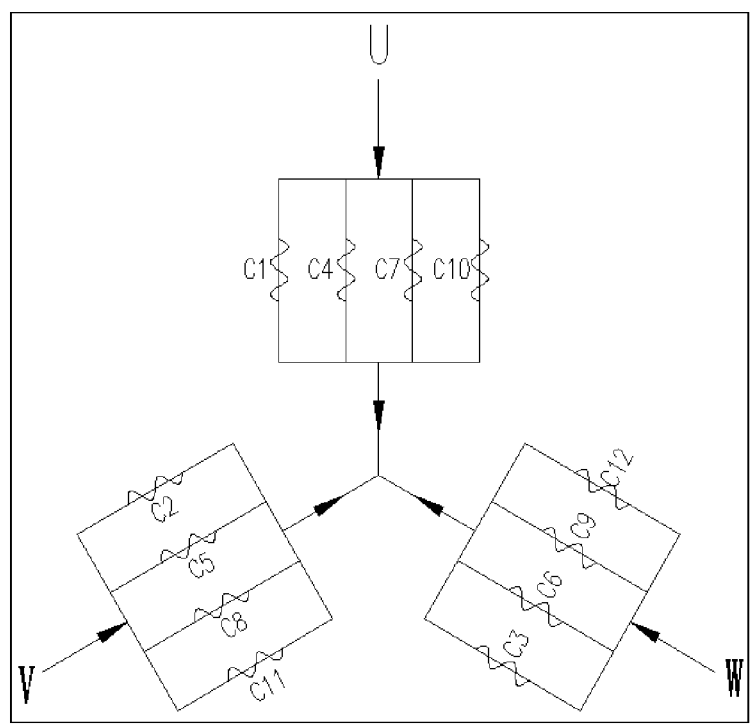
FIG. 28 is a schematic diagram of a circuit connection of the motor shown in FIG. 26.

In an exemplary embodiment, the number of the windings is 12, as shown in FIG. 26 and FIG. 27, and the 12 windings are connected in a star connection, as shown in FIG. 28.

Since 12 windings have 24 joints, the star connection is adopted. It is necessary to connect the 12 wire ends of the starting ends of the 12 windings together, and the ending ends of the C1, C4, C7, and C10 windings, the ending ends of C2, C5, C8, and C11 windings, the ending ends of C3, C6, C9, and C12 windings are connected together, so the wiring method is very complicated. The solution of the present disclosure can effectively reduce the difficulty of wiring, and the wiring method is simple and reliable.

Alternatively, the number of the windings is not limited to 12, but can also be 8, 16, etc.; the connection method of the windings is not limited to the above-mentioned method, and can also be delta connection or other methods.

According to another alternative embodiment, a vehicle comprises a vehicle body and the motor according to the last embodiment, installed in the vehicle body.

The vehicle provided in this embodiment comprises the motor of the last embodiment, so it has all the beneficial effects of any of the above-mentioned embodiments, and will not be repeated here.

Next, take the 8P12S permanent magnet motor as an example for detailed explanation.

For the 8P12S permanent magnet motor, there are a total of 12 teeth, and each tooth is wound to form a winding, and each winding has 1 starting end and 1 ending end. Therefore, there are a total of 24 thread ends for 12 teeth, evenly distributed along the circumferential direction, one every 15°, as shown in FIG. 26. The motor adopts 4-way parallel connection and star connection, as shown in FIG. 28. In this connection method, you need to connect the 12 thread ends of the start ends of the 12 windings together, as shown in FIG. 27 and FIG. 28. And connect the ending ends of the C1, C4, C7, C10 windings, and the ending ends of the C2, C5, C8, C11 windings, and the ending ends of the C3, C6, C9, C12 windings, respectively, and the wiring form is complicated. Therefore, a simple and reliable structure is needed.

The present disclosure aims to design a bus-barwire structure that can meet the wiring requirements of the 8P12S motor, and has the characteristics of less axial space and radial space, simple wiring, and reliable structure.

The bus-barwire comprises an insulation frame 1, a central point copper bar (i.e. the neutral busbar 24), a U-phase copper bar (i.e., the U-phase busbar 251), a V-phase copper bar (i.e. the V-phase busbar 252), a W-phase busbar 253 (i.e. the W-phase busbar 253) and 3 terminals 3. The insulation frame 1 adopts integral injection molding to support the copper bars and the terminal 3, and to insulate between the copper bars, and the insulation frame 1 and the frame 1 of the motor stator 42 are snap-fitted and fixed. The center point copper bar and the U, V, and W phase copper bars are copper bars of equal thickness, which are manufactured by stamping, bending and other processes. The main area is a ring with a gap, and the U-shaped terminal 3 (that is, the connecting part 22 with the U-shaped limit groove 26) from the main area to welded with the copper enameled wire (i.e. wiring end 41). Three terminal 3 are distributed along the circumferential direction at 120°, and they are resistance-welded with the U, V, W phase copper bars, and input current to the motor windings.

This motor can be an 8P12S motor, with a total of 12 teeth. Each tooth is wound with copper wire, forming a total of 12 windings C1-C12, and each of the windings has one starting end wire end and one ending end wire end, as shown in FIG. 26. According to the motor circuit design (as shown in FIG. 27), it is necessary to connect the starting end wires that are evenly distributed along the circumferential direction at 30° to be connected together, which is defined as the center point connection. In addition, the end thread ends that are evenly distributed along the circumferential direction at 30° are divided into three parts. The ending end connection of C1, C4, C7, C10 windings is defined as U-phase connection; the ending end connection of C2, C5, C8, C11 windings is defined as V-phase connection; and the ending end connection of C3, C6, C9, C12 windings is defined as W phase connection.

In order to meet the above-mentioned connection requirements, the central point connection copper bars (as shown in FIG. 13 and FIG. 14) and the U, V, and W phase copper bars (as shown in FIG. 10) are designed. The center point copper bars and the U, V, W phase copper bars are formed by stamping and bending of copper bars of equal thickness. The thickness t of the copper bars is between 0.7-1.0 mm, and the material is H65 brass, which is easy to be stamped and formed and has sufficient hardness. The end of the copper bar is designed as a U-shaped groove, which is convenient to integrate the enameled wire into the U-shaped groove, and subsequently apply resistance welding.

The width direction of the three terminals 3 of this motor is arranged in the radial direction, and the three terminal 3 are separated by 120° from each other. Three terminals 3 are respectively connected to the 3-phase copper bars for resistance welding. In order to meet the requirements of resistance welding, the end of terminal 3 is bent (as shown in FIG. 11), and the welding area of the 3-phase copper bar has been widened (as shown in FIG. 10).

Lay the 4 layers of copper bars on top of each other; the center point copper bar is placed on the bottom layer, and then it is W, V, and U in sequence, as shown in FIG. 16 to FIG. 18. The interval between layers is 0.5 mm-3 mm (e.g., 0.5 mm, 1 mm, 2 mm, 3 mm; it is not limited to this range, and other values can also be used). There is a 15° difference between the first U-shaped groove of the W-layer copper bar and any groove of the central point copper bar, as shown in FIG. 16, and the terminal 3 of the V, U copper bars is separated from the W-phase terminal 3 by 120°, as shown in FIG. 17 and FIG. 18. After being stacked, the overall injection molding is performed, and the shape after injection molding is shown in FIG. 20. The injection molded body completely wraps the 3 terminals 3, the positions of the terminals 3 are good, the verticality is good, and the structure is firm, so that when the controller pin is inserted into the terminals 3, the terminals 3 are not prone to deformation and failure.

Figure 9:
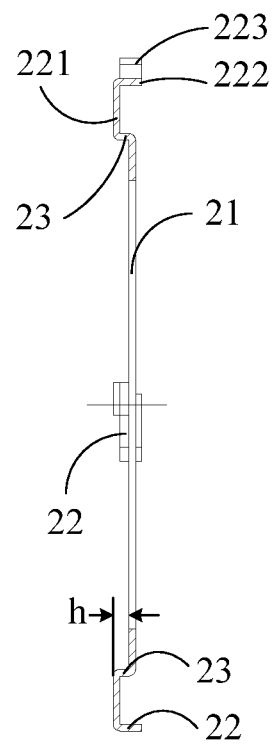
FIG. 9 is a cross-sectional structural schematic diagram of a W-phase busbar shown in FIG. 8.

Since the center point copper bars, U, V, W three-phase copper bars are at different heights, the U-shaped grooves of the copper bars are also bent downward, and the bending height is h, as shown in FIG. 3, FIG. 6 and FIG. 9. The three-phase copper excludes the inconsistency of the height h, and the other parts are the same. After bending, all the U-shaped grooves are at the same height position, as shown in FIG. 19. The advantage of this design is that it takes less space in the height direction, which is conducive to reducing the axial length of the motor; the thread end of the enameled wire has the same length, which is easy to control the peeling position, easy to resistance welding on the production line, and easy to cut off the excess thread end after soldering.

The wiring scheme of the bus-barwire is as follows: the central point copper bars connect the starting end thread ends of the C1-C12 windings; the U-phase copper bars connect the ending end thread ends of the C 1, C4, C7, and C10 windings; the V-phase copper bar connects the ending end thread ends of the C2, C5, C8, and C11 windings; the W-phase copper bars connect the ending end thread ends of C3, C6, C9, and C12 windings; the second connecting parts 22 of the U, V, and W phase copper bars are welded to the terminals 3 in a clockwise direction, as shown in FIG. 10.

The height difference between the layers is 1 mm, and the first U-shaped groove of the W-phase copper bar is 15° away from any U-shaped groove of the central point copper bar.

The height difference between the V-phase copper bar and the W-phase copper bar is 1 mm, and the difference is 120° along the circumferential direction of terminal 3.

The height difference between the U-phase copper bar and the V-phase copper bar is 1 mm and the difference is 120° along the circumferential direction of terminal 3.

Six hooks are made at the end of the frame 1, as shown in FIG. 19, hung on the groove of the frame 1 of the stator 42, as shown in FIG. 25.

In summary, by welding the enameled wire with this bus-barwire structure, the above-mentioned wiring function can be completed. As a result, the bus-barwire has achieved the following technical effects: 1) satisfy the 4-layer parallel star connection; 2) one-piece injection-molding to form the ring frame (i.e. the ring bracket) and the strip frame (i.e. the strip bracket), the structure is firm, the position of the terminal, the verticality are good, it is convenient for ECU installation, and the terminal deformation is small during installation; 3) the U-shaped grooves of the copper bar are roughly evenly distributed along the circumferential direction and distributed at the same height, which is conducive to the resistance welding of the enameled wire, and facilitates the stripping and cutting of the enameled wire on the production line; 4) the axial height of the bus-barwire is small, which is conducive to the optimization of the axial length of the motor; 5) the bus-barwire adopts the U-shaped groove style, which is conducive to the integration of the enameled wire into the U-shaped groove; 6) the radial space is reasonably used to meet the requirements of products requiring radial distribution of terminals.

Figure 34:
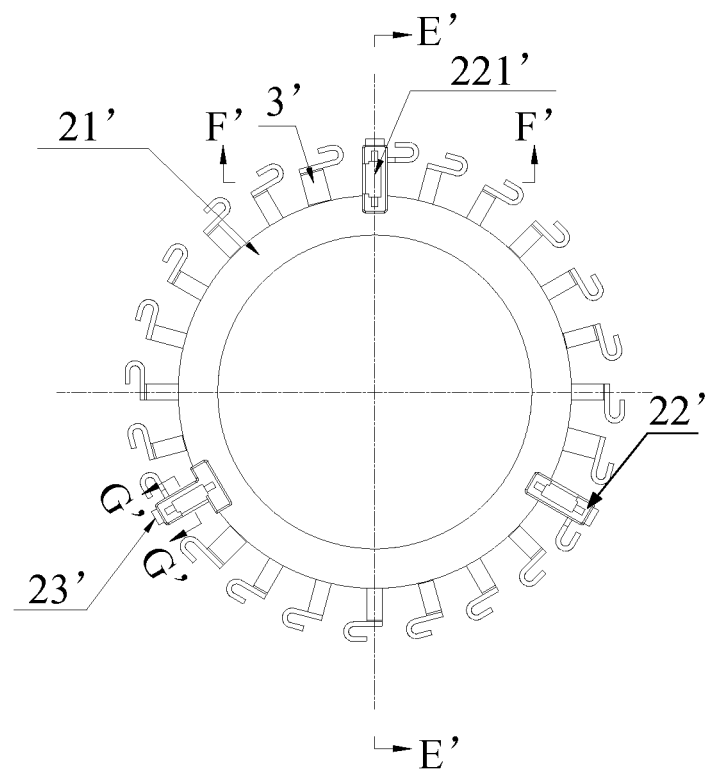
FIG. 34 is a structural schematic diagram of a bus-barwire after removing the terminal provided by some embodiments of the present disclosure.
Figure 44:
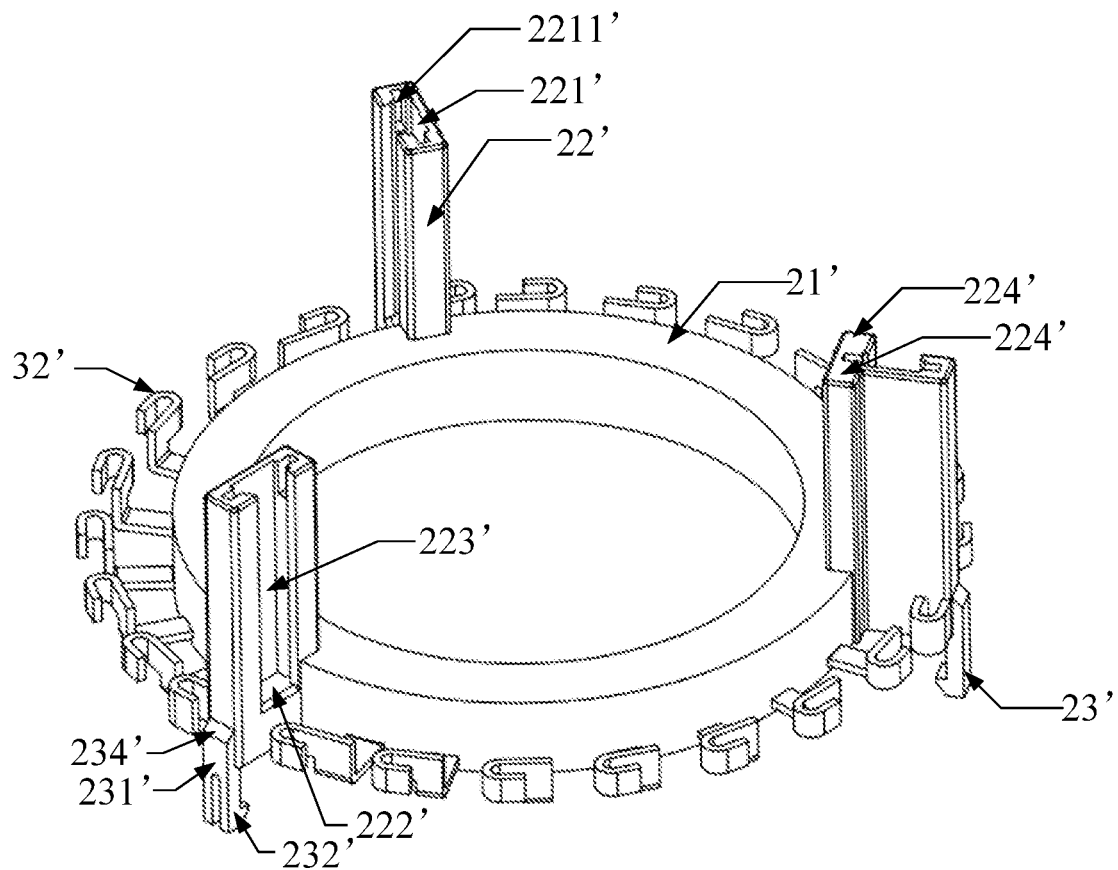
FIG. 44 is a three-dimensional structural schematic diagram of a bus-barwire after removing the terminal provided in some embodiments of the present disclosure.
Figure 45:
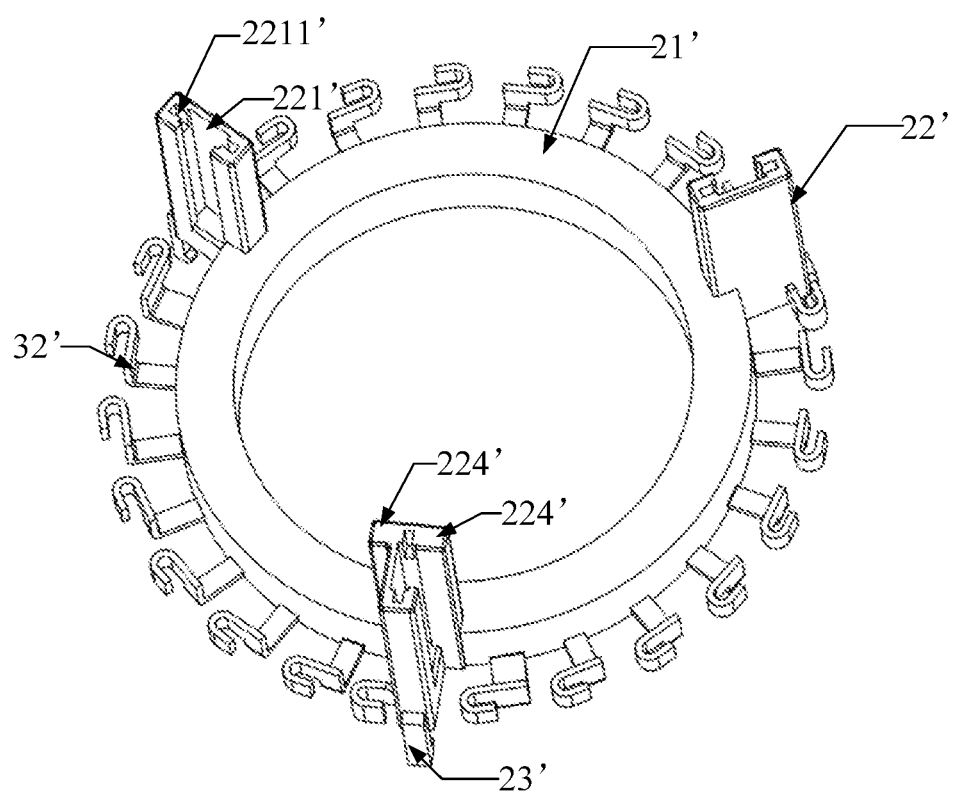
FIG. 45 is a schematic diagram of a structure shown in FIG. 44 from another perspective.

According to another alternative embodiment, as shown in FIG. 34, FIG. 44 and FIG. 45, a bus-barwire body comprises a frame 2' and a plurality of busbars 3'.

Figure 36:
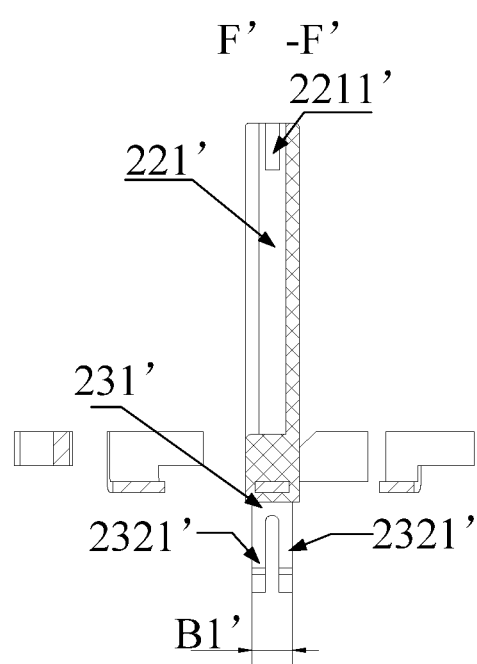
FIG. 36 is a cross-sectional structural schematic diagram of F'-F' direction in FIG. 34.

The frame 2' is an insulator, and the frame 2' has a plurality of hooks 23', as shown in FIG. 44 and FIG. 45. At least one of the hooks 23' is provided with an avoidance groove 233', as shown in FIG. 36 and FIG. 44, the avoidance groove 233' is used to make the hook 23' suitable for elastic deformation.

Each of the busbars 3' comprises a main body 31' embedded in the frame 2' and a plurality of connecting parts 32' connected to the main body 31' and protruding from the frame 2', as shown in FIG. 44 and FIG. 45.

In the bus-barwire body provided by this embodiment, the plurality of hooks 23' are provided on the frame 2' to facilitate the hooking of the bus-barwire and the stator 4' to achieve convenient assembly. At least one hook 23' is opened with an avoidance groove 233' to facilitate the elastic deformation of the hook 23' during the assembly process with stator 4' and reduce the probability of jamming and interference during the assembly process of the hook 23' and the stator 4', thereby reducing assembly difficulty and improve assembly efficiency. At the same time, the hook 23' with avoidance groove 233' will undergo resetting deformation after the assembly is completed, and produce a tight bonding force with the stator 4', which is beneficial to improve the stability after the assembly is completed.

Figure 46:
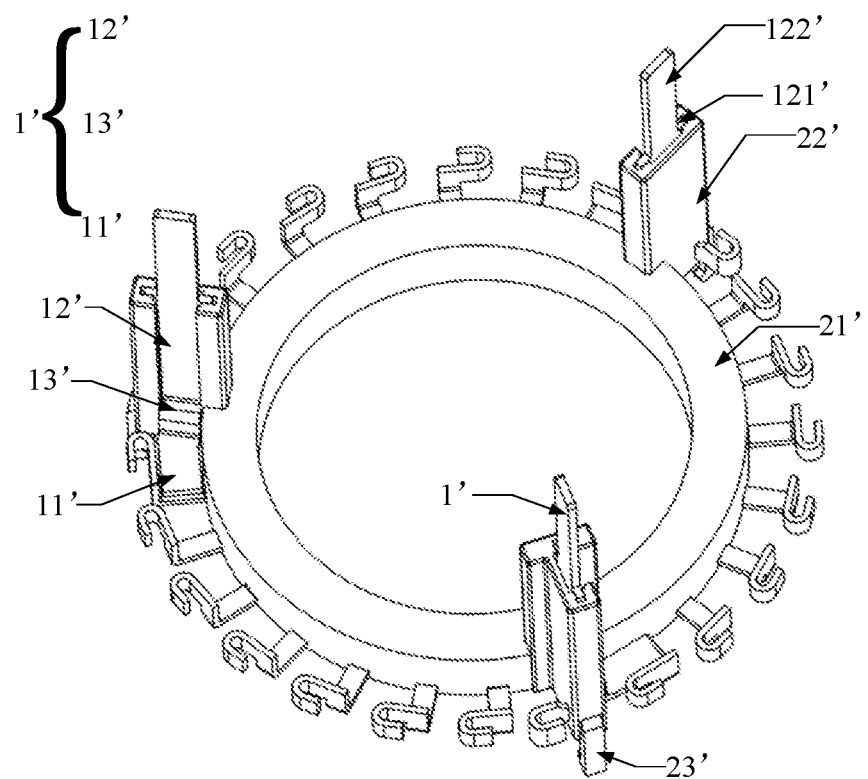
FIG. 46 is a three-dimensional structural schematic diagram of a bus-barwire provided in some embodiments of the present disclosure.

The bus-barwire body comprises a frame 2' and a plurality of busbars 3', the frame 2' is an insulator, and can be molded by injection molding, play a supporting function for the plurality of busbars 3' and the plurality of terminals 1', and isolate the adjacent busbars 3', play an electrical insulation role. The plurality of busbars 3' are conductors, each of the busbars 3' comprises a main body 31' and a plurality of connecting parts 32', and the plurality of connecting parts 32' of each of the busbars 3' is used to connect the wiring ends of the plurality of windings of the motor stator 4' that need to be connected together, and the electrical connection of these wiring ends is realized through the main body 31' to realize the confluence function. The plurality of terminals 1' are connected to the plurality of busbars 3', as shown in FIG. 46, each of the terminals 1' is electrically connected to the wiring end connected to the corresponding busbar 3'. The plurality of terminals 1' are connected to the power female terminal to form an electric circuit, which supplies power to the plurality of windings of the motor stator 4'.

Figure 35:
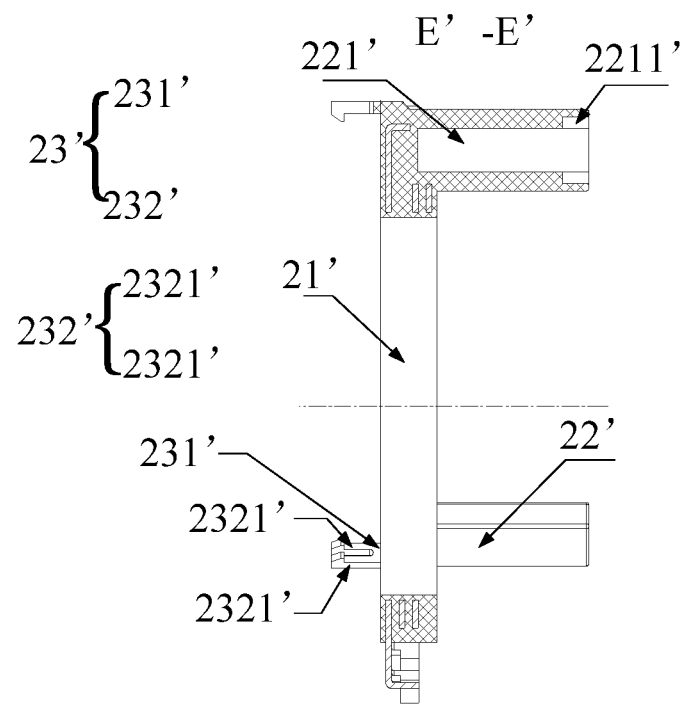
FIG. 35 is a cross-sectional structural schematic diagram of E'-E' direction in FIG. 34.

The hook 23' comprises a fixed part 231' and a hook part 232', as shown in FIG. 35. The fixed part 231' is connected to the frame 2', and the hook part 232' is connected to the fixed part 231'.

The hook part 232' of at least one hook 23' comprises a plurality of elastic buckles 2321' arranged at intervals, as shown in FIG. 35, an avoidance groove 233' is formed between adjacent elastic buckles 2321'.

The hook 23' comprises a fixed part 231' and a hook part 232'. The fixed part 231' is connected to the frame 2' to realize the function of connecting the hook 23' to the frame 2'. The hook part 232' is connected with the fixed part 231' and is used to coordinate with the hook of the stator 4' to realize the hook function. The hook part 232' of at least one hook 23' comprises a plurality of elastic buckles 2321', the plurality of elastic buckles 2321' are arranged at intervals to form an avoidance groove 233', then during the assembly process, the adjacent elastic buckles 2321' can be close to each other under squeezing force, thereby reducing the dimension of the hook 23', which is convenient for the hook 23' to quickly and smoothly realize the hooking cooperation with stator 4'; and after the hooking is completed, the elastic buckle 2321' will reset and deform and fit closely with the stator 4', thus improve connection strength.

In some embodiments, the plurality of elastic buckles 2321' are distributed side by side, as shown in FIG. 35.

The plurality of elastic buckles 2321' are distributed side by side, with simple structure, which is convenient for processing and forming. In addition, the hook 23' is hooked in one direction, and during the assembly process, the hook 23' is mainly manifested as an elastic change in the width direction. At this time, the corresponding matching structure on the stator 4' only needs to set the locking groove 41'; and it can be set at the edge of the stator 4', the structure is simple, and the assembly is more convenient.

In other embodiments, the plurality of elastic buckles 2321' are arranged in a ring shape.

The plurality of elastic buckles 2321' are arranged in a ring shape, and thus the hook 23' forms the form of an elastic buckle, which is hooked in multiple directions, and the hook 23' is mainly shown as a change in thickness during the assembly process. At this time, the corresponding matching structure on the stator 4' needs to be provided with a snap hole, the connection is relatively reliable, and the hook 23' is not easy to come out.

Furthermore, one end of the hook part 232' connected to the fixed part 231' protrudes from the fixed part 231', as shown in FIG. 44, and is connected to the frame 2'.

Compared with the scheme where only the fixed part 231' is connected to the frame 2', the hook part 232' in this scheme is also connected to the frame 2' and has a different connection direction from the frame 2'. This not only increases the connection area between the hook 23' and the frame 2', but also increases the directions of the connection force between the hook 23' and the frame 2'. This further improves the connection strength between the hook 23' and the frame 2', further improves the reliability of the hook 23', and effectively prevents the hook 23' from cracking, breaking or falling off.

According to another alternative embodiment, a bus-barwire body comprises a frame 2' and a plurality of busbars 3'.

The frame 2' is an insulator, and the frame 2' comprises a ring bracket 21' and a plurality of strip brackets 22' connected to the ring bracket 21', as shown in FIG. 31, FIG. 35, FIG. 44 and FIG. 45.

Each of the busbars 3' comprises a main body 31' embedded in the ring bracket 21' and the plurality of connecting parts 32' connected to the main body 31' and protruding from the frame 2', as shown in FIG. 44 and FIG. 45.

Figure 37:
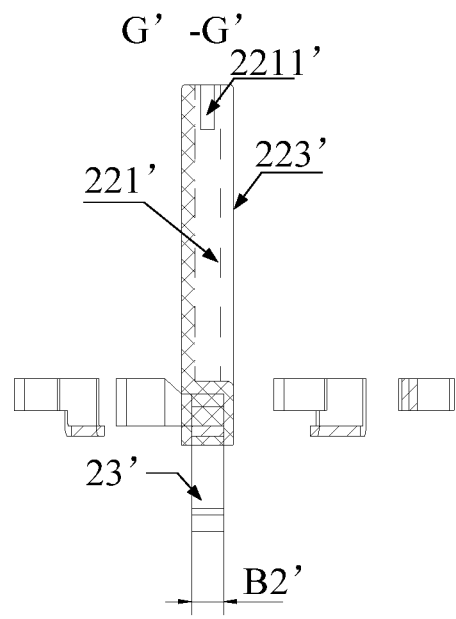
FIG. 37 is a cross-sectional structural schematic diagram of G'-G' direction in FIG. 34.

The strip bracket 22' is provided with a groove 221' for accommodating a part of the terminals 1', as shown in FIG. 30, FIG. 31, FIG. 44 and FIG. 45. The groove 221' is provided with an avoidance gap 223', as shown in FIG. 37 and FIG. 44, the avoidance gap 223' is for one end of the terminal 1' to bend and extend and protrude from the groove 221' to connect to the connecting part 32'. The strip bracket 22' is provided with at least one supporting mating surface 222' for supporting the terminals 1', as shown in FIG. 44 and FIG. 45. At least a part of at least one supporting mating surface 222' is located in the groove 221', as shown in FIG. 44 and FIG. 45, and the connecting part 32', the supporting mating surface 222' and the entrance of the groove 221' are arranged in sequence along the axis of the ring bracket 21'.

The bus-barwire body provided by this embodiment, by adding a supporting mating surface 222' on the strip bracket 22', can provide terminal 1' with a supporting force towards the female end. This prevents the terminal 1' from being excessively deformed when it is mated with the female end, reduces the difficulty of assembly, and improves the assembly yield of the terminal 1'.

The bus-barwire body comprises a frame 2' and a plurality of busbars 3', the frame 2' is an insulator, and can be molded by injection molding, play a supporting function for the plurality of busbars 3' and the plurality of terminals 1', and isolate the adjacent busbars 3', play an electrical insulation role. The plurality of busbars 3' are conductors, each of the busbars 3' comprises a main body 31' and the plurality of connecting parts 32', and the plurality of connecting parts 32' of each of the busbars 3' are used to connect the wiring ends of the plurality of windings of the motor stator that need to be connected together, and the electrical connection of these wiring ends is realized through the main body 31' to realize the confluence function. The plurality of terminals 1' are connected to the plurality of busbars 3', as shown in FIG. 46, each of the terminals 1' is electrically connected to the wiring end connected to the corresponding busbar 3'. The plurality of terminals 1' are connected to the power female terminal to form an electric circuit, which supplies power to the plurality of windings of the motor stator'.

The frame 2' comprises a ring bracket 21' and a strip bracket 22', the ring bracket 21' is used to support the plurality of busbars 3' and ensure the insulation between the plurality of busbars 3', the plurality of ring brackets 22' are used to support the plurality of terminals 1' and ensure the electrical insulation between terminals 1' and other structures. The strip bracket 22' is opened with a groove 221' and the groove 221' is provided with an avoidance gap 223'. After the frame 2' is formed, the terminal 1' can be directly inserted into the groove 221', which is more convenient for assembly. After assembly, both ends of the terminal 1' are located outside the groove 221' and are used to connect the power female terminal and the connecting part 32' respectively. Since the connecting part 32', the supporting mating surface 222' and the entrance of the groove 221' are arranged in sequence along the axial direction of the ring bracket 21', and the avoidance gap 223' allows one end of the terminal 1' to bend and extend and protrude from the groove 221', then which can be connected to connecting part 32'. Therefore, the two ends of the terminal 1' are located on the supporting mating surface 222' along the axial direction of the ring bracket 21', and the structure of the terminal 1' and the supporting mating surface 222' forms a stepped structure on the terminal V. During the assembly process, the supporting mating surface 222' is matched with the support of this part of the terminal 1', so that when it is subsequently plugged into the female end, the part of the terminal 1' located on the supporting mating surface 222' will be supported by the frame 2', which can be effectively prevent terminal 1' from being excessively deformed under pressure.

At the same time, when the terminal 1' is in contact with the supporting mating surface 222' of the strip bracket 22', it indicates that the terminal 1' is assembled in place, so as to realize the assembly of the terminal 1' and the frame 2'. The assembly method is simple, and the operation is convenient. In addition, the cooperation of the corresponding part of the terminal 1' (defined as the supporting surface 131' of the terminal 1') and the supporting mating surface 222' also plays a role in positioning during the assembly process, which can provide a sense of place, prompt the assembly to be in place, and further reduce the difficulty of assembly, and play a certain protective role for the terminal 1' and the frame 2'.

Furthermore, the number of the supporting mating surfaces 222' can be one or multiple, which is equal to the number of the supporting surfaces 131' of terminal 1' and corresponds to one-to-one. For the case where the number of the supporting mating surfaces 222' is one, the supporting mating surface 222' can be completely located in the groove 221'; it can also be partly located in the groove 221' and partly located outside the groove 221'. At this time, the bottom wall of the groove 221' forms a part of the supporting mating surface 222', and another part of the supporting mating surface 222' passes through the avoidance gap 223' and extends out of the groove 221', as shown in FIG. 44. For the case where the number of the supporting mating surfaces 222' is multiple, in addition to the supporting mating surface 222' is set in the groove 221', several supporting mating surfaces 222' can also be set outside the groove 221'. For example, a number of steps are added below the supporting mating surface 222' of FIG. 44 to form a number of supporting mating surfaces 222'.

It can be understood that the power female end is generally provided with a jack, and it is plugged and matched with the terminal 1'. When the terminal 1' is inserted into the jack, the terminal 1' is in physical contact with the power female end, thereby achieving electrical connection. The power female terminal can be set on the motor controller.

The shape of the plug-in part 122' and the jack of the terminal 1' can be designed as required.

Figure 38:
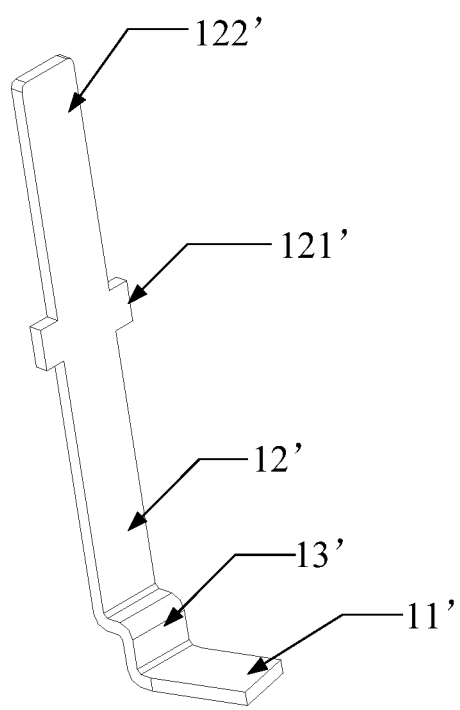
FIG. 38 is a three-dimensional structural schematic diagram of a terminal provided by some embodiments of the present disclosure.

For example, the plug-in part 122' is an ordinary rectangular sheet structure (as shown in FIG. 38), and the jack is a corresponding rectangular hole.

Alternatively, an avoidance groove is provided on the plug-in part 122', so that the plug-in part 122' comprises two inserts arranged side by side and spaced apart from each other, and at the same time, there are convex points on both sides of the width direction of the plug-in part 122', there are grooves or supporting points in the jack. During the process of inserting the terminal 1' into the power female end, the two inserts can be elastically deformed and approach each other, facilitating quick insertion of terminal 1'. When the insert is inserted in place, the convex point is stuck in the corresponding groove, or crosses the corresponding support point and abuts against the support point, which can effectively prevent the terminal 1' from leaving the power female end.

Figure 33:
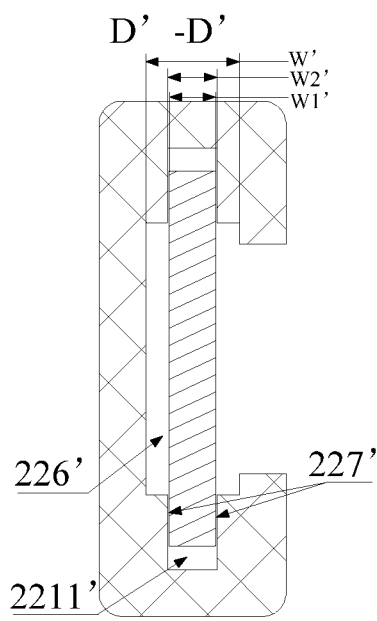
FIG. 33 is a cross-sectional structural schematic diagram of D'-D' direction in FIG. 31.

Furthermore, the width W' of the groove 221' along the thickness direction of the terminal 1' is configured to be greater than the thickness W1' of the terminal 1', as shown in FIG. 33.

Figure 32:
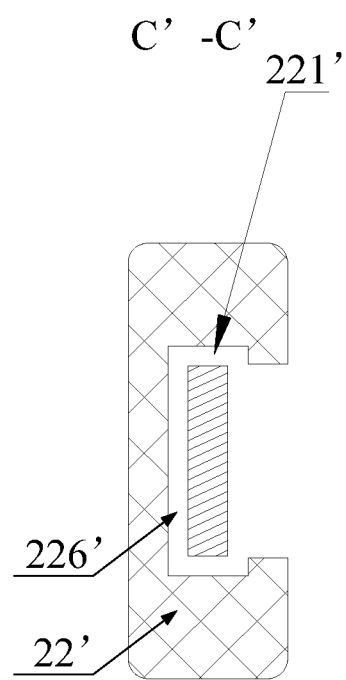
FIG. 32 is a cross-sectional structural schematic diagram of C'-C' direction in FIG. 31.

When the width of the groove 221' in the thickness direction of the terminal 1' is greater than the thickness of the terminal 1', there is a clearance fit between the terminal 1' and the groove 221', as shown in FIG. 32 and FIG. 33, so that the terminal 1' is prone to deformation in the circumferential direction and the radial direction. This makes the terminal 1' have the ability to deform in the circumferential direction and the radial direction, that is, flexibility, and it is also convenient for the terminal 1' to accurately align with the female end opening to meet the assembly requirements of the terminal 1' and the female end.

Figure 31:
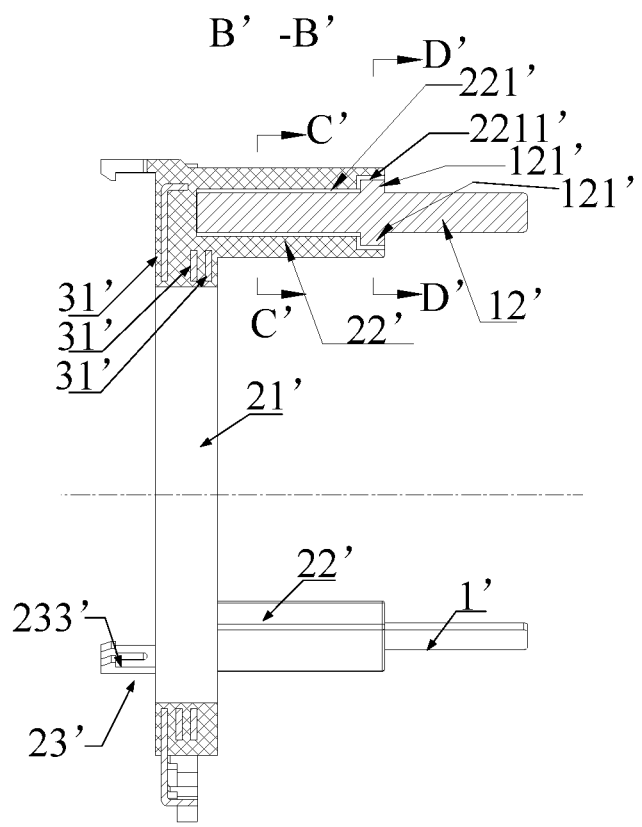
FIG. 31 is a cross-sectional structural schematic diagram of B'-B' direction in FIG. 1.

Furthermore, the entrance of the groove 221' is provided with a limit groove 2211', as shown in FIG. 35, FIG. 44 and FIG. 45, the limit groove 2211' is used to accommodate the supporting protrusion of the terminal 1', as shown in FIG. 31 and FIG. 46.

The limit groove 2211' is provided at the entrance of the groove 221', and the terminal 1' is correspondingly provided with a supporting protrusion. The supporting protrusion will be embedded in the limit groove 2211' during the assembly process. When the terminal 1' is under pressure, the supporting protrusion can play a supporting role, thereby preventing the terminal 1' from instability and deformation due to local stress concentration.

The limit groove 2211' is set on at least one side of the groove 221' along the width direction of terminal 1', as shown in FIG. 44 and FIG. 45.

The limit groove 2211' is set on at least one side of the groove 221' along the width direction of terminal 1', the supporting protrusion is also set on at least one side of the width direction of the terminal 1', so that it is convenient to directly use the method of stamping to integrally form the supporting protrusion and the terminal 1', thereby simplifying the processing technology of the terminal 1'. Furthermore, the limit groove 2211' is symmetrically arranged on both sides of the groove 221' in the width direction of the terminal 1', and the supporting protrusion is symmetrically arranged on both sides of the width direction of the terminal 1'. It is conducive to the balance of force on the terminal 1' and further improves the stability of the terminal 1'.

The width W2' of the limit groove 2211' in the thickness direction of the terminal 1' is configured to be greater than the thickness W1' of the terminal 1', as shown in FIG. 33.

Since the supporting protrusion is generally the same thickness as the terminal 1', when the width of the limit groove 2211' in the thickness direction of the terminal 1' is greater than the thickness of the terminal 1', after the assembly is completed, there is a clearance fit between the supporting protrusion and the limit groove 2211', as shown in FIG. 33. This does not limit the deformation of the terminal 1' in the circumferential direction and the radial direction, which ensures that the terminal 1' has the ability to deform in the circumferential direction and radial direction, that is, flexibility, and it is also convenient for the terminal 1' to accurately align with the female end opening to satisfy the assembly requirements of the terminal 1' and the female terminal.

Furthermore, the width W2' of the limit groove 2211' in the thickness direction of the terminal 1' is configured to be smaller than the width W' of the groove 221' in the thickness direction of the terminal 1', as shown in FIG. 33, FIG. 44 and FIG. 45.

The clearance between the terminal 1' and the groove 221' in the thickness direction of the terminal 1' is recorded as the first clearance 226', and the clearance between the supporting protrusion 121' and the limit groove 2211' in the thickness direction of the terminal 1' is recorded as the second clearance 227'. Since the width of the limit groove 2211' in the thickness direction of the terminal 1' is smaller than the width of the groove 221' in the thickness direction of the terminal 1', when the thickness of the supporting protrusion 121' is equal to the thickness of the terminal 1', the width of the second clearance 227' is less than the width of the first clearance 226', as shown in FIG. 33.

The first clearance 226' is relatively large, which is conducive to better deformation of the terminal 1' in the circumferential, radial and vertical upward directions; while the second clearance 227' is relatively small, which helps prevent the second connection section 12' from bending and unstable deformation when it is under pressure.

In some embodiments, the supporting mating surface 222' is perpendicular to the axis of the ring bracket 21', as shown in FIG. 44 and FIG. 45.

The supporting mating surface 222' is perpendicular to the axis of the ring bracket 21', then the supporting surface 131' of the terminal 1' is also perpendicular to the axis of the ring bracket 21', so that the structures of the terminal 1' and the strip bracket 22' are relatively regular, which is convenient for processing and shaping. At the same time, in this solution, the supporting mating surface 222' provides support for the terminal 1' to be parallel to the mating direction of the terminal 1' and the female end, and the support reliability is high.

In some other embodiments, the supporting mating surface 222' is inclined with respect to the axis of the ring bracket 21'.

The supporting mating surface 222' can also be inclined to the axis of the ring bracket 21'. Similarly, it can also provide a component force parallel to the mating direction of the terminal 1' and the female end to prevent excessive deformation of the terminal 1'.

According to another alternative embodiment, the features of the last two embodiments can be combined to achieve the combined technical features of the last two embodiments. Detailed description of this embodiment will be provided for brevity purposes.

Figure 29:
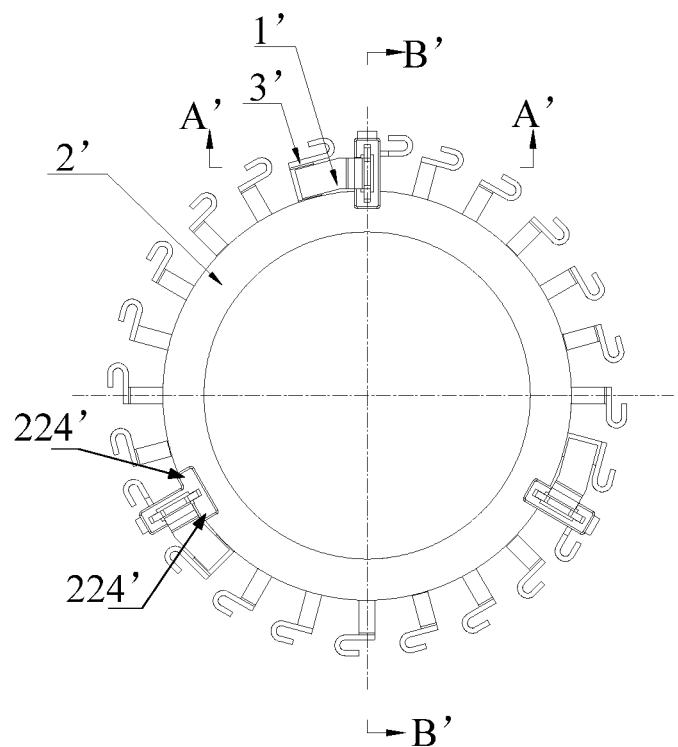
FIG. 29 is a top-view structural schematic diagram of a bus-barwire provided by some embodiments of the present disclosure.

According to this embodiment, at least one strip bracket 22' is provided with a positioning identification portion, and the positioning identification portion comprises a reinforced protrusion 224', as shown in FIG. 29, FIG. 44 and FIG. 45, the reinforced protrusion 224' is connected with the ring bracket 21' and the strip bracket 22'.

Furthermore, the frame 2' is provided with a plurality of hooks 23', as shown in FIG. 44 and FIG. 45. At least one hook 23' is provided with an avoidance groove 233', as shown in FIG. 31 and FIG. 44, the avoidance groove 233' is used to make the hook 23' suitable for elastic deformation.

The hook 23' comprises a fixed part 231' and a hook part 232', as shown in FIG. 35. The fixed part 231' is connected to the frame 2', and the hook part 232' is connected to the fixed part 231'.

The hook part 232' of at least one hook 23' comprises a plurality of elastic buckles 2321' arranged at intervals, as shown in FIG. 35, the avoidance groove 233' is formed between adjacent elastic buckles 2321'.

In some embodiments, the plurality of elastic buckles 2321' are distributed side by side, as shown in FIG. 35.

In some other embodiments, the plurality of elastic buckles 2321' are arranged in a ring.

Furthermore, one end of the hook part 232' connected to the fixed part 231' protrudes from the fixed part 231', as shown in FIG. 44, and is connected to the frame 2'.

In some embodiments of the present disclosure, furthermore, the strip bracket 22' of the frame 2' protrudes outward from the ring bracket 21' along the radial direction of the ring bracket 21', and the hook 23' is connected with the strip bracket 22'. As shown in FIG. 34, FIG. 44 and FIG. 45.

Furthermore, the hook 23' is connected to the radial outer side of the strip bracket 22', as shown in FIG. 44 and FIG. 45.

Figure 47:
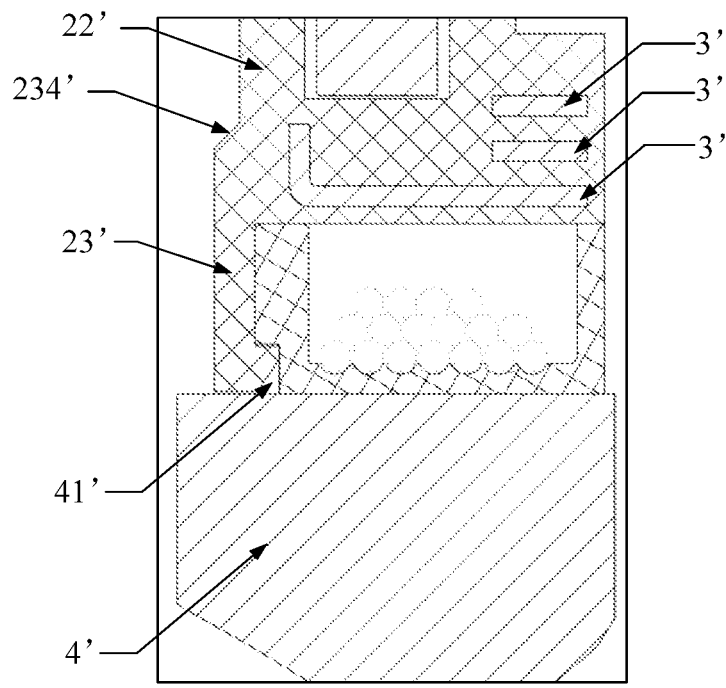
FIG. 47 is a partial cross-sectional structural schematic diagram of a motor provided in some embodiments of the present disclosure.

Furthermore, the top surface 234' of the hook 23' is arranged obliquely with respect to the radial outer side of the strip bracket 22', as shown in FIG. 44 and FIG. 47, and the top surface 234' extends obliquely from the inside to the outside and close to the hook part 232' of the hook 23'.

In the above-mentioned embodiments, the plurality of hooks 23' are used to hook with the locking groove 41' on the stator 4', as shown in FIG. 47. A part of the plurality of hooks 23' is provided with an avoidance groove 233', the hook 23' provided with avoidance groove 233' is recorded as the first hook, and other hooks 23' are recorded as the second hook.

The total width B1' of the first hook>the width B3' of the locking groove 41'>the total width B2' of the second hook, as shown in FIG. 36 and FIG. 37.

According to another alternative embodiment, a bus-barwire comprises the bus-barwire body and the plurality of terminals 1' according to any one of the last three embodiments. The plurality of terminals 1' are connected to the plurality of busbars 3' of the bus-barwire body, one end of the terminal 1' is connected to the connecting part 32', and another end of the terminal 1' is used to connect to the power female end, the terminal 1' is provided with a supporting surface 131', the supporting surface 131' and the supporting mating surface 222' contact and cooperate.

The bus-barwire provided by this embodiment comprises the bus-barwire body of any one of the last three embodiments, so it has all the beneficial effects of above-mentioned embodiments, and will not be repeated here.

Figure 42:
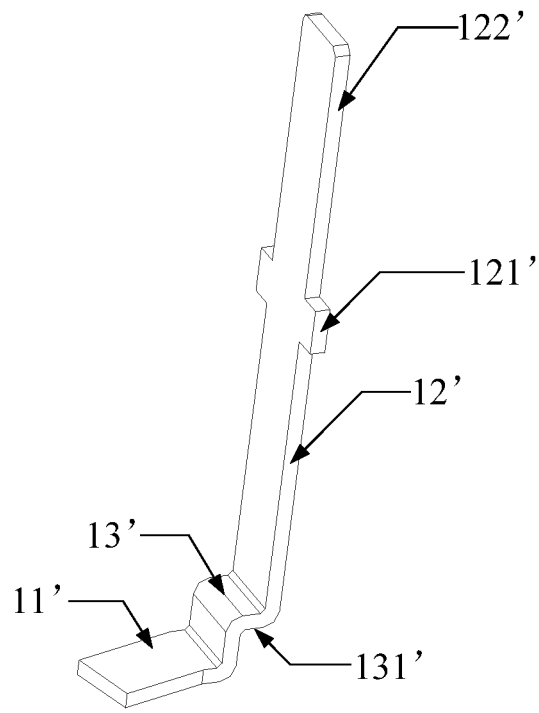
FIG. 42 is a three-dimensional structural schematic diagram of a terminal shown in FIG. 38 from another perspective.
Figure 43:
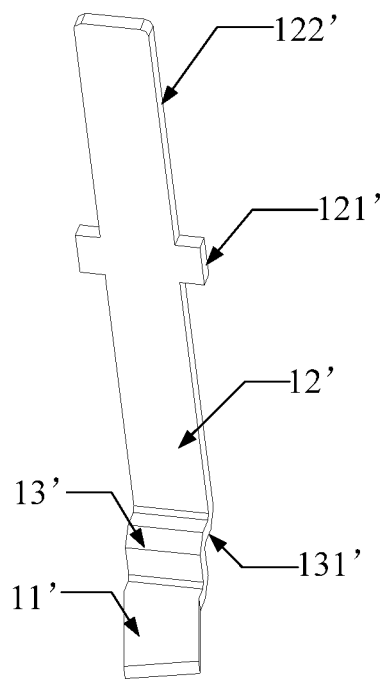
FIG. 43 is a three-dimensional structural schematic diagram of a terminal shown in FIG. 38 from further another perspective.

According to another alternative embodiment, a terminal 1' (as shown in FIG. 38, FIG. 42 and FIG. 43), used for the bus-barwire of the motor 51' is provided. The terminal 1' comprises a first connection section 11', a supporting section 13' and a second connection section 12', as shown in FIG. 30.

Figure 30:
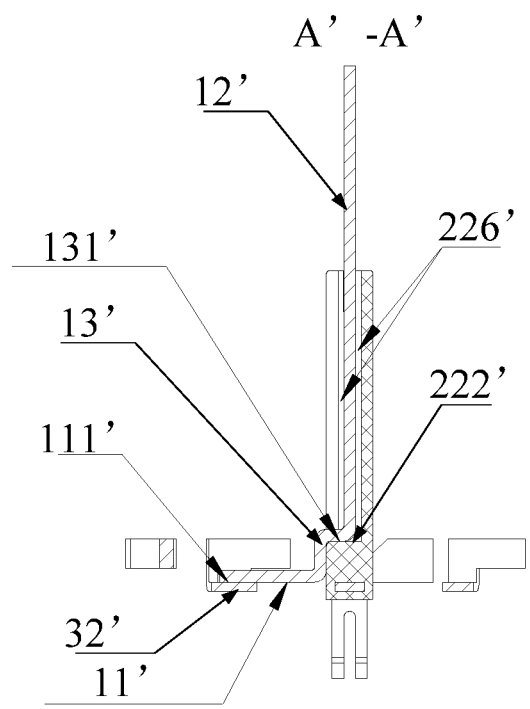
FIG. 30 is a cross-sectional structural schematic diagram of A'-A' direction in FIG. 29.
Figure 39:
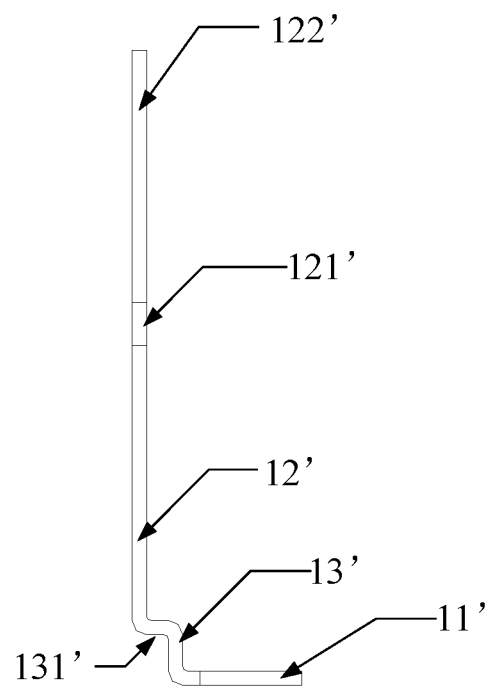
FIG. 39 is a left-view structural schematic diagram of a terminal shown in FIG. 38.

One end of the supporting section 13' is connected to the first connection section 11' at the turning point, as shown in FIG. 30 and FIG. 39, the supporting section 13' is provided with at least one supporting surface 131'.

The second connection section 12' is connected to another end of the supporting section 13' at a turning point, and the second connection section 12' extends away from the first connection section 11'. The first connection section 11', the supporting section 13', and the second connection section 12' are arranged in sequence along the thickness direction of the first connection section 11'.

Along the thickness direction of the first connection section 11', the supporting surface 131' is set on one side of the supporting section 13' away from the second connection section 12', as shown in FIG. 30. So that the supporting surface 131' is suitable to be supported to provide supporting force to at least a part of the supporting section 13' and the second connection section 12'.

The terminal 1' provided by this embodiment, through the addition of the supporting section 13', utilizes the support effect of the supporting surface 131' of the supporting section 13' to provide supporting force for the terminal 1' towards the female end. This prevents the terminal 1' from being too deformed when it is mated with the female end, reduces the difficulty of assembly, and improves the assembly yield of the terminal 1'.

The terminal 1' comprises a first connection section 11', the supporting section 13' and the second connection section 12', the first connection section 11' are used to connect to the connecting part 32' of the busbar 3', and the second connection section 12' is used to connect with the female end. The supporting section 13' is located between the first connection section 11' and the second connection section 12' and plays a supporting role. The supporting section 13' is connected to the first connection section 11' at a turning point, and is also connected to the second connection section 12' at a turning point. The first connection section 11', the supporting section 13' and the second connection section 12' are arranged along the thickness direction of the first connection section 11'. Thus, the supporting section 13' is located at the terminal 1' to form a step structure, and a part of the surface of the step structure forms a supporting surface 131'. During the assembly process, the supporting surface 131' will support and cooperate with the bus-barwire frame 2'. In this way, it is supported by the frame 2' when it is subsequently plugged into the female end, which can effectively prevent the terminal 1' from being excessively deformed under pressure.

It can be understood that the power female end is generally provided with a jack, and it is plugged and matched with the terminal 1'. When the terminal 1' is inserted into the jack, the terminal 1' is in physical contact with the power female end, thereby achieving electrical connection. The power female terminal can be set on the controller of the motor 51'.

The shape of the plug-in part 122' and the jack of the terminal 1' can be designed as required.

For example, the plug-in part 122' is an ordinary rectangular sheet structure (as shown in FIG. 38), and the jack is a corresponding rectangular hole.

Alternatively, an avoidance groove is provided on the plug-in part 122', so that the plug-in part 122' comprises two inserts arranged side by side and spaced apart from each other, and at the same time, there are convex points on both sides of the width direction of the plug-in part 122', there are grooves or supporting points in the jack. During the process of inserting the terminal 1' into the power female end, the two inserts can be elastically deformed and approach each other, facilitating quick insertion of terminal 1'. When the insert is inserted in place, the convex point is stuck in the corresponding groove, or crosses the corresponding support point and abuts against the support point, which can effectively prevent the terminal 1' from leaving the power female end.

Figure 40:
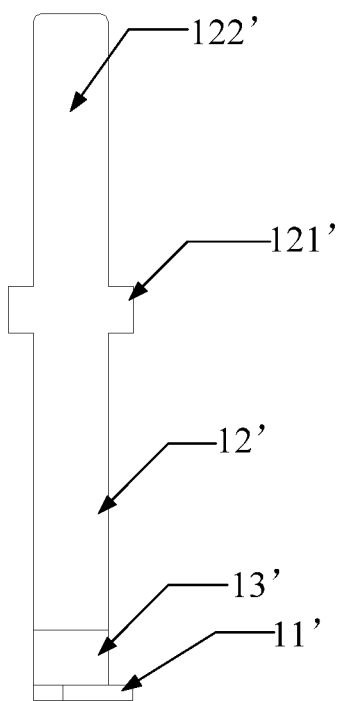
FIG. 40 is a front-view structural schematic diagram of a terminal shown in FIG. 38.

In some embodiments of the present disclosure, furthermore, the second connection section 12' is provided with a supporting protrusion 121', as shown in FIG. 31 and FIG. 40.

The second connection section 12' is provided with a supporting protrusion 121'. When the terminal 1' is under pressure, the supporting protrusion 121' can play a supporting role, thereby preventing the terminal 1' from instability and deformation due to local stress concentration.

Furthermore, the supporting protrusion 121' is provided on at least one side of the width direction of the second connection section 12', as shown in FIG. 31 and FIG. 40.

By arranging the supporting protrusion 121' on at least one side of the width direction of the second connection section 12', it is convenient to directly use the stamping method to be integrally formed with the terminal 1', thereby simplifying the processing technology of the terminal 1'. By symmetrically setting the supporting protrusion 121' on both sides of the width direction of the second connection section 12', it is beneficial to balance the force of the terminal 1' and further improve the stability of the terminal 1'.

In some embodiments of the present disclosure, the supporting surface 131' and the first connection section 11' are parallel to each other, as shown in FIG. 30.

The supporting surface 131' and the first connection section 11' are parallel to each other, and the structure is relatively regular, which is convenient for processing and molding, and also for the processing and molding of the bus-barwire frame 2'. At the same time, in this solution, the supporting force received by the supporting surface 131' can be parallel to the mating direction with the female end, and the supporting reliability is high.

Furthermore, the supporting section 13' comprises at least one L-shaped section, as shown in FIG. 30 and FIG. 39.

The supporting section 13' comprises at least one L-shaped section, and the supporting section 13' has a right-angle step structure, and the supporting surface 131' can be parallel to the first connection section 11'. Since the first connection section 11' and the second connection section 12' are generally perpendicular to each other, when the supporting section 13' comprises one L-shaped section, the terminal 1' has a double-L shape as a whole, which is stable and simple in structure. When the supporting section 13' comprises two L-shaped sections, the terminal 1' has a three-L shape as a whole; when the supporting section 13' comprises a plurality of L-shaped sections, the same applies, and so on.

In some other embodiments of the present disclosure, the supporting surface 131' is inclined with respect to the first connection section 11'.

The supporting surface 131' can also be arranged at an angle relative to the first connection section 11', and can also provide a component force parallel to the mating direction with the female end to prevent excessive deformation of the terminal 1'.

Furthermore, the supporting section 13' can also be an inclined section, and the supporting surface 131' can be inclined relative to the first connection section 11'. Or the supporting section 13' can also comprise a plurality of inclined sections, as long as it has a supporting surface 131' that can support the terminal 1'.

In any one of the above-mentioned embodiments, the first connection section 11' and the second connection section 12' are perpendicular to each other, as shown in FIG. 30 and FIG. 39, the first connection section 11' is provided with a welding surface 111' and the second connection section 12' is provided with a plug-in part 122' (as shown in FIG. 38, FIG. 42 and FIG. 43).

The first connection section 11' and the second connection section 12' are perpendicular to each other, and the first connection section 11' and the second connection section 12' are respectively provided with a welding surface 111' and a plug-in part 122', which is convenient for the first connection section 11' to be connected to the connecting part 32' of the busbar 3' by welding, and it is also convenient for the second connection section 12' to be connected to the female end.

By defining the direction of the female end inserted into the terminal 1' as the downward direction, during the assembly process, the terminal 1' is only subject to the constraint of the welding position. When the terminal 1' is lifted upward, the welding point and the action point of the pulling force are not in the same line, so a moment (the force multiplied by the force arm) will be generated. As a result, the terminal 1' is easily deformed under tension (that is, the terminal 1' has the ability to deform upwards), which facilitates reasonable adjustment of the relative position of the terminal 1' and the female end. When the terminal 1' is under downward pressure, the supporting surface 131' is supported upward, making the terminal 1' difficult to deform and preventing the terminal 1' from deforming downwards.

It is worth noting that the female end groove and the terminal 1' have an interference fit. Therefore, when subjected to downward pressure, the terminal 1' must not be deformed; otherwise the terminal 1' cannot be inserted into the female end groove. Due to the influence of tolerance, when the female end groove is mated with the terminal 1', precise positioning cannot be guaranteed. Usually, the only way to ensure that the mating can be completed is setting the guide on the female end or the terminal 1'. Therefore, the terminal 1' has the ability to deform in the vertical upward direction, that is, flexibility, which facilitates the accurate alignment of the terminal 1' and the female end opening to meet the assembly requirements of the terminal 1' and the female end.

Figure 41:
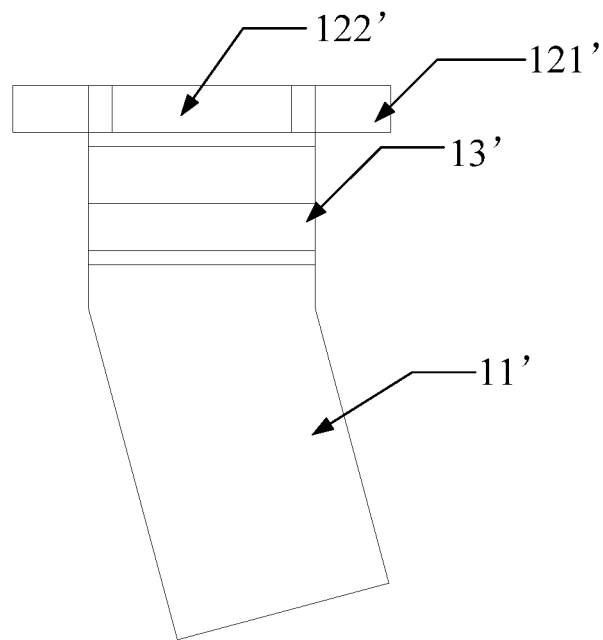
FIG. 41 is a top-view structural schematic diagram of a terminal shown in FIG. 38.

In some embodiments, furthermore, relative to one end of the second connection section 12' connected to the supporting section 13', the first connection section 11' extends obliquely along the circumferential direction of the bus-barwire, as shown in FIG. 41.

In this solution, the extension direction of the first connection section 11' is not vertically arranged relative to one end of the second connection section 12' connected to the supporting section 13', but extends obliquely along the circumferential direction of the bus-barwire. This is beneficial to extend the length of the first connection section 11', which ensures that the first connection section 11' can have sufficient contact surface with the corresponding connecting part 32' of the bus-barwire to ensure a reliable connection. It is also beneficial to extend the length of the force arm when the terminal 1' is under force, and is beneficial to improve the flexible deformation ability of the terminal 1', and it is convenient to rationally design the length and shape of the supporting section 13' according to needs to optimize product performance.

According to another alternative embodiment, a bus-barwire, as shown in FIG. 29, FIG. 34 and FIG. 46, comprises a frame 2', a plurality of busbars 3' and a plurality of terminals 1'.

The frame 2' is an insulator, and the frame 2' is provided with a supporting mating surface 222', as shown in FIG. 30, FIG. 44 and FIG. 45.

Each of the busbars 3' comprises a main body 31' embedded in the frame 2' and the plurality of connecting parts 32' connected to the main body 31' and protruding from the frame 2', such as FIG. 30 and FIG. 31.

The plurality of terminals 1' are connected with the plurality of busbars 3', and the first connection section 11' of the terminal 1' is connected with the connecting part 32', as shown in FIG. 30. The second connection section 12' of the terminal 1' is used to connect the power female end, and the supporting surface 131' of the terminal 1' is in contact with the supporting mating surface 222'.

The bus-barwire provided by this embodiment can use the connecting parts 32' of the plurality of busbars 3' to connect each of the wiring ends of the plurality of windings of the stator 4' of the motor 51'. Use the good electrical conductivity of the busbar 3' to realize the electrical connection of the corresponding wiring end, without directly connecting the corresponding wiring end, thus reducing the wiring difficulty, facilitating the efficient and fast operation of the production line, and improving the production efficiency of the product.

The bus-barwire comprises a frame 2', a plurality of busbars 3' and a plurality of terminals 1'. The frame 2' is an insulator, which can be molded by injection molding, supporting the plurality of busbars 3' and the plurality of terminals 1', and isolating the adjacent busbars 3' to provide electrical insulation. The plurality of busbars 3' are conductors, each of the busbars 3' comprises a main body 31' and a plurality of connecting parts 32', and the plurality of connecting parts 32' of each of the busbars 3' are used to connect the wiring ends of the plurality of windings of the motor stator 4' that need to be connected together, and the electrical connection of these wiring ends is realized through the main body 31' to realize the confluence function. The plurality of the terminals 1' are connected to the plurality of busbars 3', and each of the terminals 1' is electrically connected to the wiring end of the corresponding busbar 3'.

The plurality of the terminals 1' are connected to the power female end to form an electric circuit, which supplies power to the plurality of windings of the stator 4' of the motor 51'.

At the same time, because the bus-barwire of this solution comprises the terminal 1' of any one of the above-mentioned embodiments, it has all the beneficial effects of any one of the above-mentioned embodiments, and will not be repeated here.

In other words, furthermore, the frame 2' comprises a ring bracket 21' and a plurality of strip brackets 22' integrally connected with the ring bracket 21', as shown in FIG. 31, FIG. 35, FIG. 44 and FIG. 45. All the main bodies 31' of the busbars 3' are embedded in the ring bracket 21', the plurality of strip brackets 22' and the plurality of terminals 1' correspond one-to-one, and a part of the second connection section 12' of each of the terminals 1' is embedded in the corresponding strip bracket 22', as shown in FIG. 46.

Furthermore, the strip bracket 22' is provided with a groove 221', as shown in FIG. 30, FIG. 31, FIG. 44 and FIG. 45. The terminal 1' is mated with the groove 221'. The groove 221' is provided with an avoidance gap 223', as shown in FIG. 37 and FIG. 44, the avoidance gap 223' is used to avoid the supporting section 13' and the first connection section 11' of the terminal 1'. The strip bracket 22' is provided with at least one supporting mating surface 222', and at least a part of the at least one supporting mating surface 222' is located in the groove 221'.

Furthermore, the terminal 1' is in clearance fit with the groove 221', as shown in FIG. 32 and FIG. 33.

Furthermore, the entrance of the groove 221' is provided with a limit groove 2211', as shown in FIG. 35, FIG. 44 and FIG. 45, the limit groove 2211' is used to accommodate the supporting protrusion 121' of the terminal 1', as shown in FIG. 31 and FIG. 46.

The supporting protrusion 121' is in clearance fit with the limit groove 2211', as shown in FIG. 33.

The clearance between the terminal 1' and the groove 221' in the thickness direction of the terminal 1' is recorded as the first clearance 226', and the clearance between the supporting protrusion 121' and the limit groove 2211' in the thickness direction of the terminal 1' is recorded as the second clearance 227', the width of the second clearance 227' is less than the width of the first clearance 226', as shown in FIG. 33.

Furthermore, at least one strip bracket 22' is provided with a positioning identification portion, and the positioning identification portion comprises a reinforced protrusion 224', as shown in FIG. 29, FIG. 44 and FIG. 45, the reinforced protrusion 224' and the ring bracket 21' connect with the strip bracket 22'.

In some embodiments of the present disclosure, furthermore, the frame 2' is provided with a plurality of hooks 23', as shown in FIG. 44 and FIG. 45. At least one of the hooks 23' is opened with an avoidance groove 233', as shown in FIG. 31 and FIG. 44, the avoidance groove 233' is used to make the hook 23' suitable for elastic deformation.

The hook 23' comprises a fixed part 231' and a hook part 232', as shown in FIG. 35. The fixed part 231' is connected to the frame 2', and the hook part 232' is connected to the fixed part 231'.

The hook part 232' of at least one of the hooks 23' comprises a plurality of elastic buckles 2321' arranged at intervals, as shown in FIG. 35, the avoidance groove 233' is formed between adjacent elastic buckles 2321'.

In some embodiments, the plurality of elastic buckles 2321' are distributed side by side, as shown in FIG. 35.

In some other embodiments, the plurality of elastic buckles 2321' are arranged in a ring.

Furthermore, one end of the hook part 232' connected to the fixed part 231' protrudes from the fixed part 231', as shown in FIG. 44, and is connected to frame 2'.

In some embodiments of the present disclosure, furthermore, the strip bracket 22' of the frame 2' protrudes outward from the ring bracket 21' along the radial direction of the ring bracket 21', and the hook 23' is connected to the strip bracket 22', as shown in FIG. 34, FIG. 44 and FIG. 45.

Furthermore, the hook 23' is connected to the radial outer side of the strip bracket 22', as shown in FIG. 44 and FIG. 45.

Furthermore, the top surface 234' of the hook 23' is arranged obliquely with respect to the radial outer side of the strip bracket 22', as shown in FIG. 44 and FIG. 47. And the top surface 234' extends obliquely from the inside to the outside toward the hook part 232' of the hook 23'.

In the above-mentioned embodiments, the plurality of hooks 23' are used for hooking with the locking groove 41' on the stator 4', as shown in FIG. 47. A part of the plurality of hooks 23' is provided with an avoidance groove 233', the hook 23' opened with avoidance groove 233' is recorded as the first hook, and other hooks 23' are recorded as the second hook.

The total width B1' of the first hook>the width B3' of the locking groove 41'>the total width B2' of the second hook, as shown in FIG. 36 and FIG. 37.

According to another alternative embodiment, as shown in FIG. 38, FIG. 42 and FIG. 43, the terminal 1' comprises a first connection section 11', a supporting section 13' and a second connection section 12', as shown in FIG. 30.

One end of the supporting section 13' is connected to the first connection section 11' at the turning point, as shown in FIG. 30 and FIG. 39, the supporting section 13' is provided with at least one supporting surface 131'.

The second connection section 12' is connected to another end of the supporting section 13' at a turning point, and the second connection section 12' extends away from the first connection section 11'. The first connection section 11', the supporting section 13', and the second connection section 12' are arranged in sequence along the thickness direction of the first connection section 11'.

Along the thickness direction of the first connection section 11', the supporting surface 131' is set on one side of the supporting section 13' away from the second connection section 12', as shown in FIG. 30. So that the supporting surface 131' is suitable to be supported to provide supporting force to at least a part of the supporting section 13' and the second connection section 12'.

Furthermore, the second connection section 12' is provided with a supporting protrusion 121', as shown in FIG. 31 and FIG. 40.

Furthermore, the supporting protrusion 121' is provided on at least one side of the width direction of the second connection section 12', as shown in FIG. 31 and FIG. 40.

In some embodiments of the present disclosure, the supporting surface 131' and the first connection section 11' are parallel to each other, as shown in FIG. 30.

Furthermore, the supporting section 13' comprises at least one L-shaped section, as shown in FIG. 30 and FIG. 39.

In some other embodiments of the present disclosure, the supporting surface 131' is inclined with respect to the first connection section 11'.

In any one of the above-mentioned embodiments, the first connection section 11' and the second connection section 12' are perpendicular to each other, as shown in FIG. 30 and FIG. 39, the first connection section 11' is provided with a welding surface 111' and the second connection section 12' is provided with a plug-in part 122' (as shown in FIG. 38, FIG. 42 and FIG. 43).

In some embodiments, furthermore, relative to one end of the second connection section 12' connected to the supporting section 13', the first connection section 11' extends obliquely along the circumferential direction of the busbarwire, as shown in FIG. 41.

In some embodiments, the strip bracket 22' is provided with a groove 221', as shown in FIG. 30, FIG. 31, FIG. 44 and FIG. 45. The terminal 1' is mated with the groove 221'. The groove 221' is provided with an avoidance gap 223', as shown in FIG. 37 and FIG. 44, the avoidance gap 223' is used to avoid the supporting section 13' and the first connection section 11' of the terminal 1'. The strip bracket 22' is provided with at least one supporting mating surface 222', and at least a part of the at least one supporting mating surface 222' is located in the groove 221'.

The strip bracket 22' is provided with a groove 221', and the groove 221' has an avoidance gap 223', which ensures that the terminal 1' can be directly inserted into the groove 221' after the frame 2' is formed. When the supporting surface 131' of the terminal 1' is in contact with the supporting mating surface 222' of the strip bracket 22', it indicates that the terminal 1' is assembled in place, thus realizing the assembly of the terminal 1' and the frame 2'. The assembly method is simple, and the operation is convenient. In addition, the supporting surface 131' and the supporting mating surface 222' also play a role in positioning during the assembly process. They can provide a sense of in place, prompt the assembly to be in place, further reduce the difficulty of assembly, and also protects the terminal 1' and the frame 2' to a certain extent.

Furthermore, the terminal 1' is in clearance fit with the groove 221', as shown in FIG. 32 and FIG. 33.

The terminal 1' is in clearance fit with the groove 221', so that the terminal 1' is prone to deformation in the circumferential direction and the radial direction. This enables the terminal 1' to have the ability to deform in the circumferential and radial directions, that is, flexibility, and it is also convenient for the terminal 1' to accurately align with the female end opening to meet the assembly requirements of the terminal 1' and the female end.

Furthermore, the entrance of the groove 221' is provided with a limit groove 2211', as shown in FIG. 35, FIG. 44 and FIG. 45, the limit groove 2211' is used to accommodate the supporting protrusion 121' of the terminal 1', as shown in FIG. 31 and FIG. 46.

The limit groove 2211' at the entrance of the groove 221' cooperates with the supporting protrusion 121' of the terminal 1' to support the terminal 1', thereby preventing terminal 1' from instability and deformation due to local stress concentration.

The supporting protrusion 121' is in clearance fit with the limit groove 2211', as shown in FIG. 33.

The supporting protrusion 121' is in clearance fit with the limit groove 2211', and does not limit the deformation of the terminal 1' in the circumferential direction and the radial direction, which ensures that the terminal 1' has the ability to deform in the circumferential and radial directions, that is, flexibility. It also facilitates the accurate alignment of the terminal 1' and the female end opening to meet the assembly requirements of the terminal 1' and the female end.

The clearance between the terminal 1' and the groove 221' in the thickness direction of the terminal 1' is recorded as the first clearance 226', and the clearance between the supporting protrusion 121' and the limit groove 2211' in the thickness direction of the terminal 1' is recorded as the second clearance 227', the width of the second clearance 227' is less than the width of the first clearance 226', as shown in FIG. 33.

The first clearance 226' is relatively large, which is conducive to better deformation of the terminal 1' in the circumferential, radial and vertical upward directions; while the second clearance 227' is relatively small, which helps prevent the second connection section 12' from bending and unstable deformation when it is under pressure.

According to another alternative embodiment, a motor 51', as shown in FIG. 47, comprises a motor body and a bus-barwire, such as, the one according to the last two embodiments. The motor body comprises a stator 4', the stator 4' is provided with windings, and the windings have two wiring ends. The connecting part 32' of the bus-barwire is connected to the wiring end.

The motor 51' provided by this embodiment comprises the bus-barwire described previously, so it has all the beneficial effects of any of the above-mentioned embodiment, and will not be repeated here.

In an embodiment, the number of the windings is 12, and the 12 windings are connected by star connection.

Since 12 windings have 24 joints, the star connection is adopted. It is necessary to connect the 12 wire ends of the starting ends of the 12 windings together, and the ending ends of the 1, 4, 7, and 10 windings, the ending ends of 2, 5, 8, and 11 windings, the ending ends of 3, 6, 9, and 12 windings are connected together, so the wiring method is very complicated. The solution of the present disclosure can effectively reduce the difficulty of wiring, and the wiring method is simple and reliable. Alternatively, the number of the windings is not limited to 12, but can also be 9, 15, etc.; the connection method of the windings is not limited to the above-mentioned method, and can also be delta connection or other methods.

Figure 48:
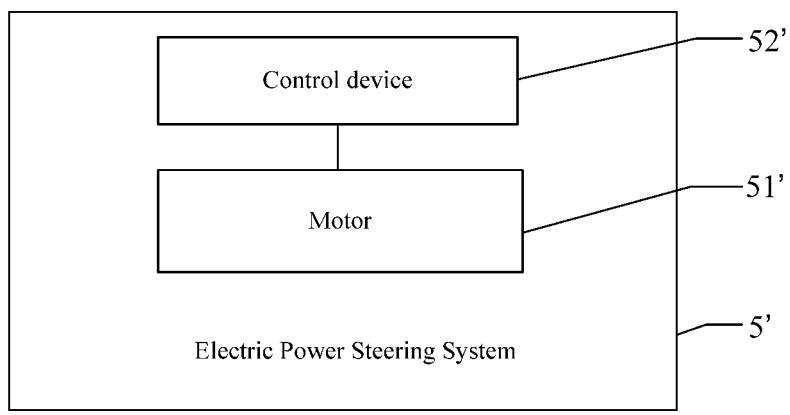
FIG. 48 is a schematic block diagram of an electric power steering system provided in some embodiments of the present disclosure.

According to another alternative embodiment, an electric power steering system 5', as shown in FIG. 48, comprises the motor 51' and the control device 52' (such as, the one according to the last embodiment), and the control device 52' is electrically connected to the motor 51'.

The electric power steering system 5' provided by this embodiment comprises the motor 51', so it has all the beneficial effects thereof, and will not be repeated here.

The control device 52' comprises, but is not limited to, a vehicle speed sensor, an electronic control unit (ECU, Electronic Control Unit, also known as "driving computer", "vehicle computer", etc.), etc.

It can be understood that the electric power steering system 5' (Electric Power Steering, abbreviated EPS) is a power steering system that directly relies on the motor 51' to provide auxiliary torque. Compared with traditional hydraulic power steering system HPS (Hydraulic Power Steering), EPS system has many advantages. EPS is mainly composed of torque sensor, vehicle speed sensor, motor, deceleration mechanism and electronic control unit (ECU).

Figure 49:
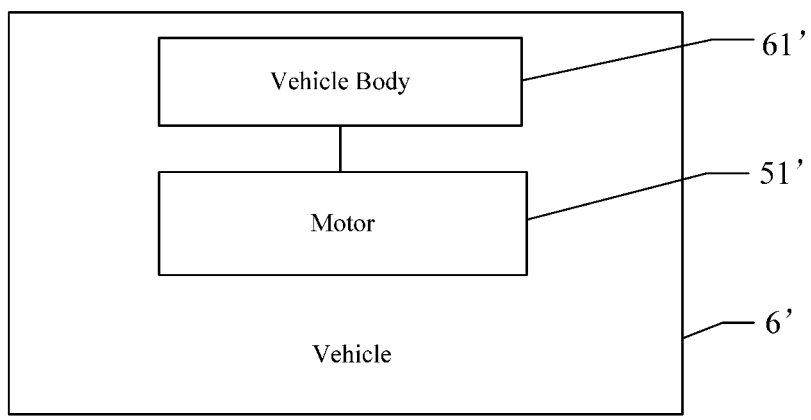
FIG. 49 is a schematic block diagram of a vehicle provided in some embodiments of the present disclosure.

According to another alternative embodiment, a vehicle 6', as shown in FIG. 49, comprises a vehicle body 61' and the motor 51'. The motor 51' is installed in the vehicle body 61'.

The vehicle 6' provided by this embodiment comprises the motor 51', so it has all the beneficial effects of the motor 51', and will not be repeated here.

Next, take the 8P12S permanent magnet motor 51' as an example for detailed explanation.

The 8P12S permanent magnet motor 51' comprises a bus-barwire with a flexible terminal 1'.

The bus-barwire is first integrally injected, and the molding diagram after injection is shown in FIG. 44 and FIG. 45.

The groove 221' is reserved for injecting frame 2' to facilitate subsequent assembly of the terminal 1', as shown in FIG. 46.

Three hooks (also called hook 23') are evenly distributed on the outer ring of the frame 2', which are numbered the first hook, the second hook, and the third hook. The first hook, the second hook is slotted in the middle, the total width is B1', and the third hook is not slotted in the middle, and the total width is B2'. When the bus-barwire is assembled, three hooks need to be hooked into the frame groove of the stator 4' (that is, the locking groove 41' of the stator 4') in sequence, and the groove width of the frame of the stator 4' is B3'. The current design is dimension B2'<B3'<B1'. Therefore, the third hook can be easily hooked into the groove without interference, while the first hook and the second hook interfere with the notch, and need to be squeezed and deformed by the side. As a result, the overall width of the first hook and the second hook is narrowed so that it can be hooked into the groove. The advantage of this design is that after the first hook and the second hook are hooked into the groove, due to the effect of elastic force, the sides of the first hook and the second hook are closely attached to the side of the notch, and have a certain bonding force. Therefore, the assembly of the bus-barwire will be more reliable.

If it is not designed in this way, the following problems will inevitably be encountered, that is, if the three hooks can be smoothly hooked into the locking groove 41', the conventional method is to design the width of the hook to be smaller than the width of the notch. That is, there is a clearance fit between the hook and the notch. This design will cause two problems: 1. if the clearance is too large, the bus-barwire is easy to loosen; 2. if the clearance is too small, due to the dimension tolerance and position tolerance of the hook and the notch, it is likely that a certain hook is not easy to put in.

The shape of the terminal 1' is designed as a double-L shape, as shown in FIG. 38, FIG. 42 and FIG. 43, and assembled into the reserved groove of the bus-barwire frame 2', as shown in FIG. 46.

When the terminal 1' is lifted up, only the welding point restricts the terminal 1', and the action point between the welding point and the force is not in a straight line. Thus, a moment (the force multiplied by the force arm) will be generated, and the terminal 1' can be easily deformed under tension.

When the terminal 1' is pressed down, the supporting mating surface 222' of the frame 2' supports the terminal 1' and protects the terminal 1' from deformation. In addition, the two supporting protrusions 121' of the terminal 1' protect the terminal 1' from instability and deformation when subjected to downward pressure. The terminal 1' and the bus-barwire frame 2' are clearance fits in both radial and circumferential directions, so the force and deformation in these two directions are easy.

Through the above-mentioned design, it is easy to deform the terminal 1' in the vertical upward, radial and circumferential directions, but difficult to deform vertically downward.

This design simulates the force when the terminal 1' is plugged into the female end. The female end groove has an interference fit with the terminal 1'. Therefore, when the terminal 1' is subjected to vertical pressure, it must not be deformed greatly. Due to the influence of tolerance, when the female end groove is mated with the terminal 1', precise positioning cannot be guaranteed, the only way to ensure that the mating can be completed by setting the guide on the female end or the terminal 1'. Therefore, the terminal 1' has the ability to deform in the circumferential, radial and vertical upward directions, that is, flexibility, which can effectively reduce assembly difficulty and improve assembly yield. This design just meets the above assembly requirements.

In the description of this specification, the terms "first", "second", "third", "fourth", "fifth", "sixth" and "seventh" are only used for descriptive purposes, and cannot be understood as indicating or implying relative importance, unless otherwise clearly stipulated and limited. The terms "installing", "connected", "connection", "fixing" and the like should be understood in a broad sense. For example, "connection" may be a fixed connection, a removable connection or an integral connection; and "connected" may refer to direct connection or indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

The descriptions above are only preferred embodiments of the present invention, which are not used to limit the present invention. For a person skilled in the art, the present invention may have various changes and variations. Any modifications, equivalent substitutions, improvements etc. within the spirit and principle of the present invention shall all be included in the protection scope of the present invention.

What is claimed is:

1. A bus-barwire comprising:
a frame, being an insulator;
a plurality of busbars,
wherein each of the busbars comprises a main body embedded in the frame and extending along a circumferential direction of the frame, and a plurality of connecting parts connected to the main body and protruding outside of the frame, the plurality of connecting parts being configured to connect wiring ends of motor stator windings; and
a plurality of terminals, being connected to the plurality of busbars, for connecting to a power source,
wherein, all the main bodies of the busbars are arranged in a stack along an axial direction of the frame and are spaced apart from each other, all the connecting parts of the busbars are spaced apart along the circumferential direction of the frame, and all the connecting parts of the busbars are distanced from end surfaces of the stator windings and remain flush in the axial direction of the frame,
wherein the frame comprises a ring bracket and a plurality of strip brackets integrally connected with the ring bracket, and all the main bodies of the busbars are embedded in the ring brackets, and the plurality of strip brackets correspond to the plurality of terminals one-to-one, and a part of each of the terminals is embedded in the corresponding strip bracket, and
wherein the terminal is connected to one of the connecting parts of the corresponding busbars, in a projection of a plane perpendicular to a central axis of the frame, the strip bracket is arranged asymmetrically with respect to the terminal in a thickness direction of the terminal, and a dimension of a part close to the corresponding connecting part configured to connect to the wiring end is smaller than the dimension of a part far away from the corresponding connecting part configured to connect to the wiring end.

2. The bus-barwire according to claim 1, wherein
each of the connecting parts is provided with a limit groove adapted to the wiring end, and the limit groove is for a respective wiring end to pass through and is suitable for being connected to the respective wiring end by welding.

3. The bus-barwire according to claim 1, wherein
a dimension of the strip bracket along the axial direction of the frame is greater than or equal to half of a dimension of the terminal along the axial direction of the frame.

4. The bus-barwire according to claim 1, wherein
both ends of the connecting parts of all the busbars along the axial direction of the frame do not protrude from a plane where two axial end surfaces of the frame are located.

5. A motor comprising:
a motor body, comprising a stator being provided with a winding, and the winding having two wiring ends; and
the bus-barwire according to claim 1, wherein the connecting part of the bus-barwire is connected to the wiring end.

6. The bus-barwire according to claim 1, wherein
the end surfaces of all the connecting parts of the busbars close to the stator windings are remained flush in the axial direction of the frame, so that all the connecting parts are remained flush in the axial direction of the frame.

7. The bus-barwire according to claim 6, wherein
at least a plurality of the busbars each further comprise an extension part, the extension part is located between an outer periphery of the main body and the connecting parts, and is configured to connect the main body and the connecting parts, and the extension part extends at least partially along the axial direction of the frame, so that all the connecting parts remain flush in the axial direction of the frame.

8. The bus-barwire according to claim 1, wherein
the main body is in a shape of an arc, and all the busbars are divided into a neutral busbar and a plurality of phase busbars, and
the main body of the neutral busbar and a plurality of the main bodies of the phase busbars are sequentially arranged in stack and spaced apart from each other in the axial direction of the frame, and all the connecting parts of the busbars are evenly distributed along the circumferential direction of the frame.

9. The bus-barwire according to claim 8, wherein
the plurality of connecting parts of each of the busbars are sequentially recorded as x-th connecting parts from a gap of its main body along the same direction of rotation, and the plurality of phase busbars are sequentially recorded as y-th phase busbars along the axial direction of the frame and a first phase busbar is arranged adjacent to the neutral busbar; an axis connection angle α between a first connecting part of the neutral busbar and the first connecting part of an adjacent first phase busbar is α, an axis connection angle β between the first connecting part of the first phase busbar and the first connecting part of an adjacent second phase busbar satisfies:

α=360°/(2×m×n)+360°×K/(m×n), β=360°×P/(m×n), β≠360°×Q/n, the m is a number of the phase busbar, the n is a number of the stator windings of each phase, K∈[0, (m×n−1)], P∈[0, (m×n−1)], Q∈[1, m]; and an axis connection angle γ between the first connecting part of the second phase busbar and the first connecting part of a third phase busbar satisfies: γ=360°×P/(m×n) and γ≠360°×Q/n.

10. The bus-barwire according to claim 9, wherein:
the P and the n satisfy: P=n;
the first connecting part and the last connecting part of each of the busbars are located at both ends of the main body; and
a number of the connecting parts of each of the phase busbars is n, and each of the terminals is connected to the x-th connecting part of the corresponding phase busbar, and x∈[2, n−1].

11. A bus-barwire body comprising:
a frame, being an insulator and comprising a ring bracket and a plurality of strip brackets connected to the ring bracket; and
a plurality of busbars, each of the busbars comprising a main body embedded in the ring bracket and a plurality of connecting parts connected to the main body and protruding from the frame,
wherein, the strip bracket is provided with a groove for accommodating a part of a terminal, the groove is provided with an avoidance gap, and the avoidance gap is for one end of the terminal to bend and extend and protrude from the groove so as to be connected to the connecting part, the strip bracket is provided with at least one supporting mating surface for supporting the terminal, and at least a part of the at least one supporting mating surface is located in the groove, and the connecting part, the supporting mating surface and an entrance of the groove are arranged in sequence along an axial direction of the ring bracket.

12. The bus-barwire body according to claim 11, wherein the frame is provided with a plurality of hooks, at least one of the hooks is opened with an avoidance groove, and the avoidance groove is configured to make the hook suitable for elastic deformation.

13. The bus-barwire body according to claim 11, wherein at least one of the strip brackets is provided with a positioning identification portion, the positioning identification portion comprises a reinforced protrusion, and the reinforced protrusion is connected to the ring bracket and the strip bracket.

14. The bus-barwire body according to claim 11, wherein a limit groove is provided at the entrance of the groove, and the limit groove is configured to accommodate the supporting protrusion of the terminal.

15. The bus-barwire body according to claim 14, wherein the limit groove is arranged on at least one side of the groove along a width direction of the terminal.

16. A bus-barwire comprising:
the bus-barwire body according to claim 11; and
a terminal, being connected to the plurality of busbars of the bus-barwire body, one end of the terminal is connected to a connecting part, and another end of the terminal is configured to connect a power female terminal,
wherein:
the terminal is provided with a supporting surface, and the supporting surface contacts and cooperates with the supporting mating surface of the bus-barwire body.

17. A motor comprising:
a motor body, comprising a stator, being provided with a winding, and the winding having two wiring ends; and
the bus-barwire according to claim 16, wherein the connecting part of the bus-barwire is connected to the wiring end.

18. The bus-barwire according to claim 16, wherein the terminal comprises:
a first connection section;
a supporting section, one end of the supporting section being connected to the first connection section at a turning point, and the supporting section being provided with at least one supporting surface; and
a second connection section, being connected to anther end of the supporting section at a turning point, and the second connection section extending away from the first connection section, the first connection section, the supporting section, and the second connection section being arranged in sequence along a thickness direction of the first connection section,
wherein along the thickness direction of the first connection section, the supporting surface is provided on one side of the supporting section away from the second connection section, so that the supporting surface is adapted to be supported to provide supporting force to at least a part of the supporting section and the second connection section.

19. The bus-barwire according to claim 18, wherein:
the second connection section is provided with a supporting protrusion;
the supporting section comprises at least one L-shaped section;
the first connection section and the second connection section are perpendicular to each other;
the first connection section is provided with a welding surface; and
the second connection section is provided with a plug-in part.

20. The bus-barwire according to claim 18, wherein relative to one end of the second connection section connected to the supporting section, the first connection section extends obliquely along a circumferential direction of the bus-barwire.

* * * * *